(12) United States Patent
Small et al.

(10) Patent No.: US 8,054,804 B2
(45) Date of Patent: Nov. 8, 2011

(54) METHOD OF AND SYSTEM FOR SUPPORT OF USER DEVICES ROAMING BETWEEN ROUTING REALMS BY A SINGLE NETWORK SERVER

(75) Inventors: Keith M. Small, Lake Echo (CA);
Charles A. T. Feild, Tantallon (CA);
James R. Currie, Dartmouth (CA)

(73) Assignee: SolutionInc Limited, Nova Scotia (CA)

( * ) Notice: Subject to any disclaimer, the term of this patent is extended or adjusted under 35 U.S.C. 154(b) by 275 days.

(21) Appl. No.: 12/145,581

(22) Filed: Jun. 25, 2008

(65) Prior Publication Data
US 2009/0193103 A1    Jul. 30, 2009

(30) Foreign Application Priority Data
Jan. 29, 2008    (CA) .................................. 2619092

(51) Int. Cl.
*H04W 4/00*    (2009.01)
*G06F 15/16*    (2006.01)

(52) U.S. Cl. ... 370/331; 370/338; 370/392; 370/395.31; 370/395.53; 709/245

(58) Field of Classification Search .................. 370/254, 370/285, 331, 338, 349, 389, 392, 395.31, 370/395.53; 709/223, 245; 455/433, 439, 455/452.1
See application file for complete search history.

(56) References Cited

U.S. PATENT DOCUMENTS

| | | | | |
|---|---|---|---|---|
| 6,151,331 A * | 11/2000 | Wilson | ............................ | 370/465 |
| 6,243,749 B1 * | 6/2001 | Sitaraman et al. | ............ | 709/223 |
| 6,510,153 B1 * | 1/2003 | Inoue et al. | .................... | 370/354 |
| 6,577,609 B2 * | 6/2003 | Sharony | ......................... | 370/312 |
| 6,601,093 B1 * | 7/2003 | Peters | ............................ | 709/220 |
| 6,684,243 B1 * | 1/2004 | Euget et al. | .................... | 709/222 |
| 6,970,944 B2 * | 11/2005 | Johnson et al. | ............... | 709/238 |
| 7,069,340 B1 * | 6/2006 | Evans et al. | .................... | 709/245 |
| 7,089,334 B2 * | 8/2006 | Peshkin | ......................... | 709/250 |
| 7,149,219 B2 * | 12/2006 | Donahue | ........................ | 370/392 |

(Continued)

FOREIGN PATENT DOCUMENTS

EP    1 113 640    7/2001

(Continued)

*Primary Examiner* — Aung S Moe
*Assistant Examiner* — Benjamin H Elliott, IV
(74) *Attorney, Agent, or Firm* — Carmody & Torrance LLP

(57) ABSTRACT

A network server provisioning at least one Local Area Network (LAN) comprising a client entry store, a packet driver module, a Dynamic Host Configuration Protocol (DHCP) request handler. The LAN has one or more routing realms. The client entry store stores records representing a user device connecting to the LAN provisioned by the network server as a roaming visitor of the LAN to gain temporal access to an outside network through the LAN, and records representing one or more routing realm top-level devices provided on a top level of each routing realm of the LAN. The packet driver module inspects packets arriving from and directed to the user device, and interacts with the client entry store to process the packets. The DHCP request handler examines address data in DHCP packets received from the user device and the records in the client entry store. At least one of the packet driver module and the DHCP request handler detects roaming between routing realms by the user device based on the data of the packets and the records in the client entry store, and assigns a new Internet Protocol (IP) address to the user device when roaming by the user device is detected.

28 Claims, 29 Drawing Sheets

U.S. PATENT DOCUMENTS

| | | | |
|---|---|---|---|
| 7,286,539 B2 * | 10/2007 | Tsuge et al. | 370/392 |
| 7,315,519 B2 * | 1/2008 | Sarikaya et al. | 370/310 |
| 7,356,841 B2 * | 4/2008 | Wilson et al. | 726/15 |
| 7,401,160 B2 * | 7/2008 | Johnson et al. | 709/238 |
| 7,443,809 B2 * | 10/2008 | Bajic | 370/254 |
| 7,463,607 B2 * | 12/2008 | Sood et al. | 370/331 |
| 7,471,656 B2 * | 12/2008 | Karoubalis et al. | 370/331 |
| 7,477,894 B1 * | 1/2009 | Sinha | 455/432.1 |
| 7,502,841 B2 * | 3/2009 | Small et al. | 709/223 |
| 7,515,573 B2 * | 4/2009 | Bajic | 370/338 |
| 7,529,810 B2 * | 5/2009 | Goto et al. | 709/219 |
| 7,552,202 B2 * | 6/2009 | Brown et al. | 709/220 |
| 7,649,866 B2 * | 1/2010 | Chari et al. | 370/331 |
| 7,724,688 B2 * | 5/2010 | Yamada et al. | 370/256 |
| 7,827,278 B2 * | 11/2010 | Chen et al. | 709/225 |
| 2002/0009078 A1 * | 1/2002 | Wilson et al. | 370/389 |
| 2002/0136226 A1 | 9/2002 | Christoffel et al. | |
| 2005/0063350 A1 * | 3/2005 | Choudhury et al. | 370/338 |
| 2005/0256958 A1 * | 11/2005 | Wilson | 709/227 |
| 2006/0028996 A1 * | 2/2006 | Huegen et al. | 370/252 |
| 2006/0161652 A1 * | 7/2006 | Takizawa et al. | 709/224 |
| 2006/0233128 A1 | 10/2006 | Sood et al. | |
| 2007/0127430 A1 * | 6/2007 | Maeng | 370/338 |
| 2007/0268506 A1 * | 11/2007 | Zeldin | 358/1.13 |
| 2008/0002607 A1 * | 1/2008 | Nagarajan et al. | 370/328 |
| 2008/0281464 A1 * | 11/2008 | Sorensen et al. | 700/213 |
| 2009/0193103 A1 * | 7/2009 | Small et al. | 709/221 |

FOREIGN PATENT DOCUMENTS

| | | |
|---|---|---|
| EP | 1113640 A2 * | 7/2001 |
| EP | 1 746 803 | 1/2007 |
| WO | WO 2005079000 A1 * | 8/2005 |

* cited by examiner

METHOD OF AND SYSTEM FOR SUPPORT OF USER DEVICES ROAMING BETWEEN ROUTING REALMS BY A SINGLE NETWORK SERVER

FIELD OF THE INVENTION

The present invention relates to a method of and system for support of user devices roaming by a single network server, especially to a method of and system for supporting user devices roaming between layer-2 and/or layer-3 routing realms by a single Visitor Based Network (VBN) or Virtual Local Area Network (VLAN) management server.

BACKGROUND OF THE INVENTION

Large and/or complicated computer networks may contain multiple routing devices and multiple bridging devices within the topmost level of the network hierarchy. Such a network can be considered to consist of several top-level routing realms. A routing realm is, within the context of this document, a term referring to the network space behind a routing device, or the network space behind a group of interconnected bridging devices.

For example, a network containing two top-level routers R1 and R2, and four top-level bridging devices B1, B2, B3, and B4, can be considered to have three top-level routing realms: R1, R2, and (B1, B2, B3, B4).

In the case of a network which is provisioned by a single device at the top-level of the network, the network's routing realms, by virtue of fundamental networking principles, must utilize a distinct collection of Internet Protocol (IP) addresses, relative to the other routing realms within that network.

A network consisting of several top-level routing realms, where at least one of those routing realms is defined by a routing device, presents challenges to a top-level network provisioning device, because the provisioning device must successfully process routed and bridged traffic simultaneously. Such routed traffic is ISO Open Systems Interconnection Layer-3 traffic and such bridged traffic is ISO OSI Layer-2 traffic.

When an end-user device moves from one routing realm to another, since each routing realm must utilize a relatively unique collection of IP addresses, the IP address of the end-user device must change as the end-user device enters into a new routing realm. Thus, the existing provisioning device cannot handle such user who moves from a routing realm to another.

It is therefore desirable to provide a network provisioning device that can recognize that an end-user device has moved from a routing realm to another in a network comprising multiple routing realms, and handle this situation automatically.

SUMMARY OF THE INVENTION

It is an object of the invention to provide an improved method of and system for supporting user devices roaming between routing realms in a network that obviates or mitigates at least one of the disadvantages of existing systems.

The invention uses a single network provisioning server that can detect a roaming user device and handle the traffic from and to such a roaming user device by providing a new IP address to the user device when it enters into a new routing realm of a same or different VLAN.

In accordance with an aspect of the present invention, there is provided a network server for provisioning at least one Local Area Network (LAN). The network server comprises a client entry store, a packet driver module and a Dynamic Host Configuration Protocol (DHCP) request handler. The client entry store is provided for storing records representing a user device connecting to the LAN provisioned by the network server as a roaming visitor of the LAN to gain temporal access to an outside network through the LAN, the LAN having one or more routing realms. The client entry store further stores records representing one or more routing realm top-level devices provided on a top level of each routing realm. The packet driver module is provided for inspecting packets arriving from and directed to the user device, and for interacting with the client entry store to process the packets. The DHCP request handler is provided for examining data in DHCP packets received from the user device and the records in the client entry store. At least one of the packet driver module and the DHCP request handler detects roaming between routing realms by the user device based on the data of the packets and the records in the client entry store, and assigns a new Internet Protocol (IP) address to the user device when roaming by the user device is detected.

In an embodiment, the network server is a visitor based network (VBN) server for provisioning a VBN which allows temporal access to an outside network for roaming user devices. The client entry store stores records representing a user device using a VBN provisioned by the VBN server, and further stores records representing routing realm top-level devices provided on a top level of each network hierarchy of the VBN, each routing realm top-level devices forming a routing realm within the VBN and allowing selective connection of the user device to the VBN server through the routing realm. The DHCP request handler comprises a DHCP packet data handling unit, a client entry store record handling unit, an address data comparator, and a routing realm traversal handling unit. The DHCP packet data handling unit is provided for obtaining packet data relating to addresses included in the DHCP request packet. The client entry store record handling unit is provided for accessing and manipulating address data in the records in the client entry store. The address data comparator is provided for comparing the packet data of the DHCP request packet and the address data of the records in the client entry store. The routing realm traversal handling unit is provided for determining traversal of routing realms by the user device when a data comparison result meets a predetermined condition.

In accordance with another aspect of the present invention, there is provided a method of supporting user device roaming in at least one Local Area Network (LAN). The method comprises the steps of storing in a client entry store records representing a user device connecting to the LAN provisioned by the network server as a roaming visitor of the LAN to gain temporal access to an outside network through the LAN, the LAN having one or more routing realms; storing records representing one or more routing realm top-level devices provided on a top level of each routing realm of the LAN; receiving and inspecting packets arriving from and directed to the user device to obtain address information of the packets; searching the records stored in the client entry store for corresponding records that have address information corresponding to the address information of the packets; detecting roaming between routing realms by the user device based on the address information of the packets and the corresponding records; and assigning a new Internet Protocol (IP) address to the user device when roaming by the user device is detected.

In accordance with another aspect of the present invention, there is provided a computer readable medium storing instructions or statements for use in the execution in a computer of a method of supporting user device roaming in at least one Local Area Network (LAN). The method comprises the steps of storing in a client entry store records representing a user device connecting to the LAN provisioned by the network server as a roaming visitor of the LAN to gain temporal access to an outside network through the LAN, the LAN having one or more routing realms; storing records representing one or more routing realm top-level devices provided on a top level of each routing realm of the LAN; receiving and inspecting packets arriving from and directed to the user device to obtain address information of the packets; searching the records stored in the client entry store for corresponding records that have address information corresponding to the address information of the packets; detecting roaming between routing realms by the user device based on the address information of the packets and the corresponding records; and assigning a new Internet Protocol (IP) address to the user device when roaming by the user device is detected.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

Figure 1:
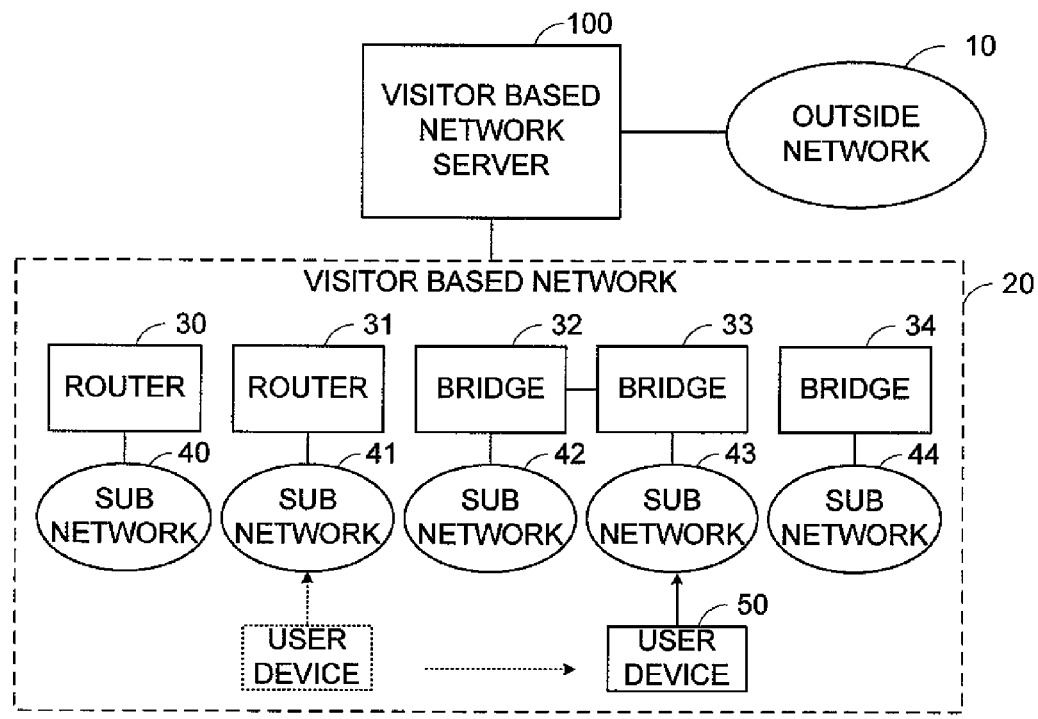
FIG. 1 is a block diagram showing an example of a visitor based network and a VBN server in accordance with an embodiment of the present invention.

Referring to FIG. 1, a Visitor Based Network (VBN) provisioning device or server 100 in accordance with an embodiment of the present invention is described.

The VBN server 100 is capable of recognizing and handling an end-user device roaming between routing realms in a VBN that has multiple top-level routing realms. The VBN server 100 is provided between an outside network 101 e.g., the Internet, and a VBN 20 behind the VBN server 100.

The VBN 20 is a local area network (LAN) which allows access to the outside network 10 for roaming or nomadic user computers or devices 50 in need of temporary service to the outside network 10. User devices 50 are often called "users", "clients" or "roaming devices" in this documents for simplicity of descriptions. A VBN is often established in a hotel, airport, convention center, or corporate meeting room.

The VBN 20 includes one or more routing devices, e.g., routers 30, 31, and one or more bridging devices, e.g., bridges 32-34, within the topmost level of the network hierarchy. A routing realm is formed by each router or a group of interconnected bridges with a sub-network space 40-44 behind the router or a group of bridges. Such routers and bridges may be collectively called "routing realm top-level devices" hereinafter.

Each router and bridge has an ethernet MAC address assigned to it. When a user device 50 sends an ethernet packet, the ethernet packet contains an ethernet MAC address of an originating entity, i.e., the MAC address of the user device 50. When ethernet packets are received, routers stamp their own MAC addresses onto the ethernet packets that they forward to the rest of the network. Bridges do not alter the MAC addresses of the ethernet packets that they relay, so that the MAC addresses of bridged packets remain those of the originating entity.

The VBN server 100 uses these features of routers and bridges to detect user device's traversal of routing realms. The VBN server 100 determines whether a packet has originated from a routing realm behind a router, or a routing realm behind a bridge. The VBN server 100 has prior knowledge of the MAC addresses of each router from which it may receive packets. Then, if the source MAC address of a received packet does not match that of any of the known routers, the provisioning device can assume that the packet has been bridged, and that the source MAC address of the packet is that of the originator of the packet, such as an end-user device 50.

The VBN server 100 can detect the roaming of an end-user device 50 between two routing realms by examining and comparing the source MAC addresses of the ethernet packets received by the VBN server 100 from that user device 50. If the source MAC address of a packet differs from the source MAC address of the preceding packet from the same user device, with the possible exception of DHCP Relayed DHCP packets as described below, the VBN server 100 then determines that the user device 50 has roamed from one routing realm to another.

The VBN server 100 maintains internal records of the end-user devices that they provision. These records contain data such as the Internet Protocol (IP) address assigned to the end-user device and the end-user device's MAC address. The VBN server 100 may record additional registration data, such as authorization status, authorization start and end dates, and billing type.

In order to handle routing realm traversal, the VBN server 100 provides a user device 50 which roams from one routing realm to another to obtain a new IP address suitable to the router or bridge of the new routing realm, in order to allow the roaming user to re-acquire network connectivity.

In a simple embodiment, the VBN server 100 invalidates the roaming user device's original record, and creates an entirely new record which reflects the new IP address which has been allocated to the roaming device 50, in order to recognize and handle the router roaming. The VBN server 100 provides new IP addresses that are suited to the new routing realm into which the roaming device entered.

In a more complicated embodiment, the VBN server 100 also ensures that the new record contains the same registration data as the invalidated record, so that the roaming device 50 does not need to re-authorize with the VBN server 100, and does not initiate a new billing process. The only interruption in service that the end-user of the roaming device 50 experiences is caused by the acquisition of the new IP address, via Dynamic Host Configuration Protocol (DHCP).

Figure 2:
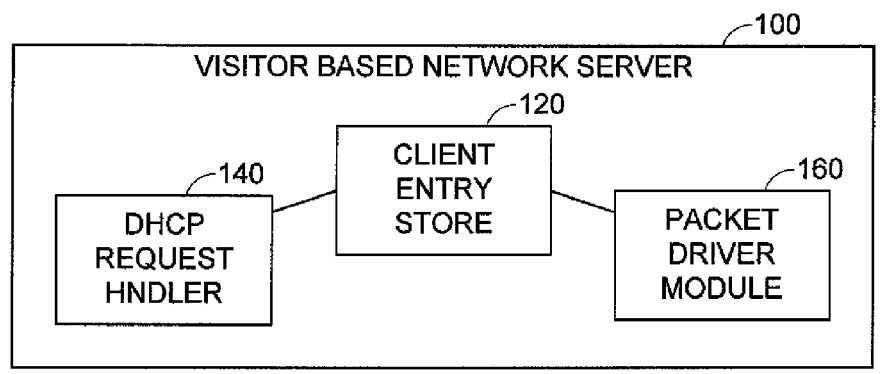
FIG. 2 is a block diagram showing an embodiment of the VBN server.

The details of the VBN server 100 in accordance with a simple embodiment are now described referring to FIG. 2. In this embodiment, the VBN server 100 has a client entry store 120, a DHCP request handler 140, and a packet driver module 160.

The client entry store 120 records data associated with the end-users connected to the VAN 20 behind the VBN server 100. Each record includes end-user device' MAC address, end-user device's IP address, the MAC address of the router through which the end-user device is connecting, and several end-user registration settings.

The DHCP request handler 140 determines which IP address to allocate to an end-user device sending DHCP traffic to the VBN server 100. The DHCP request handler 140 interacts with the client entry store 120 to perform record lookups, and to create new records therein.

The packet driver module 160 inspects each packet arriving from and directed to the LAN 20 behind the VBN server 100. The packet driver module 160 interacts with the client entry store 120 to perform record lookups, and to create new records.

Figure 3:
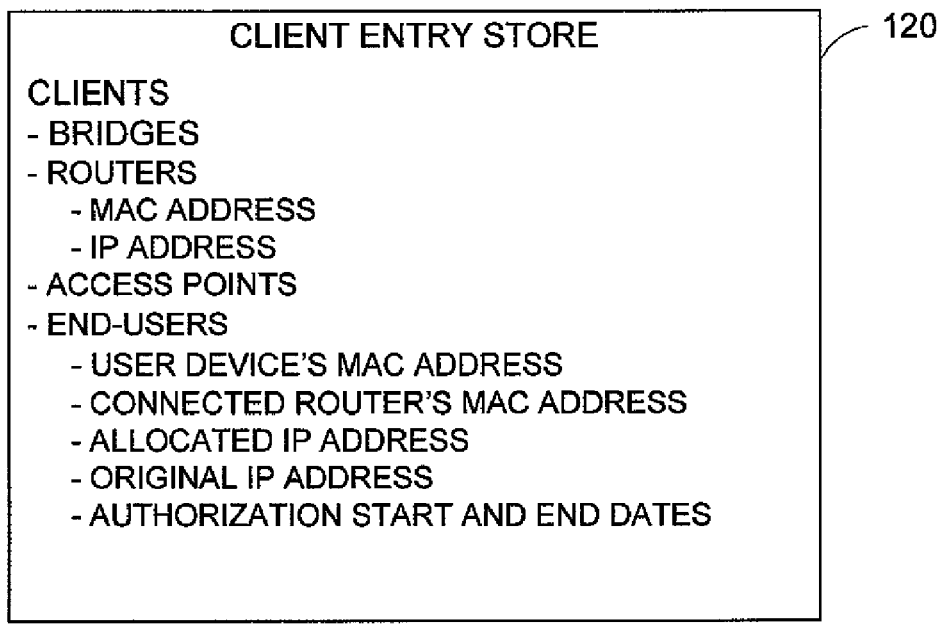
FIG. 3 is a diagram showing an embodiment of a client entry store.
Figure 4:
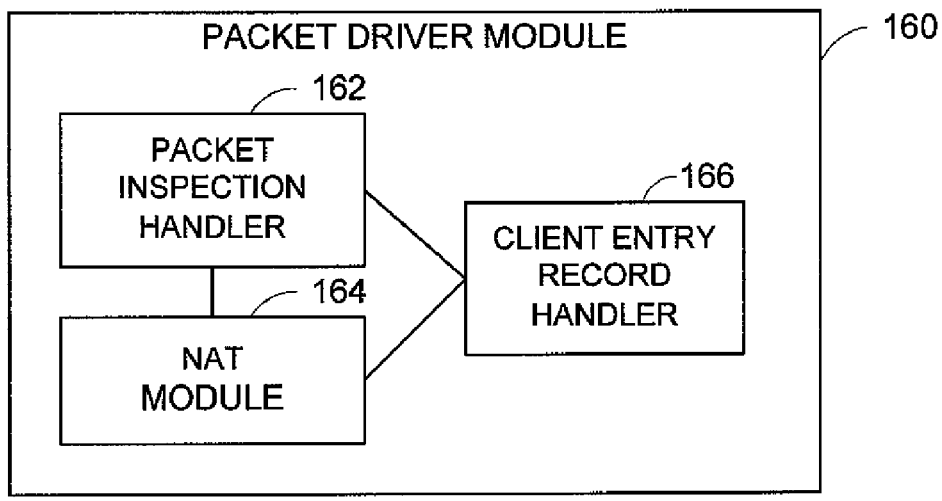
FIG. 4 is a block diagram showing an embodiment of a packet driver module.
Figure 5:
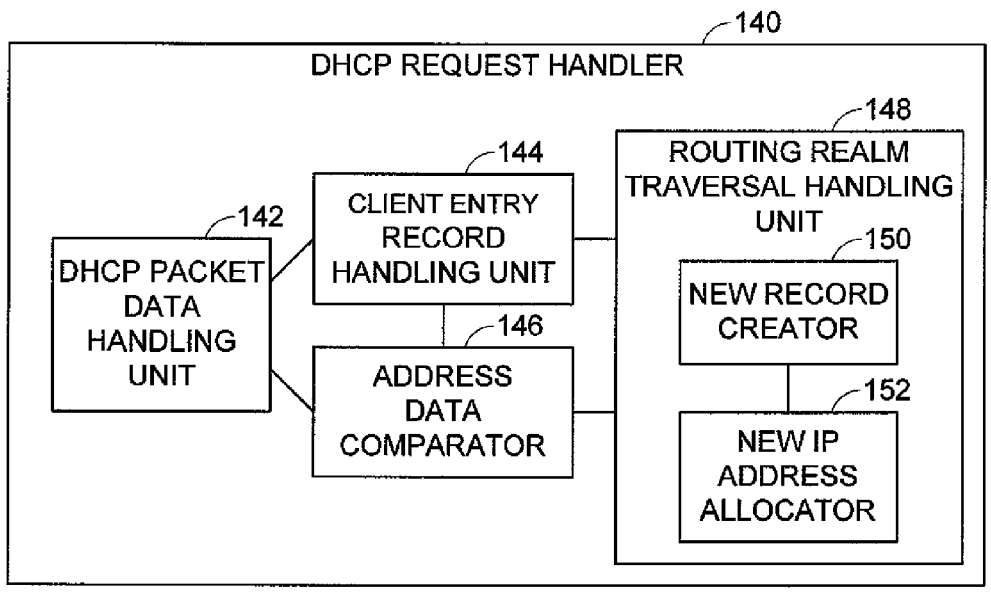
FIG. 5 is a block diagram showing an embodiment of a DHCP request handler.

These elements are further described in details referring to FIGS. 3 to 5.

FIG. 3 shows an example of the client entry store 120. The client entry store 120 maintains a list of records representing entities or clients on the LAN 20 behind the VBN server 100. These entities include network devices such as bridges, routers, access points, and end-users. Each record contains several values, including, but not limited to, end-user device's MAC address, router MAC address, end-user device's allocated-IP address, end-user device's original or actual IP address, and authorization start and end dates.

The end-user device MAC address field of the client entry store 120 contains the MAC address of the entity which is represented by the record. The VBN server 100 obtains the MAC address of an end-user device dynamically in one of the following three ways: 1) packet ethernet header inspection; 2) DHCP packet payload inspection; and 3) SNMP query of a routing device. The packet ethernet header inspection is used for bridged packets. The DHCP packet payload inspection is used for bridged or, especially, routed DHCP packets.

The router MAC address field of the client entry store 120 contains the MAC address of the device which is routing the entity represented by this record. The VBN server 100 obtains this MAC address by inspection of packets' ethernet headers by the packet driver module 160. For bridged entities, this field is set to the same value as the end-user device MAC address.

The end-user device's allocated IP address filed of the client entry store 120 contains the IP address which VBN server 100 has allocated to the device which is represented by this record. For statically-addressed entities, Network Address Translation (NAT) is transparently performed on this IP address, i.e., this IP address is transparently NATed, by the packet driver module 160. For dynamically-addressed entities, this IP address is sent to the entity through the DHCP protocol. VBN server 100 allocates IP addresses from different routed and bridged pools, as appropriate, as further described below.

The end-user device's original (actual) IP address field of the client entry store 120 contains, for statically-addressed entities, the IP address of the entity's actual, static address. It is obtained by inspection of packets' IP headers by the packet driver module 160. It is used by the packet driver module 160 for performing NAT.

The authorization start and end dates field of the client entry store 120 contains assorted end-user authorization and billing data.

FIG. 4 shows an example of the packet driver module 160. The packet driver module 160 has an packet inspection handler 162, NAT module 164 and a client entry record handler 166.

The packet inspection handler 162 inspects each packet which is sent to or arrives from the LAN 20 behind the VBN server 100. The NAT module 164 performs the most basic function of the packet driver module 160, i.e., performs Network Address Translation (NAT) on end-user packets, changing the IP address to or from the IP address which VBN server 100 has assigned to the end-user. The client entry record handler 166 attempts to retrieve or create a client entry store record for each packet, based upon the packet's source MAC address, and update certain fields within that record.

The packet driver module 160 helps VBN server 100 process routed end-user traffic, by determining if the source MAC address of an incoming packet is that of a known router.

If it is, then the packet driver module 160 performs some special actions, which involve either retrieving or creating a client entry store record for each packet, based upon the packets source MAC address and the packet's source IP address. The packet driver module 160 may be similar to the packet driver as described in U.S. Pat. No. 7,007,080 issued on Feb. 28, 2006 and Canadian patent application publication No. 2,457,368 published on Aug. 11, 2005, which are hereby incorporated by reference.

In most cases, the packet driver module 160 is capable of creating a new client entry store record which corresponds to an incoming packet. However, in some complicated cases, such as DHCP DISCOVER packets, or during a network entity's traversal of routing realms, the packet driver module 160 cannot create a new client entry store record, because the packet driver module 160 examines only the ethernet and IP headers of a packet, not the packet's payload. The DHCP request handler 140 attempts to create new client entry store records for those DHCP packets which surpass the capabilities of packet driver module 160, as further described below.

Figure 6:
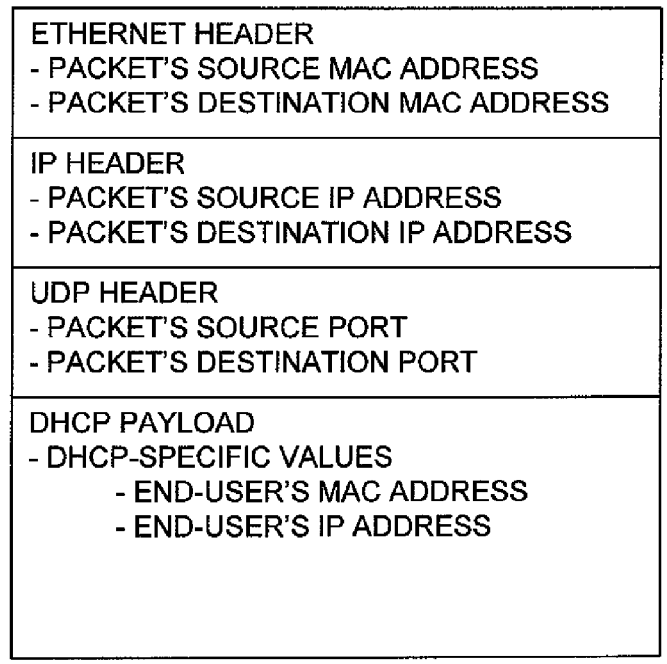
FIG. 6 is a diagram showing an example of a DHCP packet.

As shown in FIG. 6, a DHCP packet consists of an ethernet header, IP header, UDP header and DHCP payload. The ethernet header contains packet's source MAC address and destination MAC address. The IP header contains packet's source IP address and destination IP address. The UDP Header contains packet's source Port and destination Port. The DHCP Payload contains several DHCP-specific values, including end-user MAC and IP addresses.

For a bridged end-user packet, the source MAC address is the same as the user device or client MAC address, and the source IP address is the same as the user device or client IP address.

For a routed end-user packet, the source MAC address is altered to be that of the router, and the source IP address may be set to that of the router. The actual end-user addresses is therefore reliably contained only within the DHCP payload.

Devices which interconnect distinct subnetworks, such as routers, often possess mechanisms to facilitate the communication of DHCP packets from one subnetwork to another. Explicit mechanisms to do so are required because a single DHCP server often services several interconnected subnetworks. The most common such mechanism is DHCP Relay, an Internet standard. A more proprietary alternative to DHCP Relay is used by certain Cisco and Motorola routing devices, and will be arbitrarily referred to as DHCP Forwarding within this document. A routing device which lacks both a DHCP Relay mechanism and a DHCP Forwarding mechanism does not retransmit DHCP traffic from one subnetwork to another.

Figure 7:
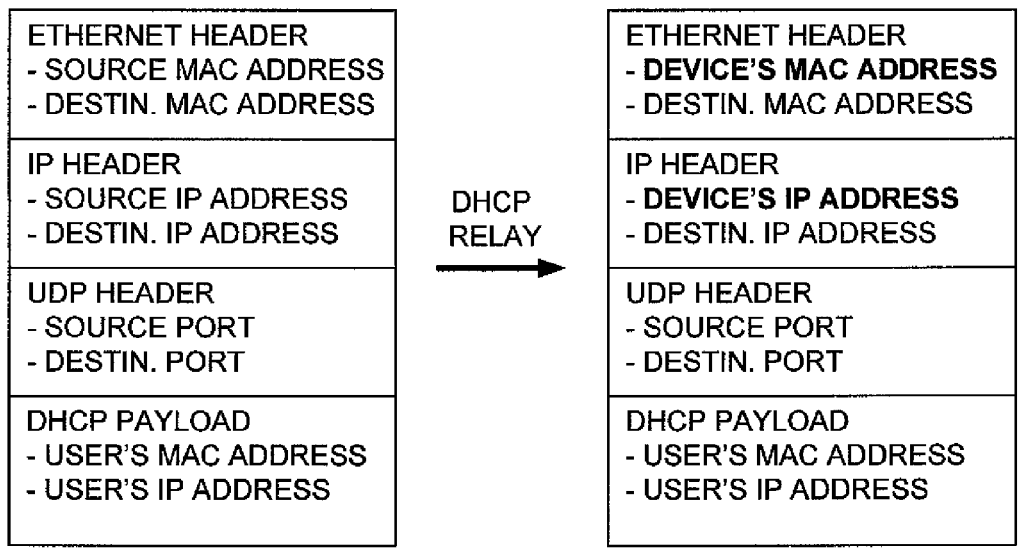
FIG. 7 is a diagram showing an example of DHCP relay.

DHCP Relay alters the ethernet and IP headers of a DHCP packet so that those headers contain source addresses of the external MAC and IP addresses of the DHCP Relaying device, as shown in FIG. 7. The DHCP payload within the packet is not altered by DHCP Relay, and therefore still contains the MAC and IP addresses of the originator of the DHCP packet. Both bridging and routing devices may DHCP Relay DHCP packets, although it is rare, and unnecessary, for a bridging device to do so.

DHCP Forwarding alters only the source MAC address of the DHCP packet, to be the external MAC address of the forwarding device. The packet's source IP address, and the contents of the DHCP payload, are not altered by DHCP Forwarding. Only routing devices are known to perform this type of DHCP Forwarding.

The DHCP request handler 140 can successfully process bridged, DHCP Relayed, and DHCP Forwarded DHCP packets. In order for the DHCP request handler 140 to handle DHCP Relayed or Forwarded packets, the VBN server 100 has prior knowledge of the external MAC addresses and IP addresses of the DHCP Relaying or Forwarding devices, i.e., these addresses are stored in the client entry store 120 in advance.

FIG. 5 shows an embodiment of the DHCP request handler 140. In this embodiment, the DHCP request handler 140 comprising a DHCP packet data handling unit 142, a client entry store record handling unit 144, an address data comparator 146 and a routing real traversal handling unit 148. The routing real traversal handling unit 148 has a new record creator 150 and a new IP address allocator 152.

Figure 8:
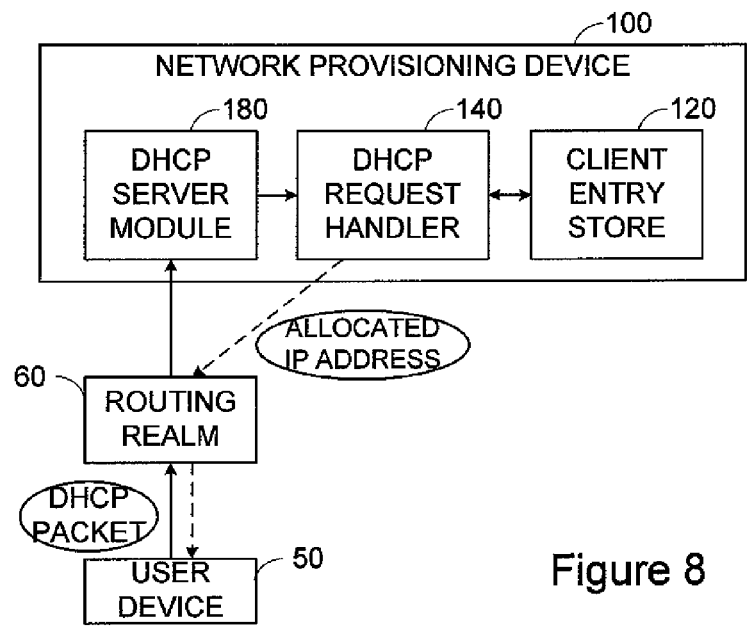
FIG. 8 is a diagram showing a data flow according to an embodiment of the VBN server.

FIG. 8 shows an example of the flow of data when a user device 50 sends a DHCP packet through a routing realm 60. A DHCP server module 180 receives the DHCP packet and passes DHCP packet data, such as MAC and IP addresses in DHCP packets, to the DHCP packet data handling unit 142 of the DHCP request handler 140. The DHCP request handler 140 accesses and manipulates records in the client entry store 120 through the client entry store record handling unit 144. The address data comparator 146 compares the DHCP packet data and client entry store records. If it is determined that the user device 50 traversed routing realms based on the comparison, the new record creator 150 of the routing realm traversal handling unit 148 creates a new record for the traversed user device 50 with a new IP address allocated by the new IP address allocator 152 so that the allocated IP address is suitable for the routing device in the newly entered routing realm. The routing realm traversal handling unit 148 replaces the new record with the existing record for the user device 50 in the client entry record 120 through the client entry record handling unit 144. The DHCP request handler 140 provides the newly allocated IP address to the user device 50. The IP address allocation is further described below.

Figure 9:
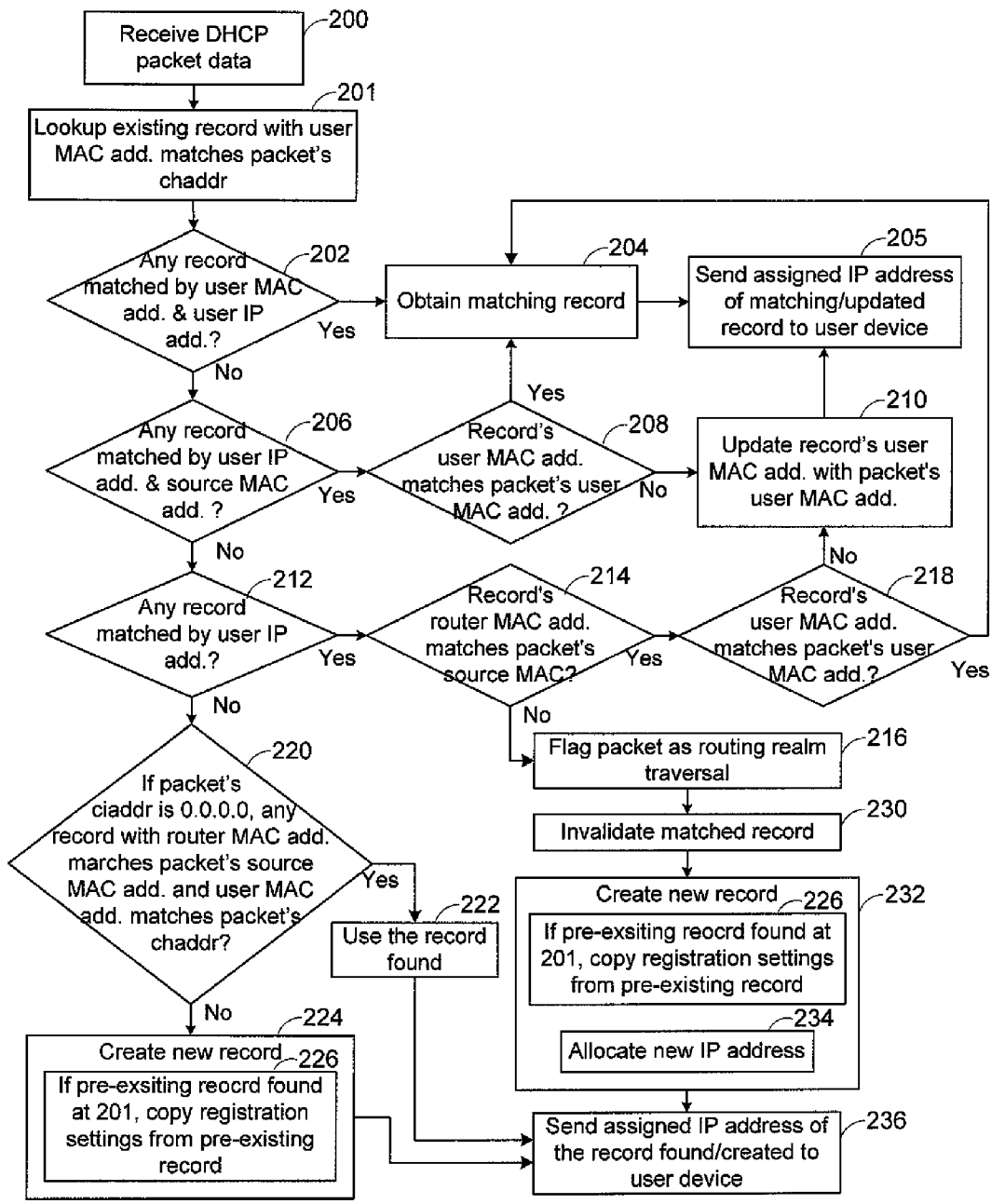
FIG. 9 is a flowchart showing an embodiment of the operation of the VBN server.

Referring to FIG. 9, an embodiment of the operation of the DHCP request handler 140 is described. When a DHCP server module 180 of the VBN server 100 receives a DHCP packet, the DHCP request handler 140 is passed data of the DHCP packet from the DHCP server module 180 (200). The data includes a source MAC address, source IP address, end-user MAC address and end-user IP address of a DHCP packet. The source MAC address is obtained from the ethernet header. This may be either the end-user's MAC address, or a router's MAC address. The source IP address is obtained from the IP header. This may be either the end-user's current IP address, or DHCP Relaying device's IP address. The end-user MAC address is obtained from the DHCP payload. The end-user IP address is obtained from the DHCP payload. The end-user MAC address and end-user IP address may be hereinafter referred to as clients hardware address (chaddr) and client's current IP address (ciaddr).

Using this data of the received DHCP packet, the DHCP request handler 140 can obtain the end-user's pre-existing record from the client entry store 120, or create a new record representing that end-user as follows.

The DHCP request handler 140 looks up the existing valid entry or record, if one exists, which possesses a user MAC address equal to the end-user MAC address chaddr of the DHCP packet (201). There is guaranteed to be no more than one such valid entry at a time within the registration driver. This lookup ignores the entry's router MAC address and the entry's assigned IP address, and thus, the entry that is obtained may not be appropriate for the end-user. However, if it is not appropriate for the end-user, this entry represents the end-user's most recent state, i.e. the most recent router to which the end-user was connected. This entry, if it exists, is used only as the source of the user's current registration settings, to be copied into a new record which may be created by the DHCP handler, once that new record has been created at step 224 as described below.

The DHCP request handler 140 attempts to locate a matching record in the client entry store 120 by end-user MAC address and end-user IP address (202). If it locates a matched record, the DHCP request handler 140 obtains the end-user's pre-existing record (204).

If there is no matching record at step 202, then the DHCP request handler 140 attempts to match record by end-user IP address and source MAC address (206). If it locates a corresponding record, the DHCP request handler 140 determines if the end-user MAC address of the corresponding record matches that of the received DHCP packet (208). If it matches, the DHCP request handler 140 obtains the corresponding record (204). If it does not match, then the DHCP request handler 140 updates the record's end-user MAC address to be the end-user MAC address of the received DHCP packet (210).

If there is no match at step 206, then the DHCP request handler 140 attempts to match record by end-user IP address (212). If it locates a corresponding record (R), the DHCP request handler 140 determines if the router MAC address of the corresponding record (R) matches the source MAC address of the received DHCP packet (214). If it does not match the DHCP packets source MAC address, then the DHCP request handler 140 flags this packet as an indication of a routing realm traversal by the end-user or client identified within the DHCP packet's payload (216). If the router MAC address of the corresponding record (R) does match the source MAC address of the DHCP packet (214), then the DHCP request handler 140 determines if the end-user or client MAC address of the corresponding record (R) matches the end-user MAC address of the DHCP packet (218). If it does not match the end-user MAC address of the DHCP packet at step 218, then the DHCP request handler 140 updates the client MAC address of the corresponding record (R) with the end-user MAC address of the DHCP packet (210), and sends the assigned IP address of the updated record is sent to the user device (205). If the end-user MAC address of the corresponding record (R) matches the end-user MAC address of the DHCP packet at step 218, then the DHCP request handler 140 executes step 204, and sends the assigned IP address of the matching record, i.e., the existing registration driver entry, to the user device (205).

If there is no match at step 212, then if the DHCP packet's ciaddr is 0.0.0.0, the DHCP request handler 140 looks up an existing entry or record which posses (a) a router MAC address equal to the source MAC address of the DHCP packet and (b) a client MAC address equal to the end-user MAC address chaddr of the DHCP packet (220). This step 220 handles the case of a DHCP DISCOVER packet being sent from a user who has not roamed between routers. If this step finds an entry, then that entry is used (222). If this step 220 does not find an entry, then the DHCP request handler 140 creates a new record (224) based upon the end-user's MAC address, DHCP packet's source MAC address, and, if possible, the DHCP packet's end-user IP address.

If the DHCP request handler 140 has detected a routing realm traversal (216), the DHCP request handler 140 invalidates the corresponding record (R) within the client entry store 120 (230), and creates a new record (232) based upon the end-users MAC address, and the DHCP packet's source MAC address. The DHCP request handler 140 allocates a new IP address to the end-user, appropriate to the end-user's new routing realm (234). The new record contains the registration settings from the invalidated record, such as authorization start and end times, and billing information. The new IP address is sent back to the end-user (236) so that the end-user can access services of the VBN server 100 using the new IP address.

Whenever the DHCP request handler 140 creates a new record at step 224 or step 232, it checks to see if a pre-existing record from was found at step 201, and if so, the registration settings from that pre-existing record are copied into the new record (226). This copying of registration settings is done by the DHCP request handler 140 after the DHCP request handler 140 has performed all of its other actions, but before the DHCP request handler 140 returns an assigned IP address to the DHCP service 180 for sending it to the user device (236).

The following is the process carried out by the DHCP request handler 140:

receive data of the DHCP packet from the DHCP service 180 find a pre-existing record P which possesses a client MAC address equal to the end-user MAC address chaddr of the DHCP packet find or create an appropriate registration driver record if a new record is created, and a pre-existing record P was found, then copy registration settings from record P into the new record end if return appropriate record's assigned IP address to the DHCP service 180

Thus, the VBN server 100 can support routing realm traversal. When an end-user traverses a routing realm behind a properly configured VBN server 100, the end-user is forced to acquire a new IP address via DHCP. There is no other interruptions or changes in the service provided by the VBN server 100, including the billing service. The VBN server 100 can handle traversals from layer-2 to layer-3 subnetworks, layer-3 to layer-2 subnetworks, and layer-3 to layer-3 subnetworks.

Referring to FIGS. 10-19, an example end-user scenario is described. This scenario portrays the main features of the VBN server 100 in accordance with an embodiment of the invention. This example uses a simple network having two routers 302 and 306, a bridge 304, and the VBN server 100. The two routers 302, 306 and bridge 304 are connected to the VBN server 100 via a core bridge 300. An end-user device 310 can be connected to any of the routers and bridge 302-306. Router 1 (302) possesses external (VBN server 100-side) MAC address aa:aa:aa:aa:aa:00 and IP address 1.2.3.4. Bridge 1 (304) possesses MAC address aa:aa:aa:aa:aa:01 and IP address 1.2.3.5. Router 2 (306) possesses external (VBN server 100-side) MAC address aa:aa:aa:aa:aa:02 and IP address 1.2.3.6. End-user device 310 possesses MAC address bb:bb:bb:bb:bb:bb, and a varying IP address.

The two routers 302, 306 are performing DHCP Relay upon DHCP packets which are sent from the end-user device 310. The bridge 304 is performing neither DHCP Relay nor DHCP Forwarding.

Figure 10:
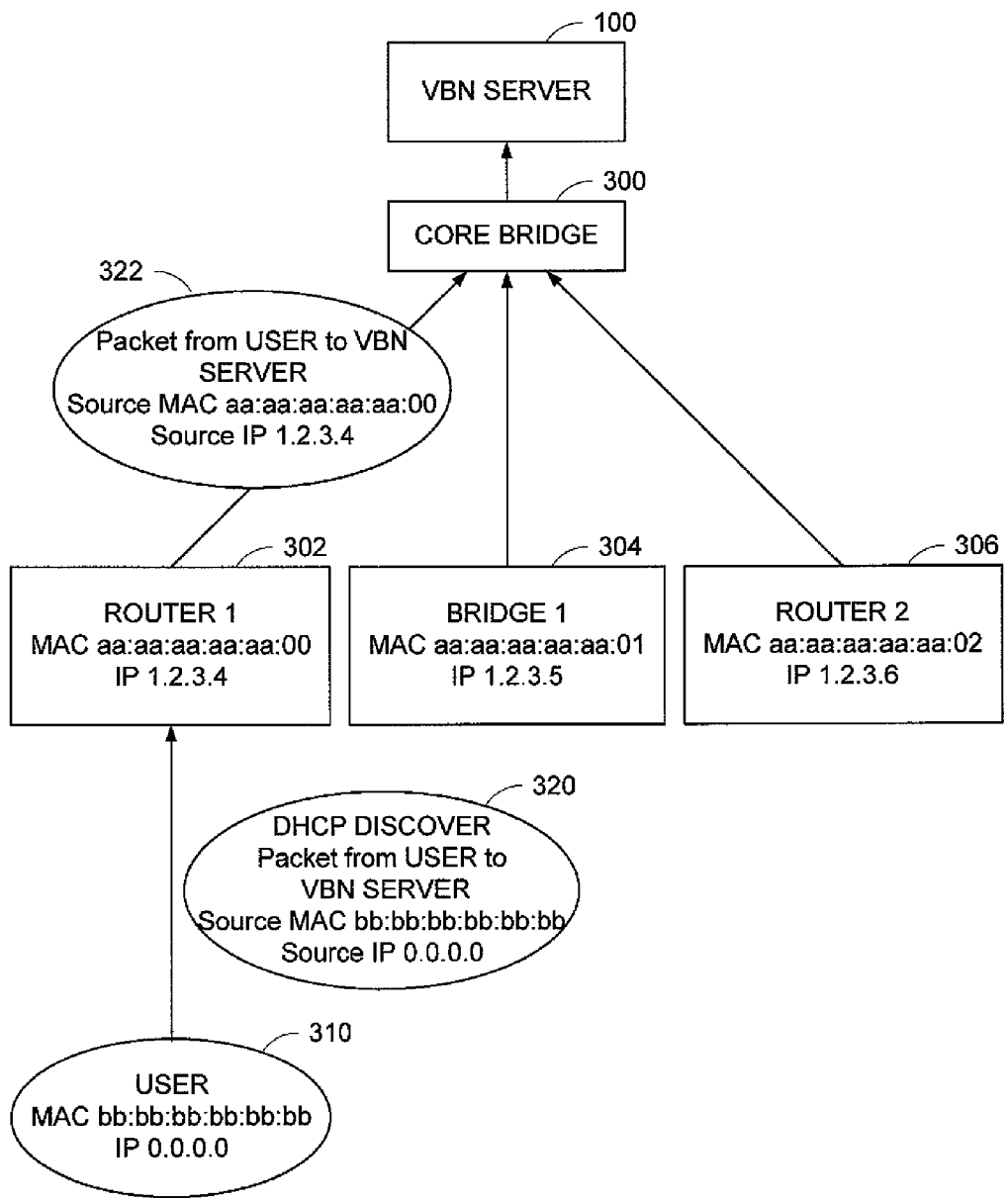
FIG. 10 is a diagram showing an example of a DHCP discover packet flow.

Given the network consisting of Router 1, Bridge 1, and Router 2, at the top-level of the network, an end-user's roaming from Router 1 to Bridge 1 to Router 2 to Router 1 will generate the following activity:

In order to obtaining an initial IP Address behind Router 1, the user device 310 physically connects to subnetwork behind Router 1, as shown in FIG. 10. The user device 310 issues a DHCP DISCOVER packet 320 to obtain an IP address. The headers of this packet 320 are stamped with the user's MAC address as the source MAC address, and the user's IP address as the source IP address, which is 0.0.0.0. The DHCP payload within the packet contains the user's MAC address and the user's current IP address, 0.0.0.0.

The DHCP DISCOVER packet 320 is passed through Router 1 to the VBN server 100. This DHCP pass-through may be performed in one of two manners: DHCP Relay or DHCP Forwarding. DHCP Relay of the DISCOVER packet alters both source addresses of the DHCP packet to the MAC of Router 1 and the IP of Router 1. The contents of the DHCP payload are not altered. DHCP Forwarding of the DISCOVER packet alters only the source MAC address of the DHCP packet to be the MAC of Router 1. The contents of the DHCP payload are not altered. FIG. 10 shows the DHCP Relayed packet 322.

Figure 11:
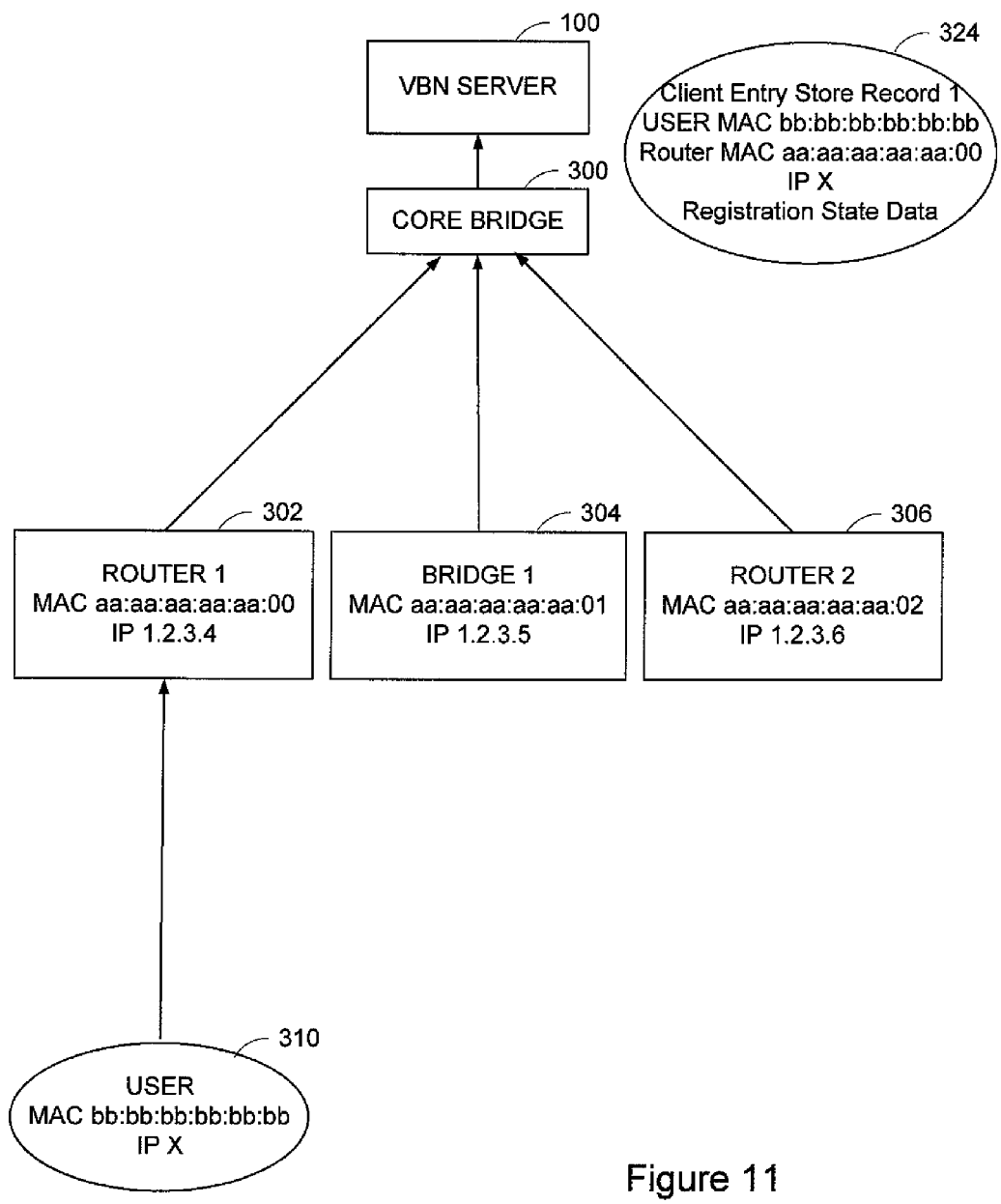
FIG. 11 is a diagram showing an example of a client entry store record.

The DHCP server module 180 receives the DHCP DISCOVER packet 322 and passes its contents to the DHCP request handler 140 module 140. The DHCP request handler 140 attempts to find an existing record within the client entry store 120 corresponding to the source MAC address, the user's MAC address, and the user's current IP address, according to the logic described earlier referring to FIG. 9. If no appropriate record is found, then a new record 324 is created, as shown in FIG. 11 and an IP address X suited to Router 1 is allocated to that new record 324. The record 324 contains user MAC bb:bb:bb:bb:bb:bb, router MAC aa:aa:aa:aa:aa:00, and the allocated IP X. This IP address X is sent back to the user 310 in a DHCP OFFER packet, and the DHCP transaction continues from there using the IP address X until the user is fully provisioned.

For moving from Router 1 to Bridge 1, the user 310 physically disconnects from subnetwork behind Router 1, and physically connects to subnetwork behind Bridge 1.

The user 310 sends, as the first packet after the new connection, one of three types of packet to Bridge 1, and thus to the VBN server 100: DHCP REQUEST packet, DHCP DISCOVER packet and non-DHCP packet. The DHCP REQUEST packet may be sent as the first packet automatically, after a period of time, by the user's DHCP client, if the user takes no action after physically connecting to the new bridge or router. The DHCP DISCOVER packet may be sent manually as the first packet if the user 310 chooses to explicitly release and renew his or her DHCP lease during/after moving to the new bridge or router. The non-DHCP packet may be sent as the first packet by an application running on the end-user's computer, or by the end-user's networking subsystem, such as ARP packet, etc.

Figure 12:
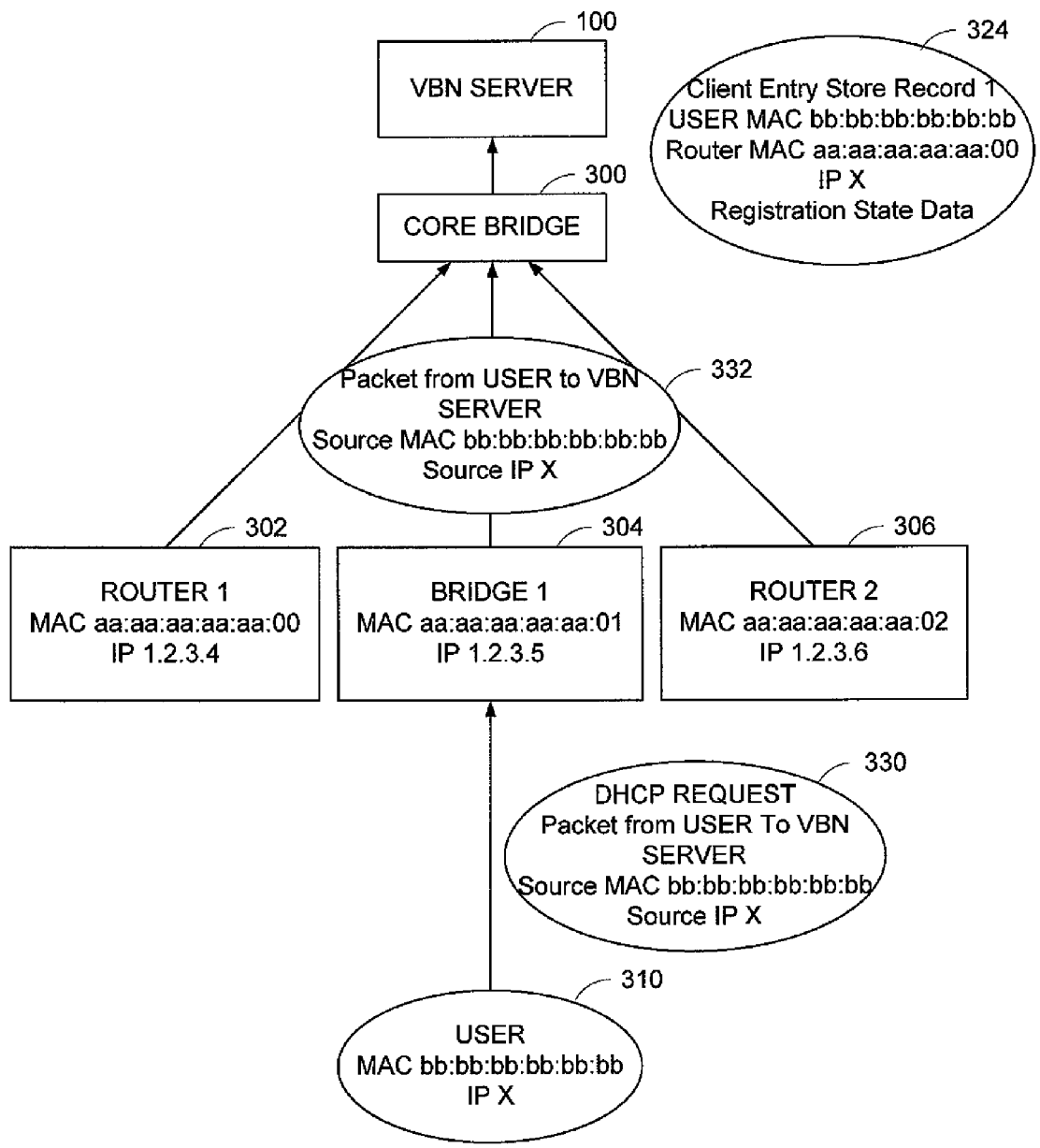
FIG. 12 is a diagram showing an example of a user traversal of routing realm and a DHCP request packet flow.

FIG. 12 shows the scenario where the user 310 sends a DHCP REQUEST packet, in an automatic attempt to retain the IP address X that was obtained behind Router 1. The headers of this packet are stamped with source addresses of the user's MAC address and user's current IP address X. Bridge 1 does not alter these source addresses. Thus, the packet 330 is transparently passed through Bridge 1 and received in its original form by the VBN server 100.

In the VBN server 100, the DHCP server module 180 passes the source MAC and IP addresses of the received packet 330, as well as the DHCP payload's user MAC and IP addresses (which in this case are identical to the packet's source addresses), to the DHCP request handler 140.

Figure 14:
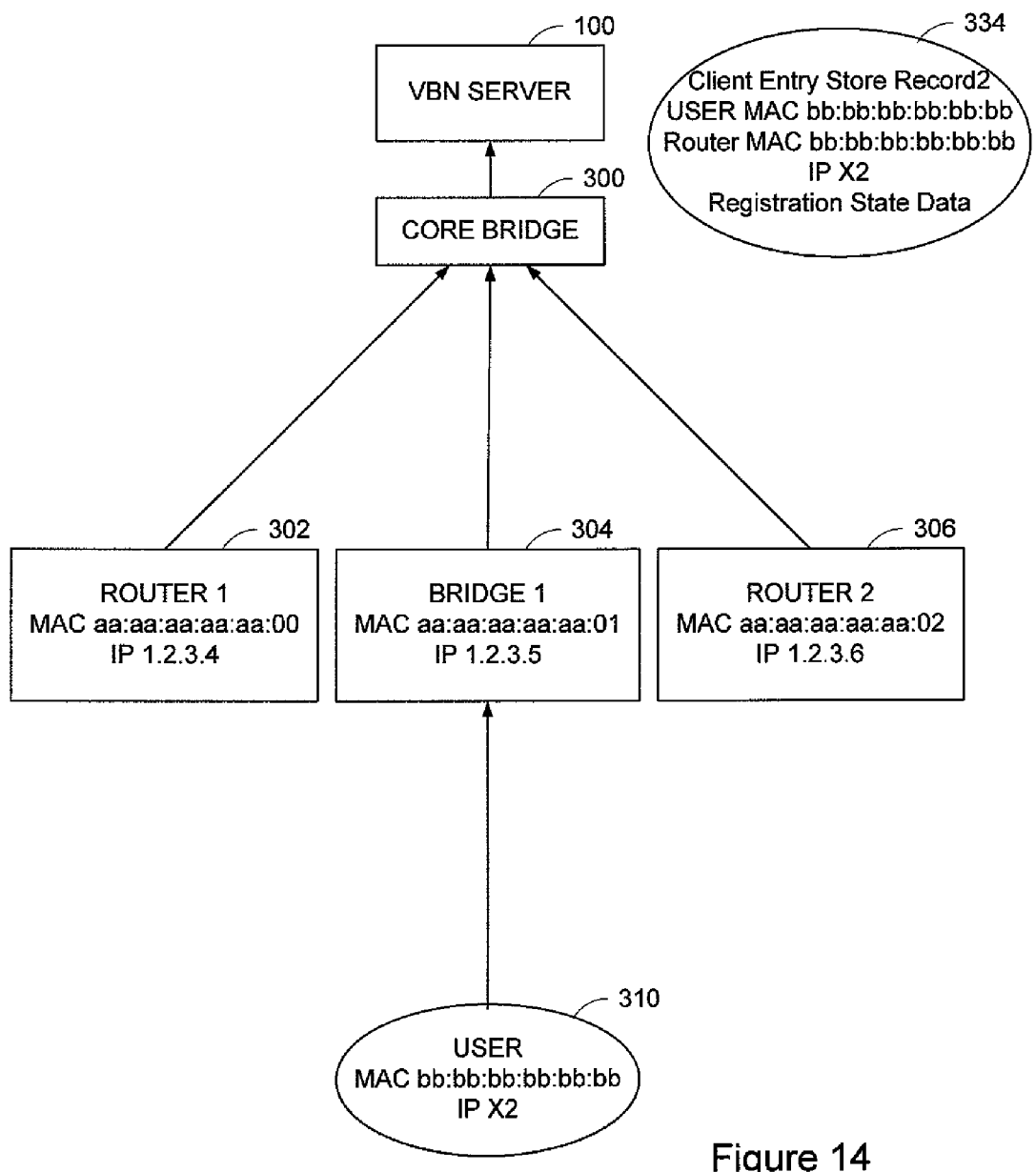
FIG. 14 is a diagram showing an example of a client entry store record.

The DHCP request handler 140 attempts to match the addresses it received to a record within the client entry store 120, according to the logic detailed earlier referring to FIG. 9. The DHCP request handler 120 recognizes that the packet's source MAC address does not match the router MAC address of the record corresponding to the user's MAC and/or IP address, and flags this transaction as a routing realm traversal. The DHCP request handler 140 invalidates the existing record 324, and creates a new record 334, as shown in FIG. 14, based upon the current source MAC address, the user MAC address, and a newly allocated IP address X2, suited to the bridged realm. The new record 334 contains user MAC bb:bb:bb:bb:bb:bb, router MAC bb:bb:bb:bb:bb:bb, and the allocated IP X2. This new IP address X2 is returned to the user 310 through the standard DHCP protocol.

Figure 13:
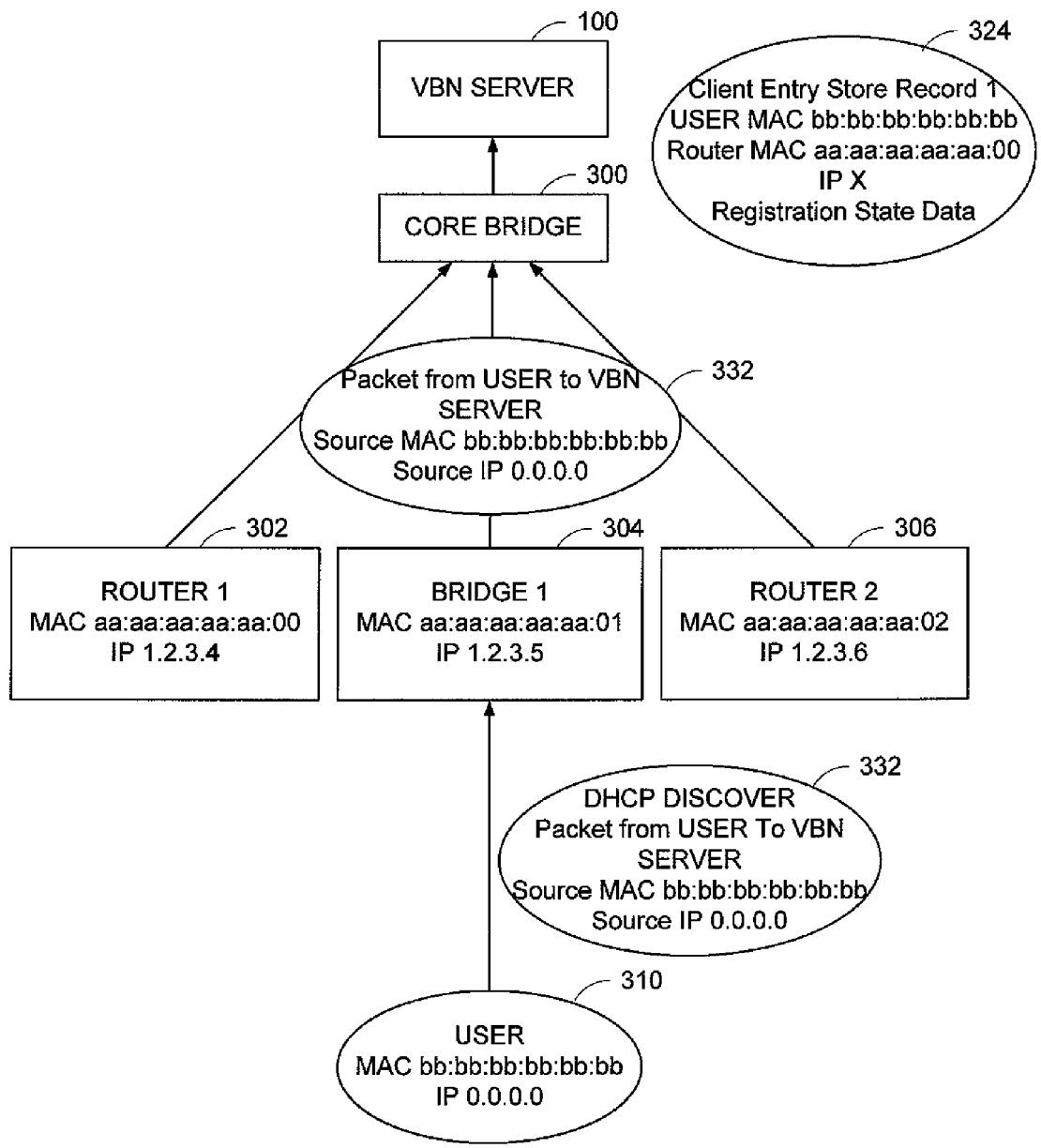
FIG. 13 is a diagram showing an example of a DHCP discover packet flow.

FIG. 13 shows the scenario where the user 310 sends a DHCP DISCOVER packet 332, when the user's DHCP module has either expired its original DHCP lease, or has lost network connectivity long enough to prematurely abandon it.

The DHCP DISCOVER packet 332 is stamped with source addresses of the user's MAC and current IP addresses, which is 0.0.0.0. The packet's DHCP payload also contains the user's MAC and current IP addresses. The Bridge 1 does not alter the packet's source addresses, and thus the VBN server 100 receives the packet 332 in its original form.

In the VBN server 100, the DHCP server module 180 passes the packet's source addresses and the DHCP payload's addresses to the DHCP request handler 140.

The DHCP request handler 140 attempts to find a matching record within the client entry store 120, according to the logic described referring to FIG. 9. The DHCP request handler 140 looks up if there is a pre-existing valid record which possesses a user MAC address equal to the end-user MAC address chaddr of the DHCP packet according to step 201 in FIG. 9. The pre-existing valid entry P for this user reflects the user's previous location behind Router 1. The pre-existing record P possesses a router MAC address equal to the MAC address of Router 1. However, the source MAC address of this DHCP packet is equal to the user's own MAC address, and does not match the pre-existing record P. Thus, the DHCP request handler 140 does not find a matching record. Accordingly, the DHCP request handler 140 creates a new record 334, based upon the source MAC and user MAC, and utilizing a newly allocated IP address X2 suited to the bridged realm, as shown in FIG. 14. This new IP address X2 is returned to the user 310 via the standard DHCP protocol.

Figure 15:
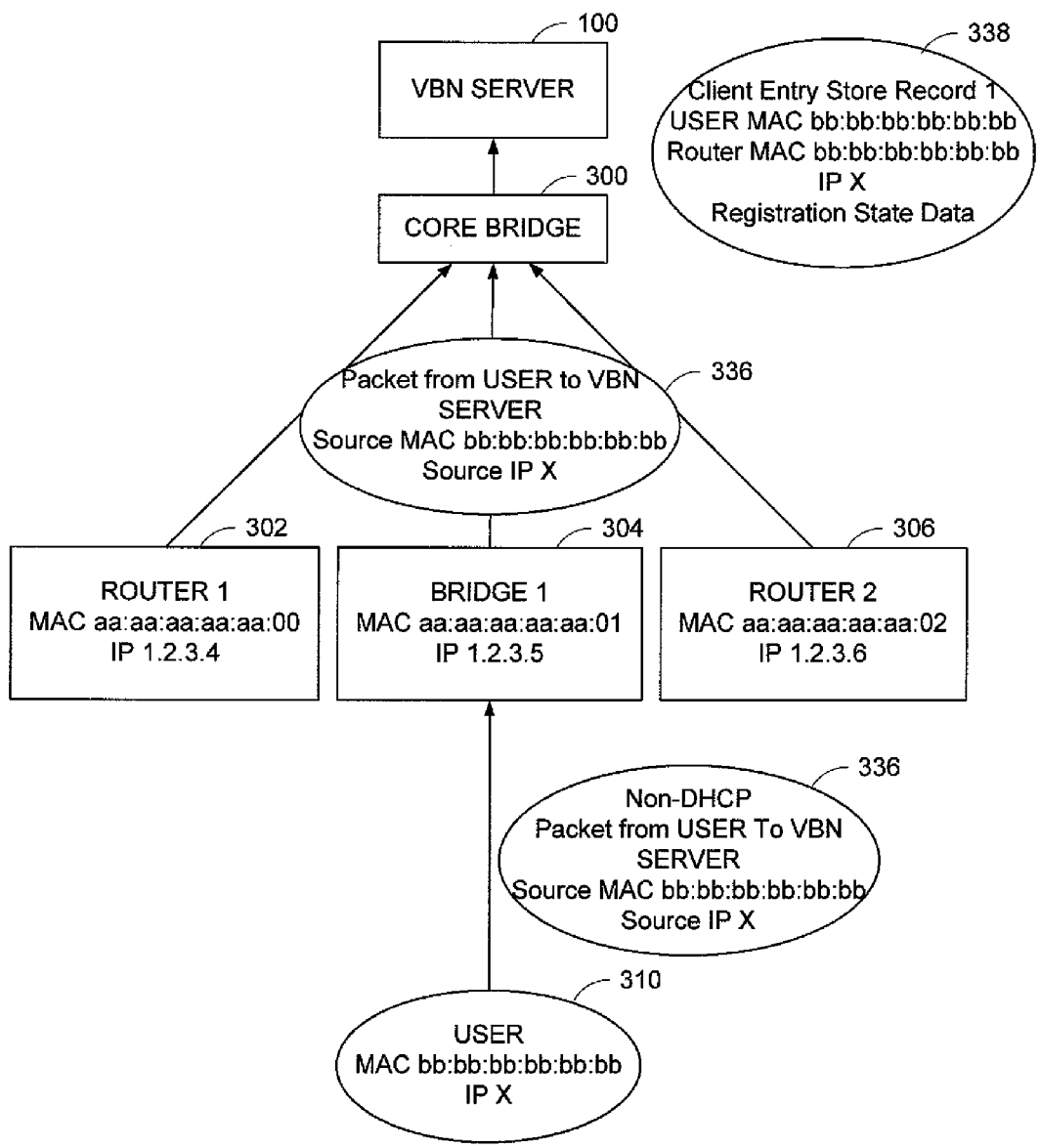
FIG. 15 is a diagram showing an example of a non-DHCP packet flow.

FIG. 15 shows the scenario where the user 310 sends a non-DHCP packet, when the user's DHCP module has not yet expired or abandoned its original DHCP lease.

As shown in FIG. 15, this non-DHCP packet 336 is stamped with source addresses of the user's MAC address and IP address X. This IP address X is the one obtained from behind Router 1.

In the VBN server 100, the packet driver module 160 receives this packet 336 in its original form, because Bridge 1 does not alter the packet's source addresses. The packet driver module 160 updates the user's existing record 338 in the client entry store 120 by setting the record's router MAC address, which is Router 1's MAC address aa:aa:aa:aa:aa:00, to the packet's source MAC address bb:bb:bb:bb:bb:bb, which is the MAC address of the user, and process the packet as normal.

However, any response from the VBN server 100 to a non-DHCP packet does not arrive at the user 310, because the user 310 is still using the IP address X that it obtained behind Router 1, and VBN server 100 routes all traffic destined to that IP address X to Router 1. The user 310 therefore cannot establish network connectivity until it requests and obtains a new IP address, according to the standard DHCP protocol, by sending a DHCP DISCOVER packet to the VBN server 100, as described referring to FIG. 13.

For moving from Bridge 1 to Router 2, the user 310 physically disconnects from subnetwork behind Bridge 1, and connects to subnetwork behind Router 2.

The user 310 outputs, as the first packet after the new connection, one of three types of packet: DHCP REQUEST packet, DHCP DISCOVER packet and non-DHCP packet.

The user 310 issues a DHCP REQUEST packet in an automatic attempt to retain the IP address X2 that was obtained behind Bridge 1. This packet is stamped with source addresses of the user's MAC address and user's current IP address.

In this example, Router 2 possesses a DHCP Relay mechanism, and thus, the DHCP packet is relayed to the VBN server 100, but the packet's source addresses are set to Router 2's MAC address and IP address. If Router 2 possesses a DHCP Forwarding mechanism, then the DHCP packet is relayed to the VBN server 100, but the packet's source MAC address is set to that of Router 2. If Router 2 lacks both a DHCP Relay and DHCP Forwarding mechanism, then the DHCP REQUEST packet is dropped, because the source IP address X2 of that packet is not one which Router 2 is configured to route.

If VBN server 100 does receive the DHCP REQUEST packet, in the VBN server 100, the DHCP request handler 140 attempts to find a matching entry, for the user's MAC and IP addresses, within the client entry store 120, and locates the entry which was created to represent the end-user behind Bridge 1. However, no response packets from the VBN server 100 reaches the end-user behind Router 2, because the VBN server 100 is not routing packets to the bridged IP address X2 through Router 2. The end-user is therefore forced to abandon the bridged IP address X2, and issue a DHCP DISCOVER packet in an attempt to obtain a suitable IP address.

Figure 16:
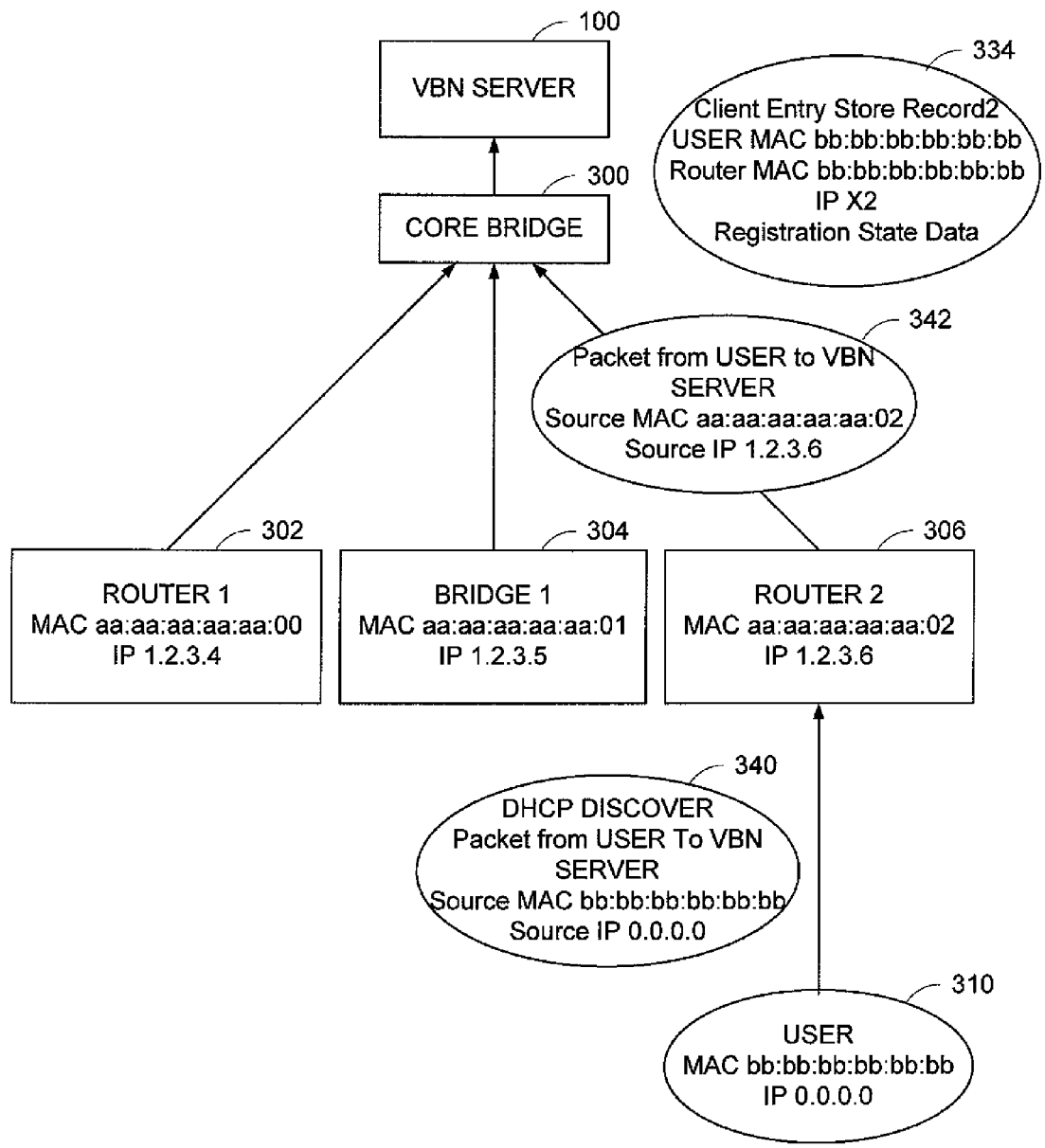
FIG. 16 is a diagram showing an example of another user traversal of routing realm and a DHCP discover packet flow.

The user 310 issues a DHCP DISCOVER packet 340, if the user's DHCP module has either expired its original DHCP lease, or has lost network connectivity long enough to prematurely abandon it, as shown in FIG. 16.

In this example, Router 2 possesses a DHCP Relay mechanism, and thus, the DHCP packet 342 is relayed to the VBN server 100, but the packet's source addresses is set to Router 2's MAC address and IP address. If Router 2 possesses a DHCP Forwarding mechanism, then the DHCP packet is relayed to the VBN server 100, but the packets source MAC address is set to that of Router 2.

Figure 17:
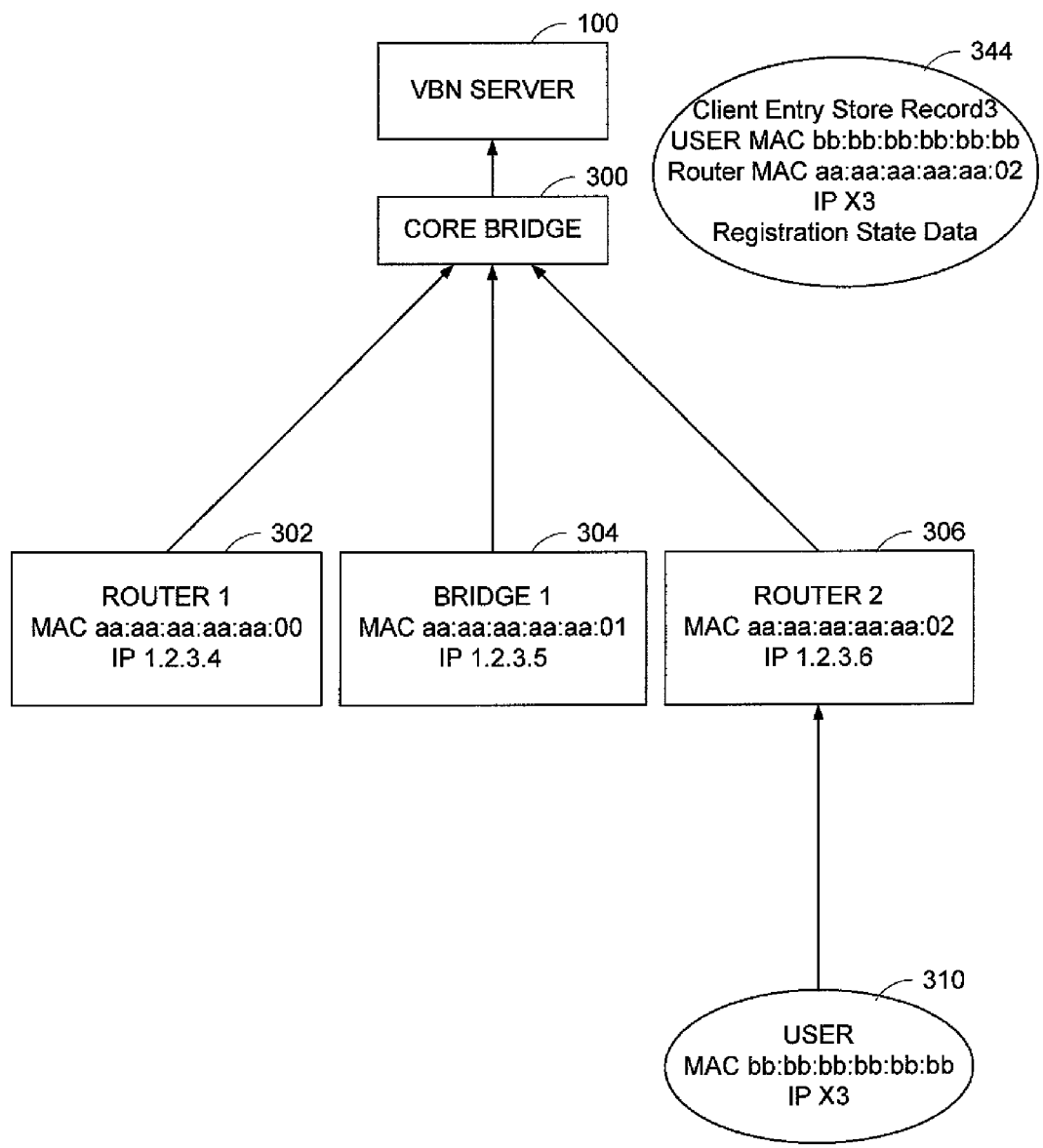
FIG. 17 is a diagram showing an example of a client entry store record.

In the VBN server 100, the DHCP request handler 140 receives a user IP address of 0.0.0.0, because this is a DHCP DISCOVER packet. The DHCP request handler 140 looks up if there is a pre-existing valid record which possesses a user MAC address equal to the end-user MAC address chaddr of the DHCP packet according to step 201 in FIG. 9. The pre-existing valid entry P for this user reflects the user's previous location behind Bridge 1, and possesses a router MAC address equal to the MAC address of Bridge 1. However, the source MAC address of this DHCP packet is equal to the user's own MAC address, and does not match the pre-existing record P. Thus, the DHCP request handler 140 does not find a matching record. Accordingly, the DHCP request handler 140 therefore creates a new record 344 in the client entry store 120, using a newly allocated IP address X3 which is suited to the subnetwork behind Router 2, as shown in FIG. 17. The new record 344 contains user MAC bb:bb:bb:bb:bb:bb, router MAC aa:aa:aa:aa:aa:02, and the allocated IP X3. The end-user 310 is provisioned with this IP address X3 according to the DHCP protocol.

The user 310 issues a non-DHCP packet, if the user's DHCP module has not yet expired or abandoned its original DHCP lease.

This packet originates from the end-user's IP address X2, which was obtained behind Bridge 1. Router 2 is not configured to route this IP address X2, and thus, this packet is dropped by Router 2. The end-user 310 is forced to issue a DHCP DISCOVER packet in order to re-establish network connectivity.

For moving from Router 2 to Router 1, the user 310 physically disconnects from subnetwork behind Router 2, and physically connects to subnetwork behind Router 1.

The user 310 outputs, as the first packet after the new connection, one of three types of packet: DHCP REQUEST packet, DHCP DISCOVER packet and non-DHCP packet.

The user 310 issues a DHCP REQUEST packet, in an automatic attempt to retain the IP address X3 that was obtained behind Bridge 1. This packet is stamped with source addresses of the user's MAC and user's current IP address.

In this example, Router 1 possesses either a DHCP Relay mechanism. In either case where Router 1 possesses a DHCP Relay mechanism or a DHCP Forwarding mechanism, Router 1 sends this DHCP REQUEST packet to the VBN server 100. If Router 1 does not posse either a DHCP Relay mechanism or a DHCP Forwarding mechanism, this packet is blocked by Router 1, because the packet's source IP address X3 is not one which Router 1 is configured to route.

The VBN server 100 receives a DHCP Relayed or DHCP Forwarded DHCP REQUEST packet. In the VBN server 100, the DHCP request handler 140 attempts to find a matching entry within the client entry store 120, and locates the entry which was created to represent the end-user behind Router 2. However, no response packets from the VBN server 100 reaches the end-user behind Router 1, because VBN server 100 is not routing packets destined to that IP address X3 through Router 1. The end-user 310 is therefore forced to abandon the IP address X3 that it received behind Router 2, and issues a DHCP DISCOVER packet in an attempt to obtain a suitable IP address.

Figure 18:
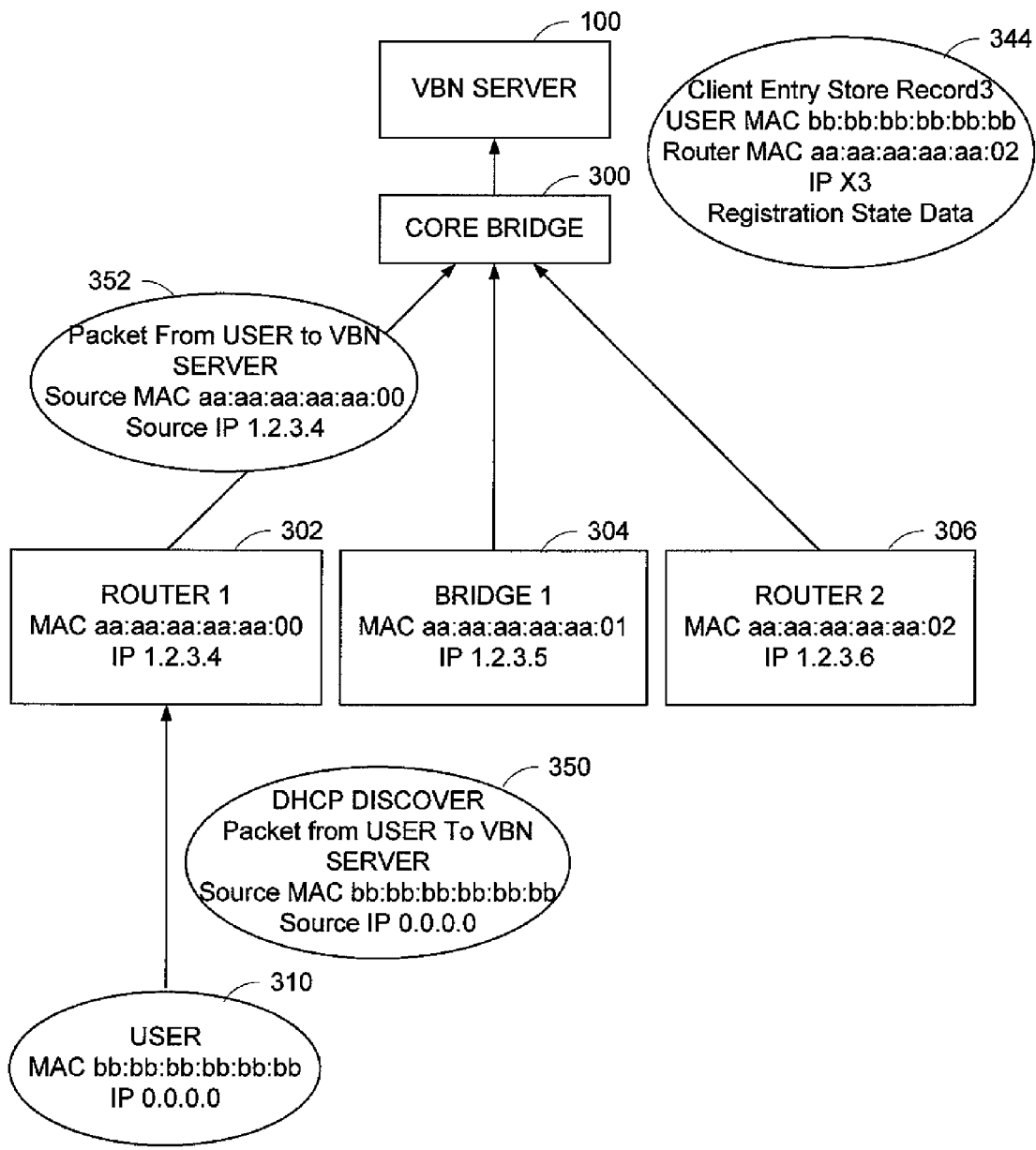
FIG. 18 is a diagram showing an example of another user traversal of routing realm and a DHCP discover packet flow.

The user 310 issues a DHCP DISCOVER packet 350, as shown in FIG. 18, if the user's DHCP module has either expired its original DHCP lease, or has lost network connectivity long enough to prematurely abandon it. This packet 350 is stamped with the user's MAC address, and the user's current IP address, which is the user's original IP address set to 0.0.0.0, in accordance with the DHCP protocol.

In this embodiment, Router 1 possesses a DHCP Relay mechanism. In either case where Router 1 possesses a DHCP Relay mechanism or a DHCP Forwarding mechanism, Router 1 sends the DHCP DISCOVER packet 352 to the VBN server 100. If Router 1 does not posse either a DHCP Relay mechanism or a DHCP Forwarding mechanism, this packet is blocked by Router 1, because the packet's source IP address is not one which Router 1 is configured to route.

Figure 19:
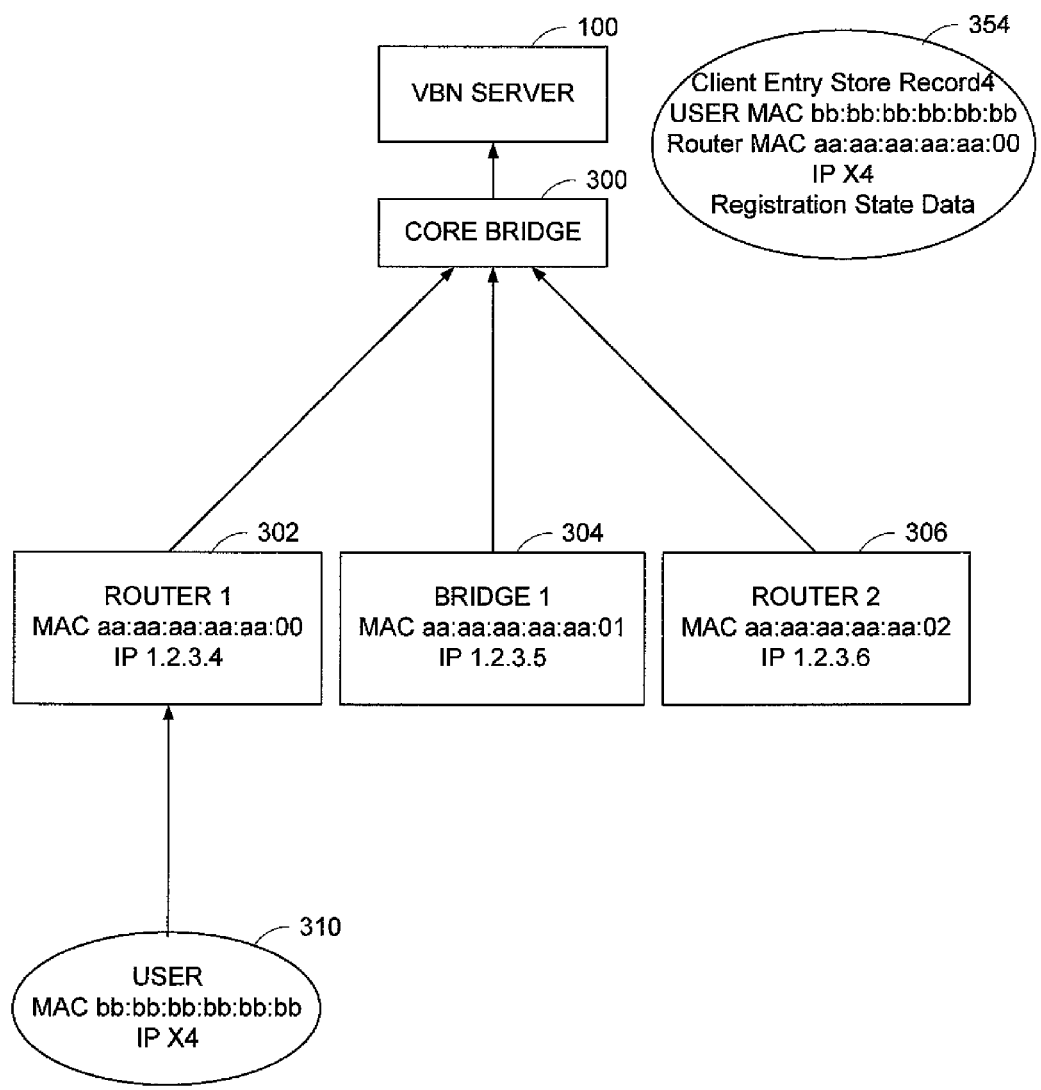
FIG. 19 is a diagram showing an example of a client entry store record.

If the VBN server 100 receives the DHCP DISCOVER packet 352, then the DHCP request handler 140 attempts to create a new record 354 in the client entry store 120, as shown in FIG. 19, based upon the source MAC address, and using a newly allocated IP address X4 suited to Router 1. The new record 354 contains user MAC bb:bb:bb:bb:bb:bb, router MAC aa:aa:aa:aa:aa:00, and the allocated IP X4. This new IP address X4 is returned to the end-user 310 according to the DHCP protocol.

The user 310 issues a non-DHCP packet, if the user's DHCP module has not yet expired or abandoned its original DHCP lease. This packet is stamped with source addresses of the user's MAC address and current IP address.

Router 1 drops this packet, because the end-user's IP address X3, which was obtained behind Router 2, is not one which Router 1 is configured to route. The end-user 310 is therefore forced to issue a DHCP DISCOVER packet in order to re-establish network connectivity.

Therefore, the VBN server 100 as a single VBN server is capable of recognizing and automatically handling the movement of an end-user across a layer-2/layer-3 or layer-3/layer-3 subnetwork boundary, without requiring the end-user to re-register with the VBN server. The VBN server can automatically transfer an end-user's registration across routing realms, as the end-user roams between those realms. Thus, the VBN server can service a large and/or complex network, which consists of multiple routing realms.

Figure 20:
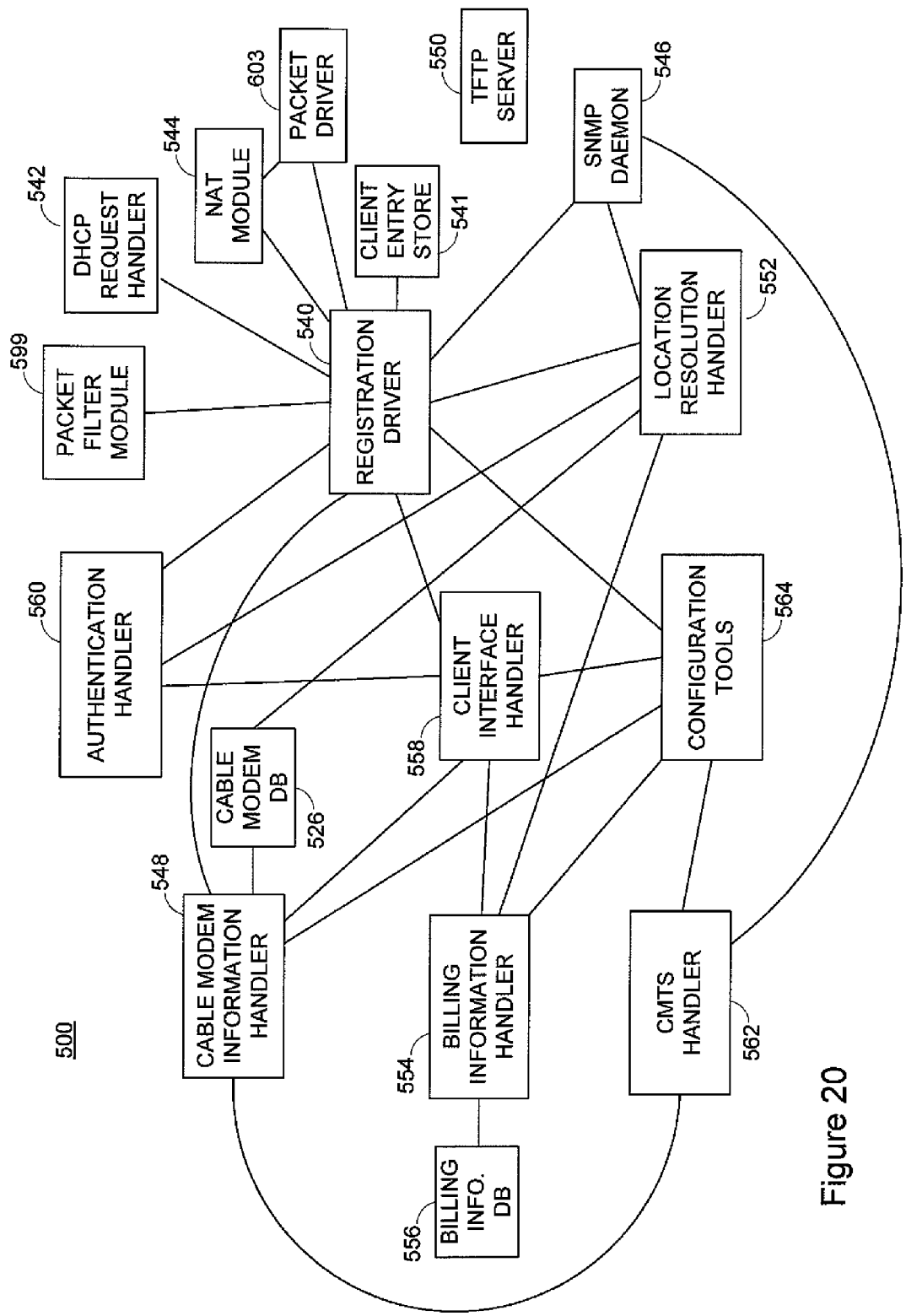
FIG. 20 is a diagram showing a VBN server in accordance with another embodiment of the invention.

FIG. 20 shows a VBN server 500 in accordance with another embodiment of the invention. Similar elements to those in the above embodiments are denoted using the same reference numbers for simplicity of the description.

The VBN server 500 provides coherent and seamless provisioning, authorization, and billing functionality to end users on the network, while it is capable of recognizing that an end-user has moved from one routing realm to another, reprovisioning that end-user appropriately, and as transparently as possible, and maintaining that end-user's original authorization/registration/billing state after the reprovisioning. The VBN server 500 is capable of handling mixed Layer-2 and Layer-3 network traffic.

This embodiment is described for an internal cable modem network operated by a multi-system operator (MSO). The cable modem network is a VBN for connecting roaming clients or user devices and routing client traffic. The cable modem network is a network that comprises cable modems and Cable Modem Termination Systems (CMTSs). The cable modem network provides connectivity to multiple cable modems through the CMTSs. Cable modems may be wired or wireless cable modems. CMTSs may be routing devices or bridging devices.

The VBN server 500 is provided at the cable head-end of the cable modem network in a central site of a cable company operating the cable modem network, typically in or near a cable company Network Operating Center (NOC) where CMTSs are provided. The VBN server 500 acts as a gateway to the Internet for the cable modem network.

FIG. 20 shows an example of components or functionalities of the VBN server 500.

The VBN server 500 has a registration driver 540, a client entry store 541, a DHCP request handler 542, a NAT module 544, packet driver 603, Simple Network Management Protocol (SNMP) daemon 546, a cable modem information handler 548, the cable modem database 526, a Trivial File Transfer Protocol (TFTP) server 550, a packet filter module 599, a location resolution handler 552, a billing data handler 554, a billing database 556, client interface handler 558, an authentication handler 560, a CMTS handler 562, and graphical tools 564. The VBN server 500 may have more or fewer elements in a different embodiment to provide various services.

The DHCP request handler 542 is similar to the DHCP request handler 140 described above. The DHCP request handler 542 assigns dynamic IP addresses to devices on the cable modem network, e.g., user devices and Cable Modems.

The client entry store 541 is similar to the client entry store 120 described above.

The registration driver 540 handles registration of user devices and manages address information and other information of registered and unregistered user devices stored in a client entry store 541.

The packet filter module 599 provides basic security blocking. It also intercepts web and email traffic for unregistered clients and initiates a redirection to the client interface handler.

The NAT module 544 enables the cable modem network to use one set of IP addresses for internal traffic and a second set of addresses for external traffic.

The SNMP daemon 546 manages the cable modem network by sending messages, called protocol data units (PDUs), to different parts of the network. SNMP-compliant devices, called agents, store data about themselves in Management Information Bases (MIBs) and return this data to the SNMP requesters.

The cable modem information handler 548 maps each cable modem to a physical location and stores the mapping information in the cable modem database 526. The cable modem mappings are further described below in detail. Also, it handles setting information relating to each cable modem, such as billing schedule and connection options, as described above.

The TFTP server 550 provides TFTP provisioning service and sends configuration files to cable modems. In conjunction with the DHCP request handler 542, the TFTP server 550 can be used to send different configuration files to different modems or groups of modems.

The location resolution handler 552 resolves physical locations of user devices.

The billing data handler 554 handles billing data of each user device and stores the billing data in the billing database 556.

The client interface handler 558 handles a client interface, such as presentation pages including registration pages and billing pages, for each local property based on the information and data handled by the cable modem information handler 548 and billing data handler 554.

The authentication handler 560 handles authentication of user devices based on the information and data handled by the registration driver 540 and cable modem information handler 548.

The CMTS handler 562 handles communication with CMTSs and information of CMTSs.

Graphical tools 564 including tools for allowing users to configure settings or modify information or data handled by other components, such as the cable modem information handler 548, billing data handler 554, CMTS handler 562 and registration driver 540. An example of tools 564 is a configuration tool that allows users to configure CMTS definition, the modem mapping, and address range assignment to routing CMTSs.

The VBN server 500 operates with multiple bridging and routing CMTSs connected to the VBN server 500 simultaneously. To this end, the VBN server 500 assigns specific user IP address ranges, cable modem IP address ranges and switch (maintenance) IP address ranges to each routing CMTS using the registration driver 540. A switch IP address is an IP address for a managed network device. The use of these IP addresses allows the VBN server 500 to assign router-aware addresses to user devices, modems, and network devices and thus allows operation of multiple routing CMTSs simultaneously.

Figure 21:
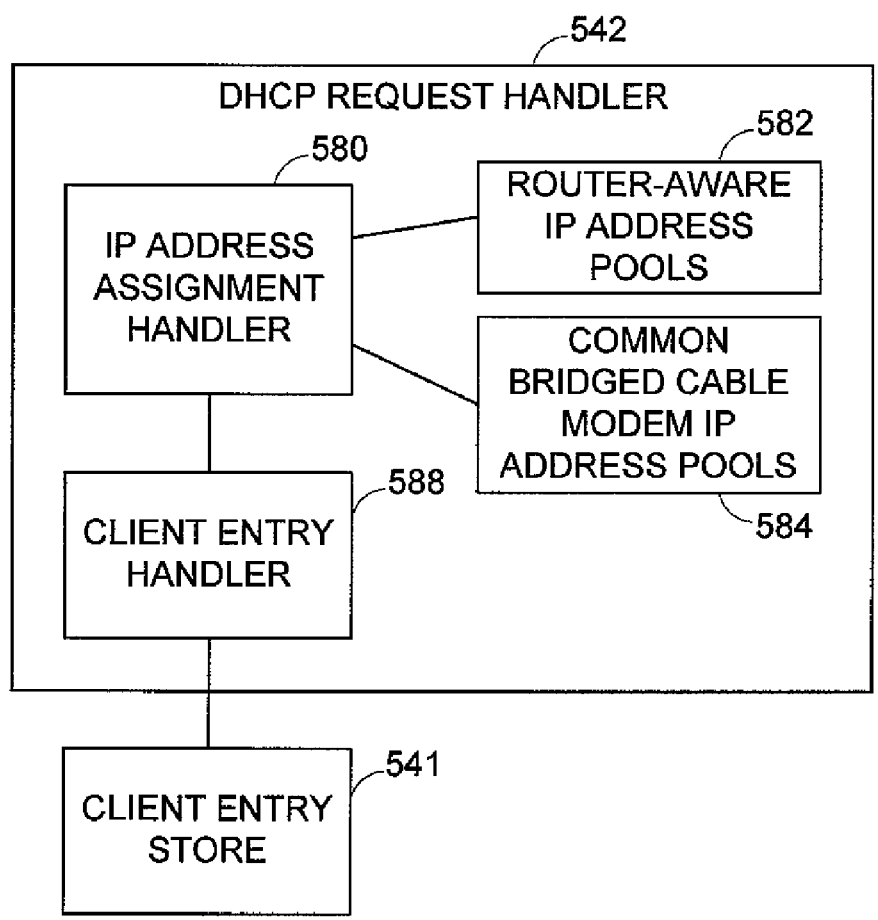
FIG. 21 is a block diagram showing another embodiment of a DHCP request handler

The DHCP request handler 542 of FIG. 20 is now described in detail. FIG. 21 shows an example of the DHCP request handler 542. The DHCP request handler 542 contains address assignment handler 580, router-aware address pools 582, a common bridged cable modem address pool 584, client entry handler 588, and a client entry store 541.

The address assignment handler 580 assigns IP addresses to user devices, cable modems and other network devices. Those IP addresses are selected from the user device, cable modem and switch IP address ranges that are associated with specific routing CMTSs.

The VBN server 500 supports multiple routing devices (routers), e.g., routing CMTSs. The address assignment handler 580 assigns router-aware IP addresses to network devices. A router-aware IP address is an address which can be assigned to a network entity behind a particular router.

Bridging CMTSs share a common pool 584 of cable modem IP addresses. The address assignment handler 580 assigns to bridged user devices IP addresses from standard bridged client IP address ranges, i.e., normal unrouted IP address ranges The IP address assignment is described in detail first for the CMTS operating in Bridging Mode.

A user IP address may be assigned as follows for a user device having a fixed or static IP address that is configured for a foreign network. When the user connects a user device to a cable modem and boots the user device, an Address Resolution Protocol (ARP) request is generated to see if this fixed IP address is already in use. The ARP request contains the fixed IP address and a MAC address of the user device. The network service management server picks up the ARP request and passes it to the packet driver 603. The packet driver 603 asks the registration driver 540 to look up this fixed IP address for the user MAC address. In this case, the registration driver 540 does not find a client entry having the user MAC address, and accordingly, the registration driver 540 transparently assigns to the user device a new IP address from the pool of IP addresses available for the user device. The packet driver 603 performs NAT on the ARP packet. The user device becomes an owner of the assigned IP address on the cable modem network. The registration driver 540 registers the user device using the assigned IP address with the option of using the user MAC address.

When the VBN server 500 receives a packet from the user device, the packet contains the fixed IP address of the user device and the user MAC address. The network service management server passes the packet to the packet driver 603. The packet driver 603 examines the packet and obtains the user MAC address. It looks up the client entry in the registration driver 540 using the user MAC address, and determines the assigned IP address associated with the MAC address. If the assigned IP address is different from the fixed IP address, the packet is NATed to include the assigned IP address, and then forwarded to the next stage for transmission to the destination.

When the network service management server receives a packet from the Internet, the packet is passed from the packet filters to an ARP handler (not shown). In this case, assume that the packet contains a user MAC address of the destined client. The ARP handler looks up the user MAC address. The packet is passed on to the packet driver 603 that looks up the client entry for the user MAC address and determines the assigned IP address associated with the user MAC address. It thus identifies the user device to which the packet is destined. If the assigned IP address is different from the fixed IP address of the user device, the packet driver 603 performs NAT on the packet so that the packet contains the fixed IP address. The packet is then transmitted to the user device.

Thus, the user device can use its fixed IP address to send and receive messages. The user does not need to change the IP address of the user device to connect to the cable modem network. The user can access Internet services through the cable modem network without changing the network configurations, e.g., the IP address.

The IP address assignment is now described in detail for the CMTS operating in Routing Mode.

The assignment of addresses in other scenarios and determination of the user MAC are further described below.

Some existing routing CMTSs use publicly addressable IP addresses, such as RealIP (trade-mark). The VBN server 500 supports those publicly addressable IP addresses, including RealIP to use with those routing CMTSs.

The address assignment handler 580 allows configuration of multiple, distinct router aware pools 582 of IP addresses by a system operator. Each router-aware IP address pool 82 comprises masqueraded and/or routable address ranges, and is assigned to a specific routing CMTS.

Graphical tools 564 shown in FIG. 20 includes a configuration tool which is used to define the router-aware user device, cable modem, switch address pools 582 and the bridged cable modem address pool 584. Also, graphical tools 564 include a tool which is used to define IP address ranges for each CMTS. Similar tools may also be provided in the registration driver 540.

When clients are registered, the client entry handler 588 updates the information of the clients in the client entry store 541.

Each client entry 68 is router-aware, i.e., contains a router MAC address. An IP packet has a source MAC address of the most recent router, regardless of how many routers that packet has traversed. The VBN server 500 considers the source MAC address of an IP packet to be the router MAC address of the client sending that packet. Thus, a router MAC address for a client is automatically and dynamically set to the source MAC in the most recent IP packet sent from the IP address of the client. Consequently, the VBN server 500 always knows if a client message is being routed (router MAC !=client MAC), and which router that the client is behind, or if the client is bridged (router MAC=client MAC).

Each IP packet also has a source IP address. The VBN server 500 considers the source IP address of the IP packet to be the client IP address. The VBN server 500 can determine the client MAC address by either examining DHCP packets sent from the client to the VBN server 500, or by querying a Management Information Base (MIB) on the router.

Thus, using such router-aware allocated IP addresses and other IP and MAC addresses, the VBN server 500 can detect traversal of user devices between routing realms formed by the CMTSs, and handle traffic of such roaming user devices.

Figure 22:
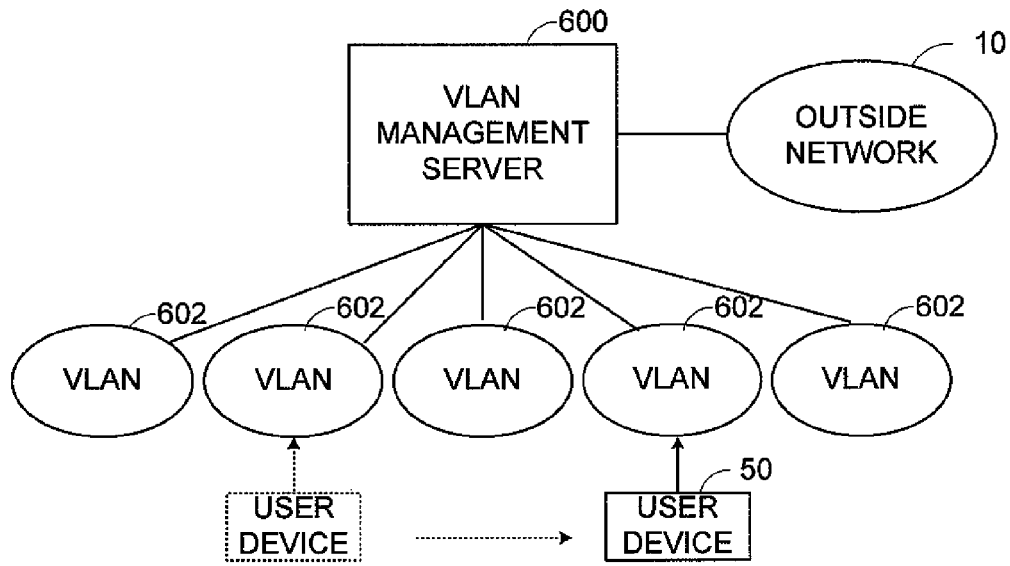
FIG. 22 is a block diagram showing an example of a network and a VLAN management server in accordance with another embodiment of the present invention.

Referring to FIG. 22, a VLAN management device or server 600 in accordance with another embodiment of the present invention is now described. In this embodiment, the VLAN management server 600 is capable of recognizing and handling an end-user device or client roaming between VLANs, as well as roaming between routing realms within a single LAN.

The VLAN management server 600 is provided between an outside network 10, e.g., the Internet, and multiple VLANs 602 behind the VLAN management server 600. Each VLAN 602 may be a VBN. Each VLAN 602 has a VLAN identification or VLAN id according to a standard process. The VLAN management server 600 can suitably use 802.1q VLAN ids or tags that follow a IEEE 802 standard process allowing multiple VLANs to transparently share the same physical network link.

The VLAN management server 600 assigns a new IP address to a client when it detects that the client traverses between VLANs 602 behind the VLAN management server 600. The VLAN management server 600 have assignable IP address ranges, each dedicated to a particular VLAN id, as well as a particular router. For example, address range A can be assigned only to clients which are being routed through router R1 and VLAN V1, and so on, as follows:

Range A router R1, VLAN V1
Range B router R1, VLAN V2
Range C router R2, VLAN V3
Range D router R1, VLAN V1

The VLAN management server 600 assigns to a client an IP address from any of these ranges if that client meets both the router and VLAN criteria. A range can also be dedicated to a default router and/or a default VLAN value, so that clients which do not match other ranges' criteria can still be assigned IP addresses. For example;

Range E any router, VLAN V1
Range F router R1, any VLAN
Range G any router or bridge, any VLAN
Range H any router or bridge, VLAN V2

The VLAN management server 600 detects VLAN traversals of the user device or client 50, and reassigns to the client 50 an IP address from a suitable address range. This VLAN roaming processing operates in cooperation with the router roaming processing, so that the VLAN management server 600 can detect any combination of VLAN and router roaming, and handle the roaming properly by configuring the appropriate assignable address ranges on the VLAN management server 600.

Figure 23:
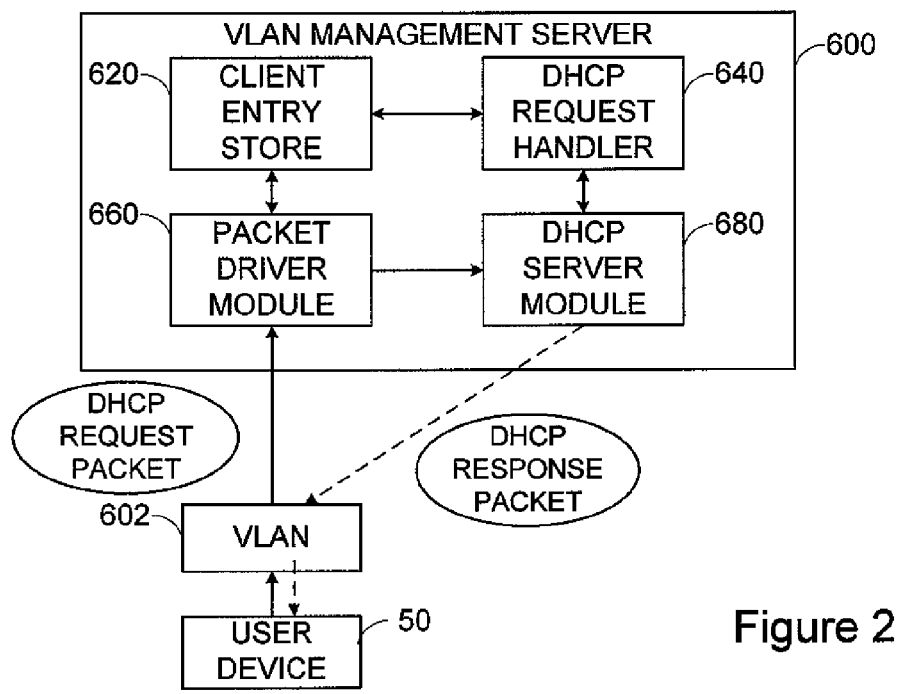
FIG. 23 is a diagram showing a data flow according to an embodiment of the VLAN management server.

FIG. 23 shows an embodiment of the VLAN management server 600, together with a relevant DHCP packet flow through the VLAN management server 600.

In this embodiment, the VLAN management server 600 comprises a client entry store 620, a DHCP request handler 640, a packet driver module 660 and a DHCP server module 680. The packet driver module 660 and the DHCP request handler 640 are inside the kernel, and the DHCP service module 680 is outside the kernel.

The client entry store 620 contains records representing network entities. Each record contains client MAC address, router MAC address, assigned client IP address, and client VLAN id.

A DHCP packet first goes through the packet driver module 660, which examines only its headers. The packet driver module 660 searches in the client entry store 620 for a record corresponding to the DHCP packet. If this is not a DHCP Relayed or Forwarded packet, then the packet driver module 660 creates a client entry store record corresponding to this DHCP packet, if no appropriate record already exists, or locates a pre-existing and appropriate record in the client entry store 620. If the packet driver module 660 creates a new client record, and a pre-existing inappropriate record has been located, then the packet driver module 660 copies the pre-existing record's registration data into the newly created record. During the creation of a new record, the packet driver module 660 assigns to the client a new IP address selected from one of the predefined address ranges based on the router MAC address and VLAN id in the packet.

The DHCP packet then reaches the DHCP service module 680, which sends the data from the packet's headers and the packet's DHCP payload into the DHCP request handler 640. The DHCP request handler 640 attempts to look up an existing client entry store record appropriate to the data it received, or to create an appropriate client entry store record. If it locates an existing appropriate record, the DHCP request handler 640 retrieves the assigned IP address from the appropriate record. If it creates a new record, the DHCP request handler 640 assigns to the client a new IP address selected from one of the predefined address ranges based on the router MAC address in the packet and VLAN id determined for the packet. The DHCP request handler 640 returns the assigned IP address from the appropriate client entry store record to the DHCP service module 680, which in turn sends that assigned IP address back to the client 50. If the DHCP request handler 640 creates a new client record, and a pre-existing inappropriate record is located, then the DHCP request handler 640 copies the pre-existing record's registration data into the newly created record.

Figure 24:
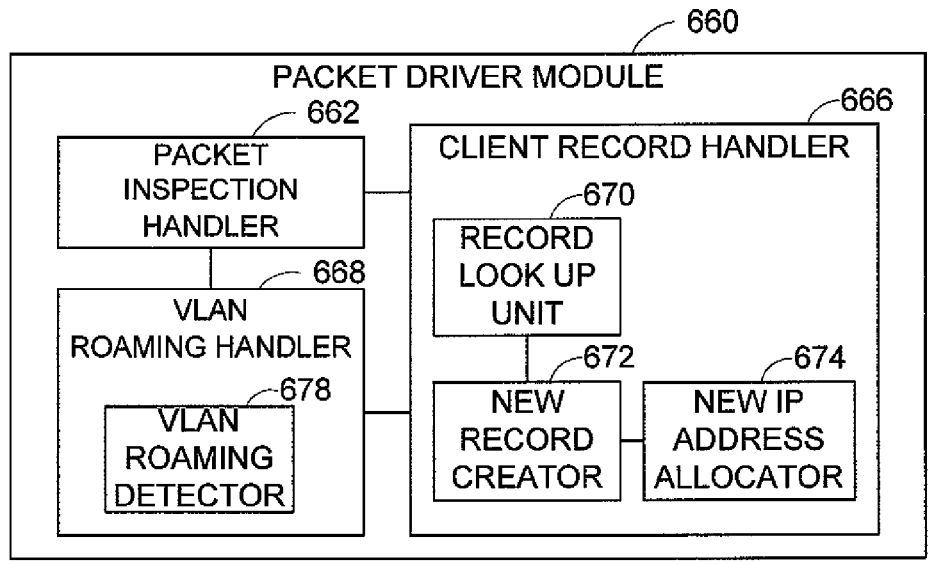
FIG. 24 is a block diagram showing an embodiment of a packet driver module of the VLAN management server.

Referring to FIG. 24, the packet driver module 660 is further described. In this embodiment, the packet driver module 660 comprises a packet inspection handler 662, a client record handler 666, and a VLAN roaming handler 668.

The packet inspection handler 662 examines headers of received packets. The packet inspection handler 662 obtains a source MAC address, source IP address, VLAN id of each packet.

The client record handler 666 has a record look up unit 670, a new record creator 672 and a new IP address allocator 674. The record look up unit 670 looks up entries in the client record store 620 to search an entry corresponding to each received packet. If there is no exiting corresponding record, the new record creator 672 creates a new record for the packet. The look up and creation of records are performed based on the source MAC address and source IP address of each packet. When the new record creator 672 creates a new record, the new IP address allocator 674 assigns to the client a new IP address from a suitable one of the allowable address ranges based on the VLAN id and the source MAC address.

The VLAN roaming handler 668 has a VLAN roaming detector 678. The VLAN roaming detector 678 detects VLAN traversal using the VLAN id included in the packet's header and a VLAN id in a located existing corresponding record, and causes the client record handler 666 to create a new record when VLAN traversal is detected.

By having these elements, the packet driver module 660 can create or look up entries using the packet's source MAC address and/or source IP address. Therefore, in most cases, the packet driver module 660 can create a record, if no suitable record already exists, or locate a suitable pre-existing record, within the client entry store 620 based upon the data contained within the headers of a DHCP packet, before that packet reaches the DHCP request handler 640.

However, if the packet is a DHCP Relayed DHCP packet, which possesses a source MAC address and a source IP address of the Relaying device, then the creation or location of a client entry store record by the packet driver module 660 reflects only the DHCP Relaying device, not the client which originated the DHCP packet. For those DHCP Relayed packets, the DHCP request handler 640 is responsible for creating or locating a record which represents the client because the client is identified only within the DHCP packet's payload.

If the packet is a DHCP Forwarded packet, or a non-DHCP routed packet, which both possess a source MAC address of the Forwarding device and a source IP address of the client, the packet driver module 660 can locate or create a client entry if the packet's source IP address is not zero, i.e., if the packet is not a DHCP DISCOVER packet.

If the packet driver module 660 locates a client record, then the packet driver module 660 can also detect and handle the client's VLAN roaming, because the packet driver module 660 has access to the packet's VLAN id, and the record's VLAN id. When the VLAN roaming handler 668 detects a clients VLAN traversal, the record handler 666 of the packet driver module 660 creates a new client record which reflects the client's new VLAN, copies the registration settings from the client's old record into the new record, and then invalidates the old record. During the creation of the new entry, the packet driver module 660 allocates a new IP address to that entry.

The DHCP request handler 640 receives the packet shortly after the packet driver module 660 sees it, and locates and uses the new record created by the packet driver module 660. The assigned IP address in the new record is subsequently sent to the user by the DHCP server module 680 in accordance with the DHCP protocol. Until the DHCP protocol allows the transmission to the user, the assigned IP address may be considered to be held ready for transmission to the user.

If the packet driver module 660 cannot locate an existing client record because the packet is a DHCP Relayed packet, then the DHCP request handler 640 is responsible for detecting and handling any VLAN traversal which may be indicated by this DHCP packet, as described below.

The packet driver module 660 does not attempt to detect or act upon a client's router roaming. The DHCP request handler 640 is always responsible for handling router roaming. Therefore, router roaming is always and only detected when the DHCP service module 680 of the VLAN management server 600 receives a client's DHCP packet. The router roaming handling by the DHCP request handler 640 is further described below using a user scenario.

Figure 25:
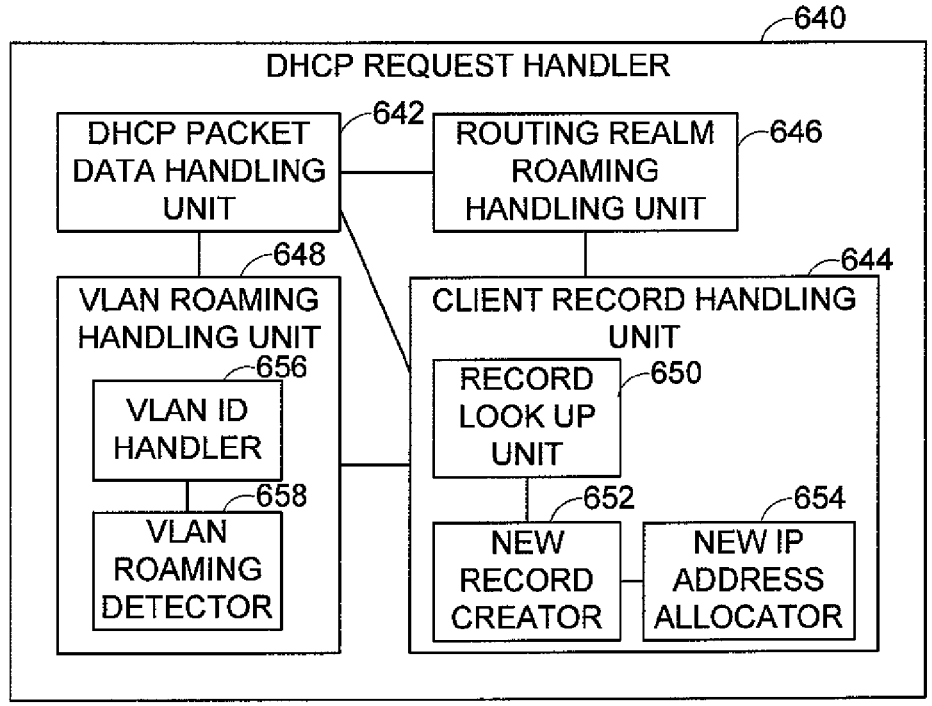
FIG. 25 is a block diagram showing an embodiment of a DHCP request handler of the VLAN management sever.

Referring to FIG. 25, the DHCP request handler 640 is further described. The DHCP request handler 640 in this embodiment comprises a DHCP packet data handling unit 642, a client entry store record handling unit 644, a routing realm roaming handling unit 646, and a VLAN roaming handling unit 648.

The DHCP packet data handling unit 642 accesses the DHCP packet and obtains its source MAC address, source IP address, and the contents of the DHCP payload, including the clients hardware address (chaddr) and client's current IP address (ciaddr).

The client record handling unit 644 has a record look up unit 650, a new record creator 652, and a new IP address allocator 654.

The record look up unit 650 looks up the records in the client entry store 620 for searching a client entry record corresponding to the received packet. If no corresponding client record is found, the new record creator 652 creates a new record.

The new IP address allocator 654, when the new record creator 652 creates a new record, selects a new IP address from one of the predetermined address ranges that corresponds to the VLAN where the client is currently in and the DHCP Relaying or Forwarding device through which the packet is received.

The routing realm roaming handling unit 646 detects and handles user device's roaming across routing realms within one of the LANs behind the LAN management server 600. The routing realm roaming handling unit 646 detects and handles in a similar manner as described above in the embodiment of the VBN server 100.

The VLAN roaming handling unit 648 has a VLAN id handler 656 and a VLAN roaming detector 658.

Since the DHCP packet data handling unit 642, unlike the packet inspection handler 662 of the packet driver module 660, does not have access to the VLAN id in the received DHCP packet, the VLAN id handler 656, when the DHCP request handler 640 receives DHCP Relayed or DHCP Forwarded packets, infers the data showing the VLAN id of the received packet from the registration driver entry which represents the relevant DHCP Relaying or DHCP Forwarding device. A DHCP Relayed or Forwarded packet always possesses the same VLAN id as the VLAN id of the DHCP Relaying or Forwarding device.

The VLAN roaming detector 658 examines the DHCP packet's source addresses and its chaddr, and determines if a DHCP packet has been DHCP Relayed or Forwarded. If the source MAC address and source IP address match those of a known DHCP Relaying device, and the chaddr does not match the source MAC address, then the VLAN roaming detector 658 determines that the packet has been DHCP Relayed. If the source MAC address matches that of a known router, and the source IP address does not match that of the router, and the chaddr does not match the source MAC address, then the VLAN roaming detector 658 determines that the packet has been DHCP Forwarded.

If the VLAN roaming detector 658 determines that a DHCP packet has been Relayed or Forwarded by a known device, then the DHCP request handler 640 assumes that the DHCP packet possessed a VLAN id equivalent to that of the Relaying or Forwarding device. Therefore, the VLAN roaming detector 658 can determine, as needed, what VLAN a client is currently in, e.g., for the creation of new client entries for DHCP Relayed and Forwarded clients, or determine if a client has traversed VLANs, e.g., after finding a pre-existing client entry for a DHCP Relayed or Forwarded client.

The existing client record selection by the DHCP request handler 640 is now further described. The DHCP request handler 640 can obtain a current entry, which has not been invalidated, for any client by searching for an entry which possesses a client MAC address that equals to chaddr of the received packet, since there can be only one current entry for each client MAC address.

If there is no such a pre-existing client entry record, then, if ciaddr is nonzero, the DHCP request handler 640 attempts to find an entry possessing a client assigned IP address that equals to ciaddr of the received packet. If such an entry is located, the DHCP request handler 640 updates that entry's client MAC address to be the chaddr. Thus, the VLAN management server 600 can support situations in which a routed client has sent the VLAN management server 600 non-DHCP traffic from a valid routed IP address, prior to sending DHCP traffic to the VLAN management server 600, so that the VLAN management server 600 has seen a non-DHCP packet with headers containing a source MAC address equal to the router MAC address, and a source IP address equal to the client's current IP address, and has created a corresponding client record.

Through these two pre-existing client entry lookups, if successful, the DHCP request handler 640 obtains a client record which does not necessarily reflect the client's current router and/or current VLAN, since these lookups do not consider router MAC addresses and/or VLAN ids. If the DHCP request handler 640 does find a pre-existing entry, then it compares that entry's router MAC address to the DHCP packet's source MAC address, and, if the DHCP packet has been Relayed or Forwarded, the DHCP request handler 640 also compares the VLAN id of the located client entry record to the packet's inferred VLAN id, i.e., the VLAN id of the entity registry entry which represents the DHCP Relaying or Forwarding device. If the pre-existing client entry's router MAC address and/or VLAN id does not match the DHCP packet's source MAC address and inferred VLAN id, then the DHCP request handler 640 invalidates the pre-existing client entry, and creates a new client entry.

The DHCP request handler 640 assigns a new IP address to the client and creates a new client record if there is neither an pre-existing client entry record possessing a client MAC address that equals to the chaddr of the received packet, nor a pre-existing record possessing a client assigned IP address that equals to the ciaddr of the received packet, or if the pre-existing record does not possess the appropriate router MAC address and/or VLAN id. The DHCP request handler 640 creates a new client entry record using the following values:

| Client Entry | DHCP Packet |
| --- | --- |
| client MAC: | chaddr |
| client assigned IP: | newly assigned IP address from appropriate range |
| client router MAC: | DHCP packet's source MAC address |
| client RAI MAC: | DHCP packet's RAI MAC address |
| client VLAN ID: | same as that of the record representing the DHCP Relaying or Forwarding device, else assumed to be 0 (no vlan) |

The DHCP request handler 640 uses the values of the router MAC address and VLAN id to determine from which address range the newly assigned IP address is obtained.

If the new entry is to supersede a pre-existing entry which possesses an incorrect router MAC and/or VLAN id, the DHCP request handler 640 invalidates the pre-existing entry, and copies its registration settings into the new entry.

As shown in FIG. 23, the DHCP request handler 640 sends a DHCP response packet to the client 50 via the VLAN 602 through the DHCP server module 680.

In the situation where the packet driver module 660 creates a client record from a DHCP packets headers, the DHCP request handler 640 simply retrieves that record and returns its assigned IP address to the client 50 via the DHCP protocol.

In the situation where the DHCP request handler 640 creates the client record from a DHCP packet's headers and payload, i.e. in the case of DHCP Relayed and DHCP Forwarded DHCP packets, the DHCP request handler 640 also returns that record's assigned IP address to the client 50 via the DHCP protocol.

In the situation where neither the packet driver module 660 nor the DHCP request handler 640 create a new client record, the DHCP request handler 640 looks up the appropriate pre-existing record, and returns its assigned IP address to the client 50 via the DHCP protocol.

The DHCP server module 680, when received a DHCP REQUEST packet, also checks if the assigned IP address is the same as the IP address which was being requested, and sends a DHCP Response packet or a DHCP NACK message to the client.

Referring to FIGS. 26-35, an example VLAN roaming end-user scenario is described. This scenario portrays the VLAN roaming handling features of the VLAN management server 600 in accordance with an embodiment of the invention. This example uses a simple network having two VLANs having bridges 902 and 904 at the top-level, a VLAN having a router 906 at the top-level, and the VLAN management server 600. These three VLANs 902-906 are connected to the VLAN management server 600 via a core bridge 300. An end-user device 310 can be connected to any of these VLANs.

Bridge 1 (902) possesses external (VLAN management server 600-side) MAC address aa:aa:aa:aa:aa:00 and IP address 1.2.3.4. Bridge 1 tags the client's outgoing traffic with 802.1q VLAN id tag "2". Bridge 2 (904) possesses MAC address aa:aa:aa:aa:aa:01 and IP address 1.2.3.5. Bridge 2 tags the client's outgoing traffic with 802.1q VLAN id tag "3". Router 1 (906) possesses external MAC address aa:aa:aa:aa:aa:02 and IP address 1.2.3.6. Router 1 tags the client's outgoing traffic with 802.1q VLAN id tag "4". The user device 310 possesses MAC address bb:bb:bb:bb:bb:bb, and a varying IP address.

Router 1 performs DHCP Relay or DHCP Forward upon DHCP packets which are sent from the user device 310 connected to VLAN 4. Bridges 1 and 2 do not perform neither DHCP Relay nor DHCP Forwarding.

Given this network, a client's roaming from VLAN 2 to VLAN 3 to VLAN 4 to VLAN 2 generates the following activity.

Figure 26:
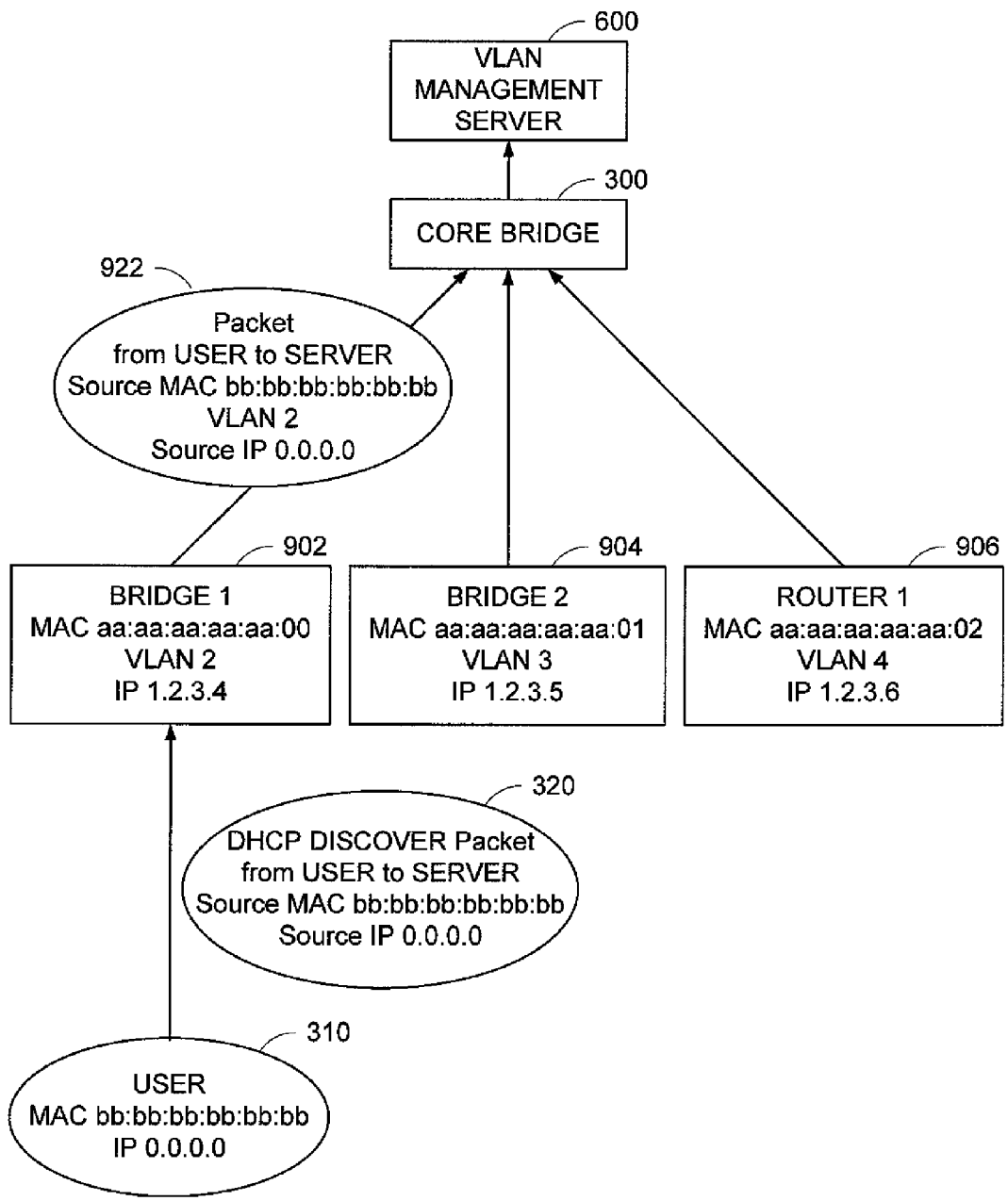
FIG. 26 is a diagram showing an example of a DHCP discover packet flow.

In order to obtaining an initial IP Address behind Bridge 1, the user device 310 physically connects to VLAN 2 behind Bridge 1, as shown in FIG. 26. The user device 310 issues a DHCP DISCOVER packet 320 to obtain an IP address. The headers of this packet 320 are stamped with the user's MAC address as the source MAC address, and the user's IP address as the source IP address, which is 0.0.0.0. The DHCP payload within the packet contains the users MAC address and the user's current IP address, 0.0.0.0.

The DHCP DISCOVER packet 320 is passed through Bridge 1. Bridge 1 tags the packet 320 with the VLAN id 2, and sends out a packet 922.

The packet driver module 660 of the VLAN management server 600 receives the DHCP DISCOVER packet 922 and examines its headers to determine the packet's source MAC and source IP addresses, and the packet's VLAN id. The packet driver module 660 attempts to find a client entry store record possessing a client MAC address equal to the packet's source MAC address bb:bb:bb:bb:bb:bb.

Figure 27:
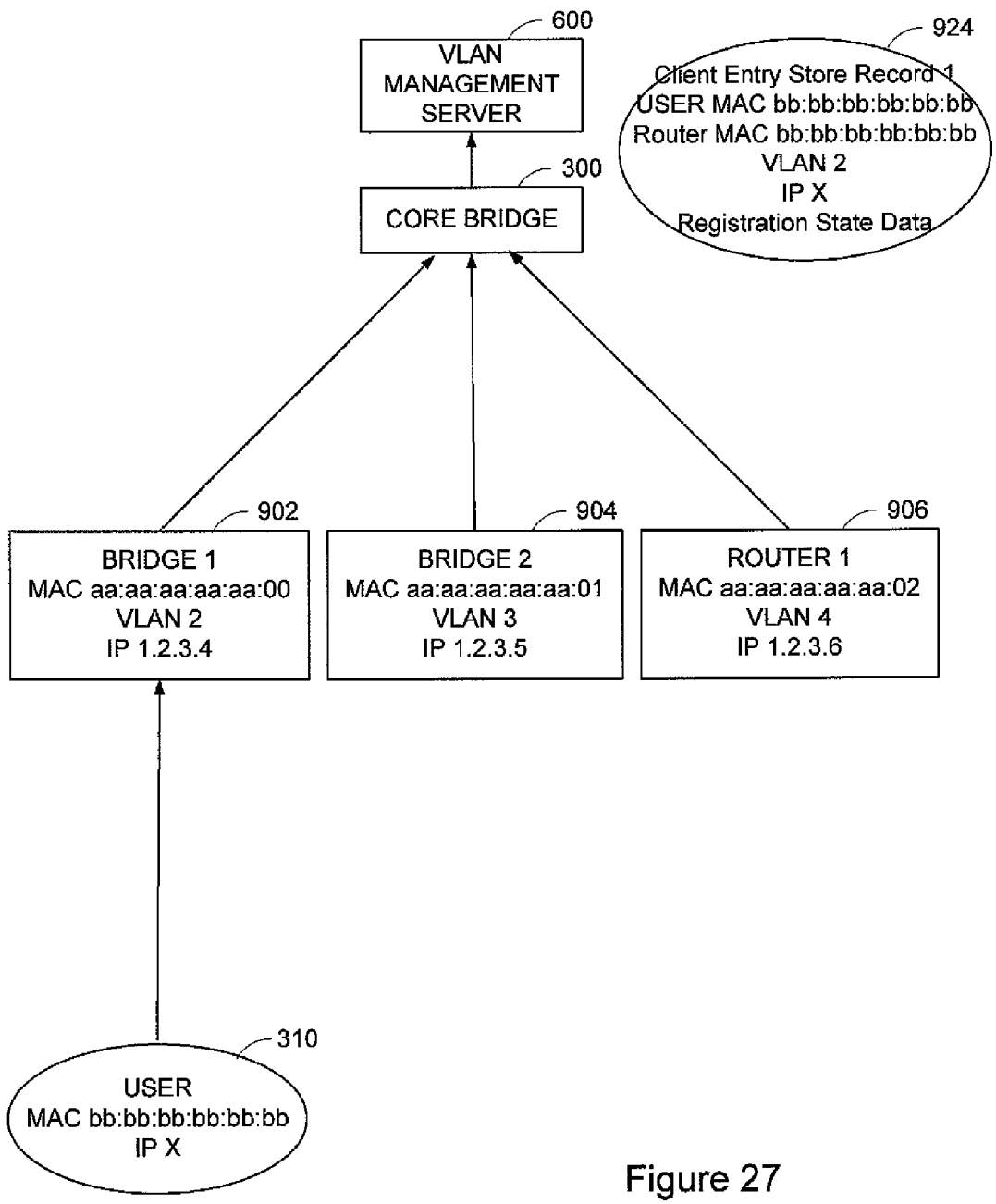
FIG. 27 is a diagram showing an example of a client entry store record.

If such a record exists, the packet driver module 660 compares that record's VLAN id to the packet's VLAN id 2. If the record's VLAN id does not match the packet's VLAN id, then the packet driver module 660 creates a new client record 924 possessing the new VLAN id 2, and copies the old record's registration settings into the new record, as shown in FIG. 27. During the creation of the new entry, the packet driver module 660 allocates a new IP address X to that entry. The old client record is invalidated.

If no such record exists, the packet driver module 660 creates a new record 924 possessing a client MAC address equal to the packet's source MAC address bb:bb:bb:bb:bb:bb. During the creation of the new entry, the packet driver module 660 allocates a new IP address X to that entry.

The DHCP server module 680 of the VLAN management server 600 receives the DHCP DISCOVER packet 922 and passes its contents to the DHCP request handler module 640.

The DHCP request handler module 640 finds the current client entry store record 924 which possesses a client MAC address equal to the DHCP packet's chaddr bb:bb:bb:bb:bb:bb, and returns that record's assigned UP address X to the DHCP server module 680.

The DHCP server module 680 returns the client's assigned IP address X to the user 310 in a DHCP response packet. Thus, the user 310 now possesses IP address X as shown in FIG. 27.

Figure 28:
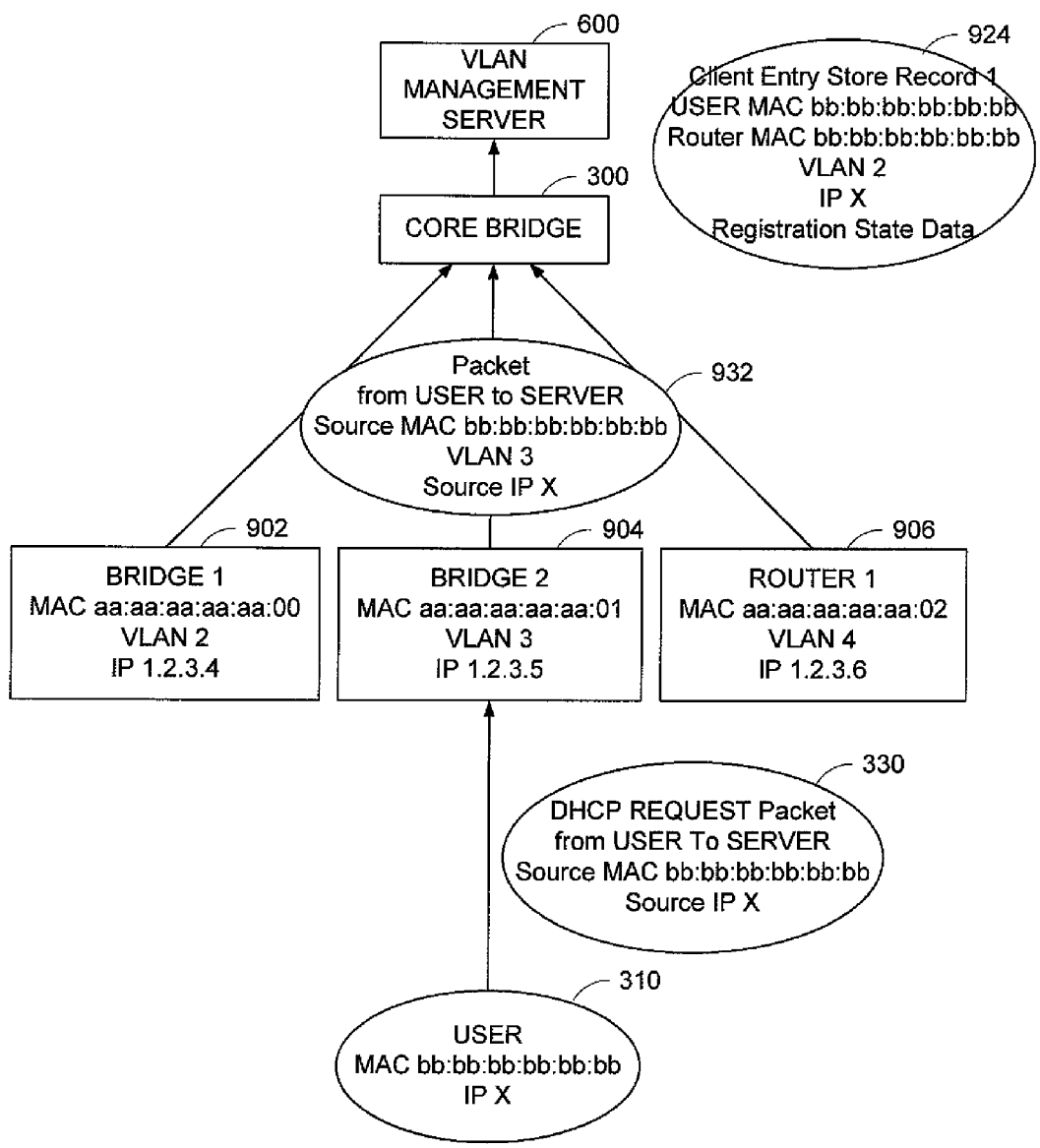
FIG. 28 is a diagram showing an example of a user traversal of VLANs and a DHCP request packet flow.

For moving from VLAN 2 to VLAN 3, the client 310 physically disconnects from VLAN 2 behind Bridge 1, and physically connects to VLAN 3 behind Bridge 2, as shown in FIG. 28.

The user 310 sends, as the first packet after the new connection, one of three types of packet through Bridge 2 to the VLAN management server 600: DHCP REQUEST packet, DHCP DISCOVER packet and non-DHCP packet.

FIG. 28 shows the case when the client 310 sends a DHCP REQUEST packet 330 in an automatic attempt to retain the IP address X that was obtained behind Bridge 1 of VLAN 2. The headers of this packet 330 are stamped with source addresses of the user's MAC address and user's current IP address X. Bridge 2 does not alter these source addresses, but it tags the packet 330 with a VLAN id of 3, which differs from the VLAN id of Bridge 1, VLAN 2. Bridge 2 sends out a packet 932.

Figure 30:
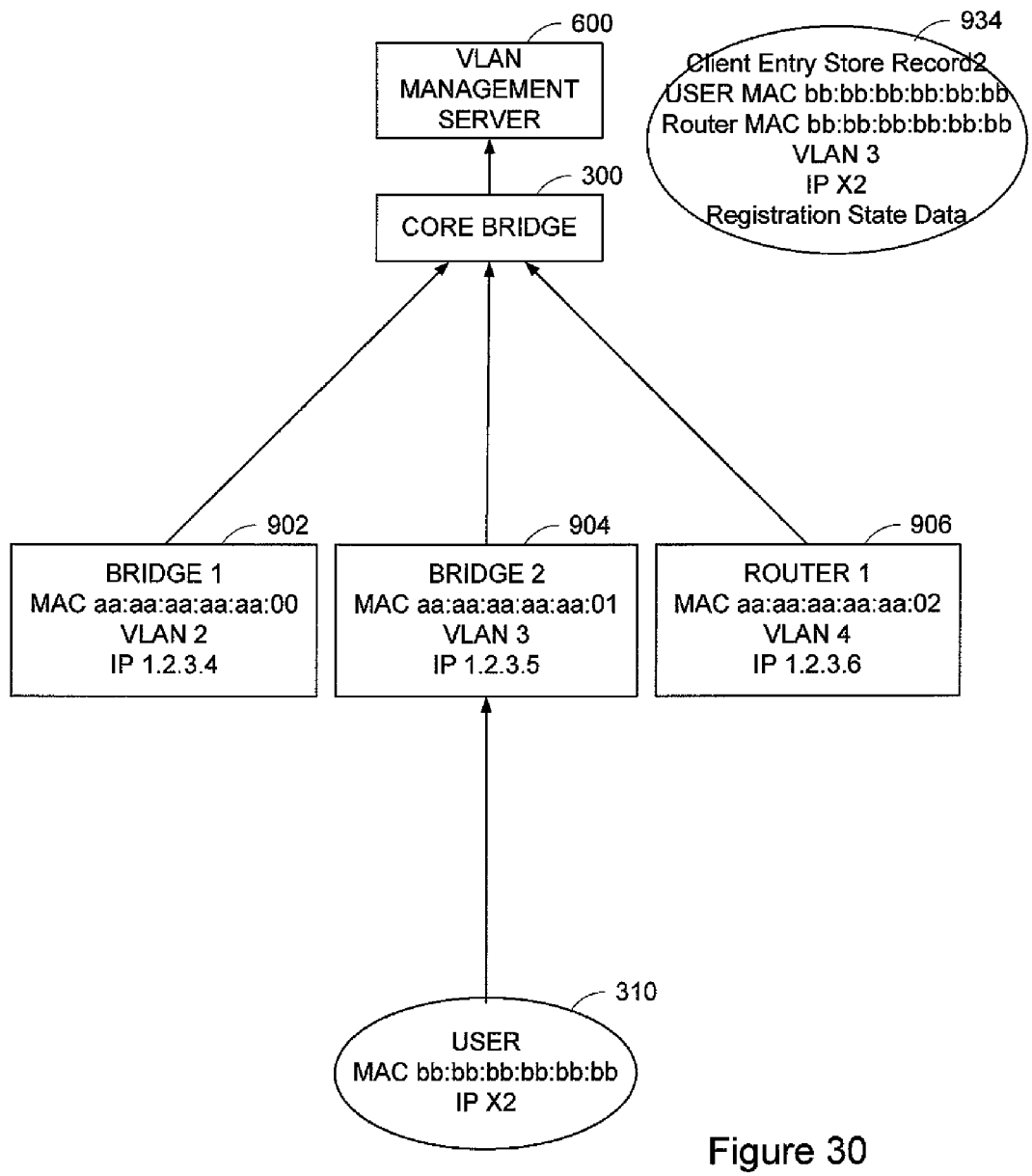
FIG. 30 is a diagram showing an example of a client entry store record.

The packet driver module 660 of the VLAN management server 600 receives the DHCP REQUEST packet 932, and determines the packet's source MAC address and source IP addresses, as well as its VLAN id. The packet driver module 660 looks up the existing client entry store record 924 for that MAC address bb:bb:bb:bb:bb:bb, and notices the difference between the record's VLAN id 2 and the packet's VLAN id 3. The packet driver module 660 consequently creates a new client entry store record 934 to reflect the new VLAN id 3, and copies the old record's registration settings into the new record 934, as shown in FIG. 30. During the creation of the new entry, the packet driver module 660 allocates a new IP address X2 to that entry. The old record 924 is then invalidated.

The DHCP server module 680 receives the DHCP REQUEST packet 932 and passes its data to the DHCP request handler 640. The DHCP request handler 640 finds the client entry store record 934 corresponding to the packet's chaddr, which is the same as the DHCP packet's source MAC address, bb:bb:bb:bb:bb:bb. The DHCP request handler 640 returns the record's assigned IP address X2 to the DHCP server module 680. In a case where the packet driver module 660 created a new record 934 for this client, this assigned IP address X2 is not the same address X which is being requested. In that case, then the DHCP server module 680 sends a DHCP NACK response to the client 310. The client 310 then issues a DHCP DISCOVER packet 332 to the VLAN management server 600 server, as shown in FIG. 29.

Figure 29:
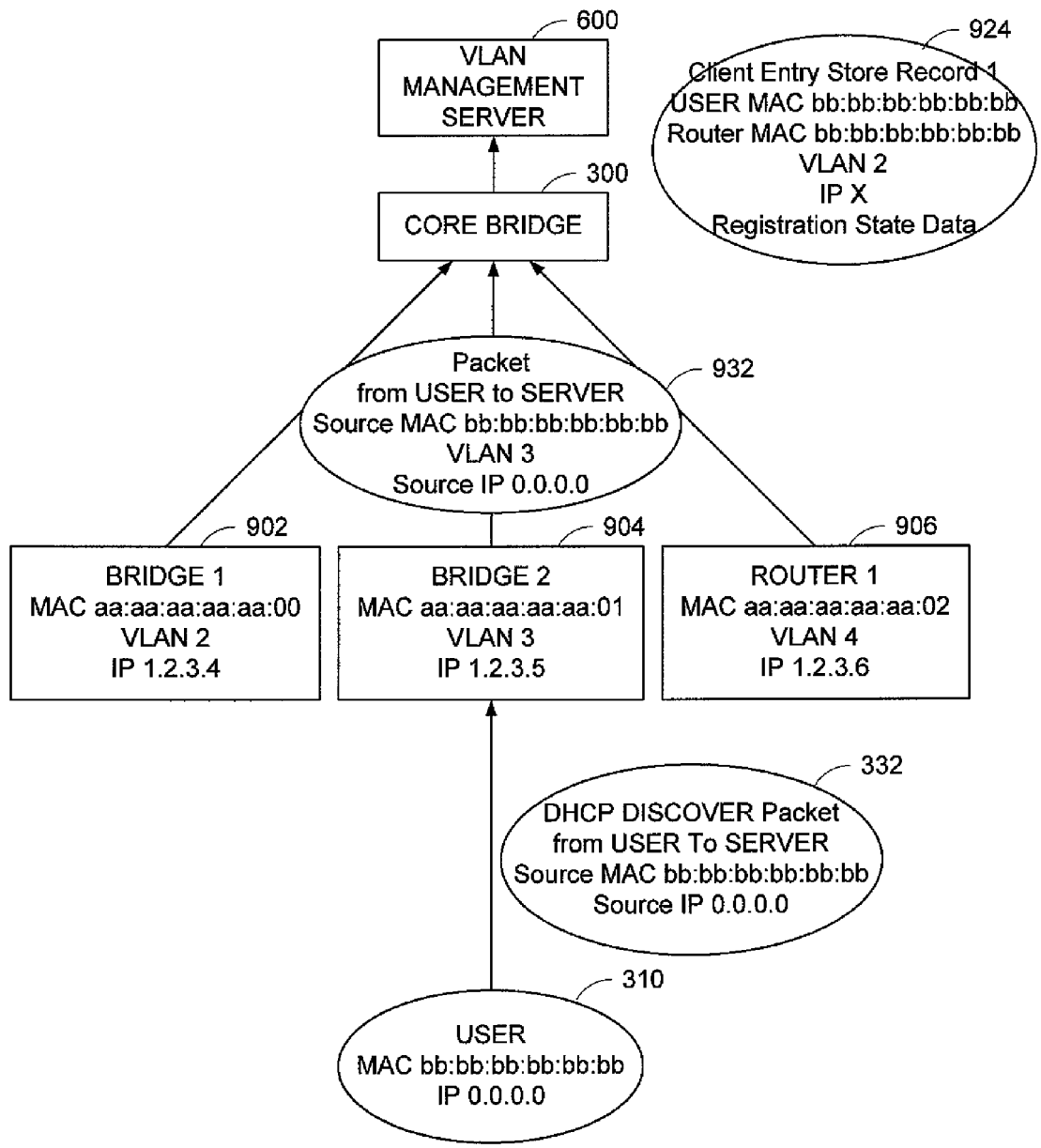
FIG. 29 is a diagram showing an example of a DHCP discover packet flow.

FIG. 29 shows the case where the client 310 issues a DHCP DISCOVER packet 332. The client 310 issues this packet 332 if the client's DHCP module has either expired its original DHCP lease, or has lost network connectivity long enough to prematurely abandon it. Thus, the clients IP address is 0.0.0.0.

The DHCP DISCOVER packet 332 is stamped with source addresses of the client's MAC address bb:bb:bb:bb:bb:bb, and current IP 0.0.0.0. The packet's DHCP payload also contains the clients MAC address and current IP ADDRESS. Bridge 2 does not alter the packet's addresses, but it tags the packet 332 with a VLAN id of 3, and sends out a packet 932.

The packet driver module 660 of the VLAN management server 600 receives the DHCP DISCOVER packet 932 and examines its headers to determine the packet's source MAC address and source IP addresses, and the packet's VLAN id. The packet driver module 660 finds the client record 924 which possesses a client MAC address equal to the packet's source MAC address bb:bb:bb:bb:bb:bb, and compares its VLAN id 2 to the VLAN id 3 of the packet. Since these VLAN ids differ, the packet driver module 660 creates a new client record 934 reflecting the new VLAN id 3, copies the registration settings from the old record 924 into the new record 934, as shown in FIG. 30, and then invalidates the old record 924. During the creation of the new entry, the packet driver module 660 allocates a new IP address X2 to that entry.

The DHCP server module 680 of the VLAN management server 600 receives the DHCP DISCOVER packet 932 and passes its contents to the DHCP request handler 640.

The DHCP request handler 640 finds the current client entry store record 934 which possesses a client MAC address equal to the DHCP packet's chaddr, and returns that record's assigned IP address X2 to the DHCP server module 680.

The DHCP server module 680 returns the client's assigned IP address X2 to the client in a DHCP response packet. Thus, the client 30 now possesses IP X2 as shown in FIG. 30.

Figure 31:
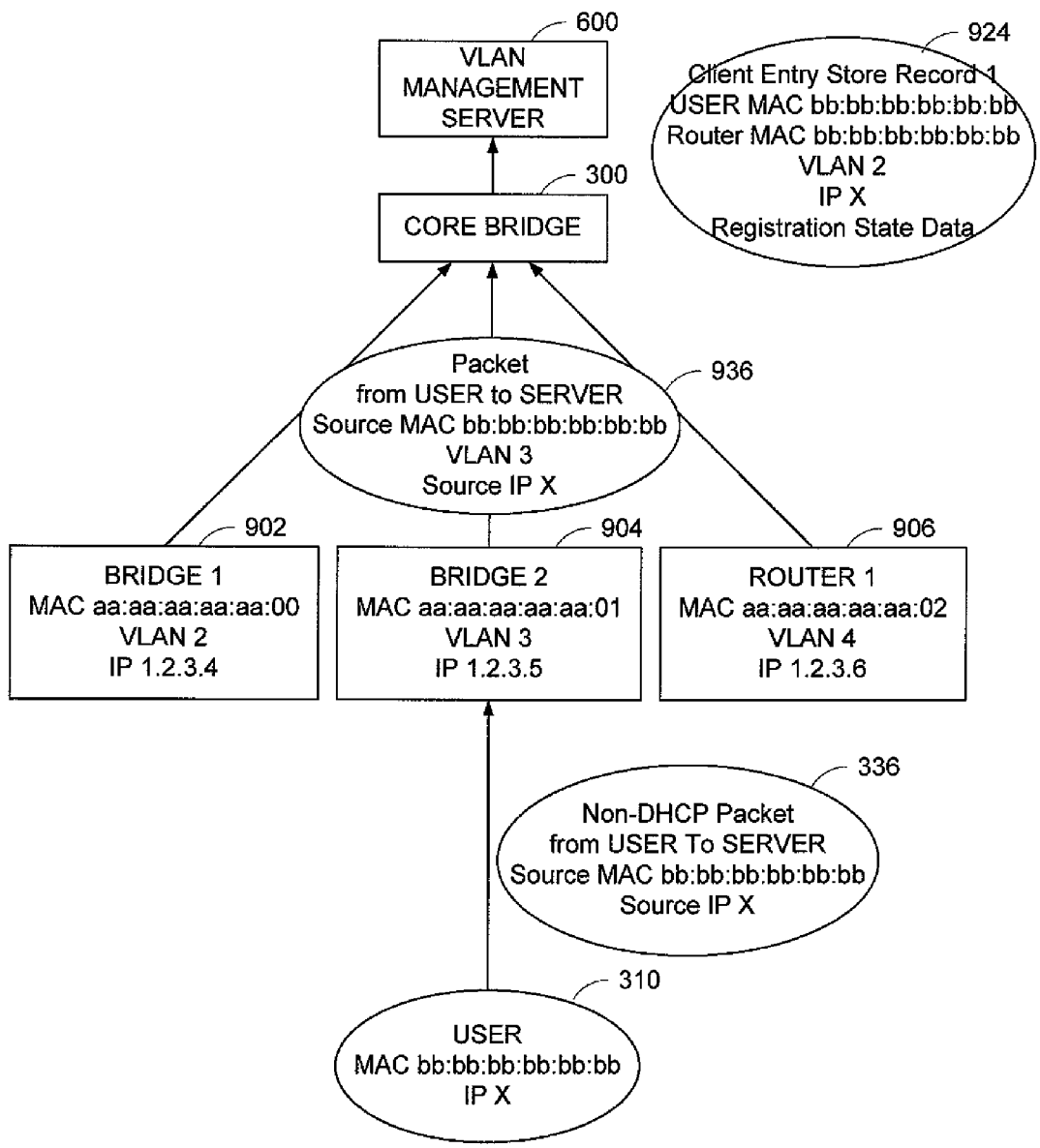
FIG. 31 is a diagram showing an example of a non-DHCP packet flow.

FIG. 31 shows the case where the client 310 issues a non-DHCP packet 336. The client issues this packet 336 if the client's DHCP module has not yet expired or abandoned its original DHCP lease. Thus, the client 310 has the IP address X that was assigned behind Bridge 1 of VLAN 2.

This packet 336 is tagged with the client's source MAC and IP addresses X. Bridge 2 tags the packet 336 with VLAN id 3 and sends out a packet 936.

The packet driver module 660 of the VLAN management server 600 receives the packet 936, and determines its source MAC and IP addresses, and its VLAN id. The packet driver module 660 finds the current client record 924 which possesses a client MAC address equal to the packet's source MAC address, and notices the difference between the record's VLAN id of 2 and the packet's VLAN id of 3. The packet driver module 660 consequently creates a new client entry store record 934 to reflect the new VLAN id, and copies the old record's registration settings into the new record 934. During the creation of the new record, the packet driver module 660 allocates a new IP address X2 to that record. The DHCP request handler 640 uses this new record by providing the record's assigned IP address to the DHCP server module 680 for transmission to the user as the DHCP protocol permits. The old record 924 is then invalidated.

Figure 32:
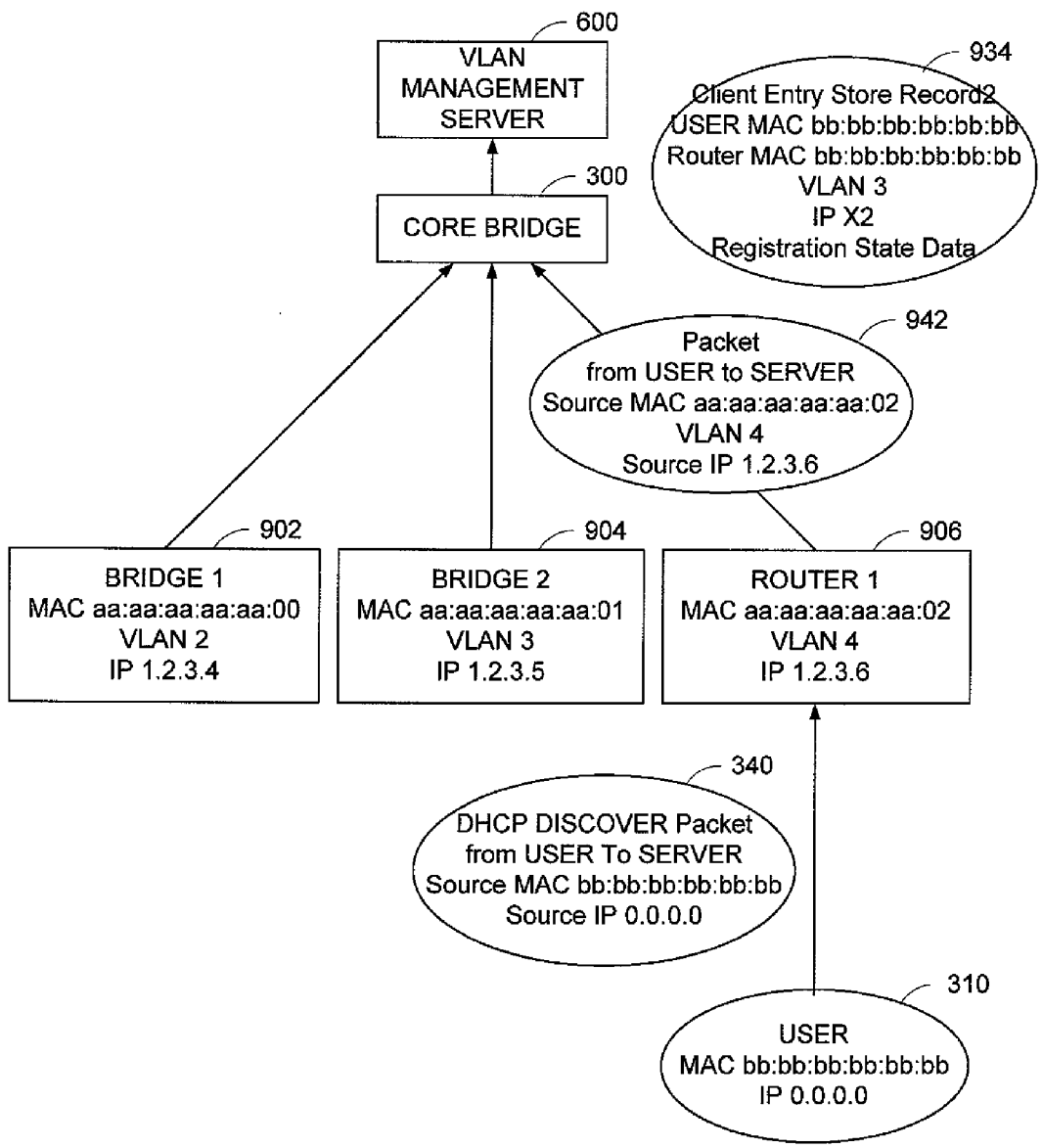
FIG. 32 is a diagram showing an example of another user traversal of VLANs and a DHCP discover packet flow.

For moving from VLAN 3 to VLAN 4, the client 310 physically disconnects from VLAN 3 behind Bridge 2, and connects to VLAN behind Router 1, as shown in FIG. 32.

The client 310 outputs, as the first packet after the new connection, one of three types of packet: DHCP REQUEST packet, DHCP DISCOVER packet and non-DHCP packet.

The client 310 issues a DHCP REQUEST packet in an automatic attempt to retain the IP address X2 that was obtained behind Bridge 1. This packet is stamped with source addresses of the user's MAC address and user's current IP address.

If Router 1 possesses a DHCP Relay mechanism, the DHCP packet is relayed to the VLAN management server 600, but the packet's source addresses are set to Router 1's MAC address and IP address. Router 1 also tags the packet with an 802.1q VLAN id of 4. If Router 1 possesses a DHCP Forwarding mechanism, then the DHCP packet is relayed to the VLAN management server 600, but the packet's source MAC address is changed to that of Router 1. Router 1 also tags the packet with an 802.1q VLAN id of 4. If Router 1 lacks both a DHCP Relay and DHCP Forwarding mechanism, then the DHCP REQUEST packet is dropped, because the source IP address X2 of that packet is not one which Router 1 is configured to route.

If the VLAN management server 600 receives the DHCP REQUEST packet, then the packet driver module 660 determines the packet's source MAC and IP addresses, and its 802.1q VLAN tag. The packet driver module 660 attempts to find an existing client entry store record possessing a client MAC address equal to the packet's source MAC address aa:aa:aa:aa:aa:02. Such an entry represents Router 1, and not the client which originated the DHCP packet.

The DHCP server module 680 receives the DHCP REQUEST packet from the packet driver module 660, and passes the packet's information to the DHCP request handler 640. The DHCP request handler 640 determines that this is either a Relayed or Forwarded DHCP packet, and obtains the VLAN id possessed by the client entry store record which represents that DHCP Relaying or Forwarding device (Router 1). The DHCP request handler 640 then looks up the existing entry 934 which possesses a client MAC address equal to the DHCP packet's chaddr bb:bb:bb:bb:bb:bb and/or an assigned equal to the DHCP packet's ciaddr X2. This entry 934 is the client's current entry, which was used behind Bridge 2. The client entry's router MAC address aa:aa:aa:aa:aa:aa and VLAN id 3 are compared to the packet's source MAC address bb:bb:bb:bb:bb:bb and the Relaying or Forwarding device's VLAN id 4. If either the records' router MAC address and VLAN id is incorrect, then the DHCP request handler 640 creates a new client record which reflects the current router MAC address and VLAN id. During the creation of the new record, the DHCP request handler 640 allocates a new IP address X3 to that record. The old client record 934 is invalidated, and its registration settings are copied into the new record.

The DHCP request handler 640 returns the current client entry record's assigned IP address to the DHCP server module 680. If this assigned IP address is not the same as the IP address which the client 310 requested, then the DHCP server module 680 responds to the client with a DHCP NACK packet. The client 310 then sends a DHCP DISCOVER message to the VLAN management server 600 server.

FIG. 32 shows the case where the client 310 sends a DHCP DISCOVER packet 340. The client 310 issues this packet 340 if the client's DHCP module has either expired its original DHCP lease, or has lost network connectivity long enough to prematurely abandon it. Thus, the client 310 possesses an IP address 0.0.0.0.

If Router 1 possesses a DHCP Relay mechanism, then the DHCP packet 340 is relayed to the VLAN management server 600 server, but the packet's source addresses is set to Router 1's MAC address and IP address. If Router 1 possesses a DHCP Forwarding mechanism, then the DHCP packet 340 is relayed to the VLAN management server 600 server, but the packet's source MAC address is set to that of Router 1. In either case, Router 1 tags the DHCP packet 340 with an VLAN id of 4 and sends out a packet 942.

When the VLAN management server 600 receives the DHCP DISCOVER packet 942, then the packet driver module 660 determines the packet's source MAC and IP addresses, and its 802.1q VLAN tag. The packet driver module 660 attempts to find an existing client entry store record possessing a client MAC address equal to the packet's source MAC address aa:aa:aa:aa:aa:02. Such an entry represents Router 1, and not the client 310 which originated the DHCP packet 340.

Figure 33:
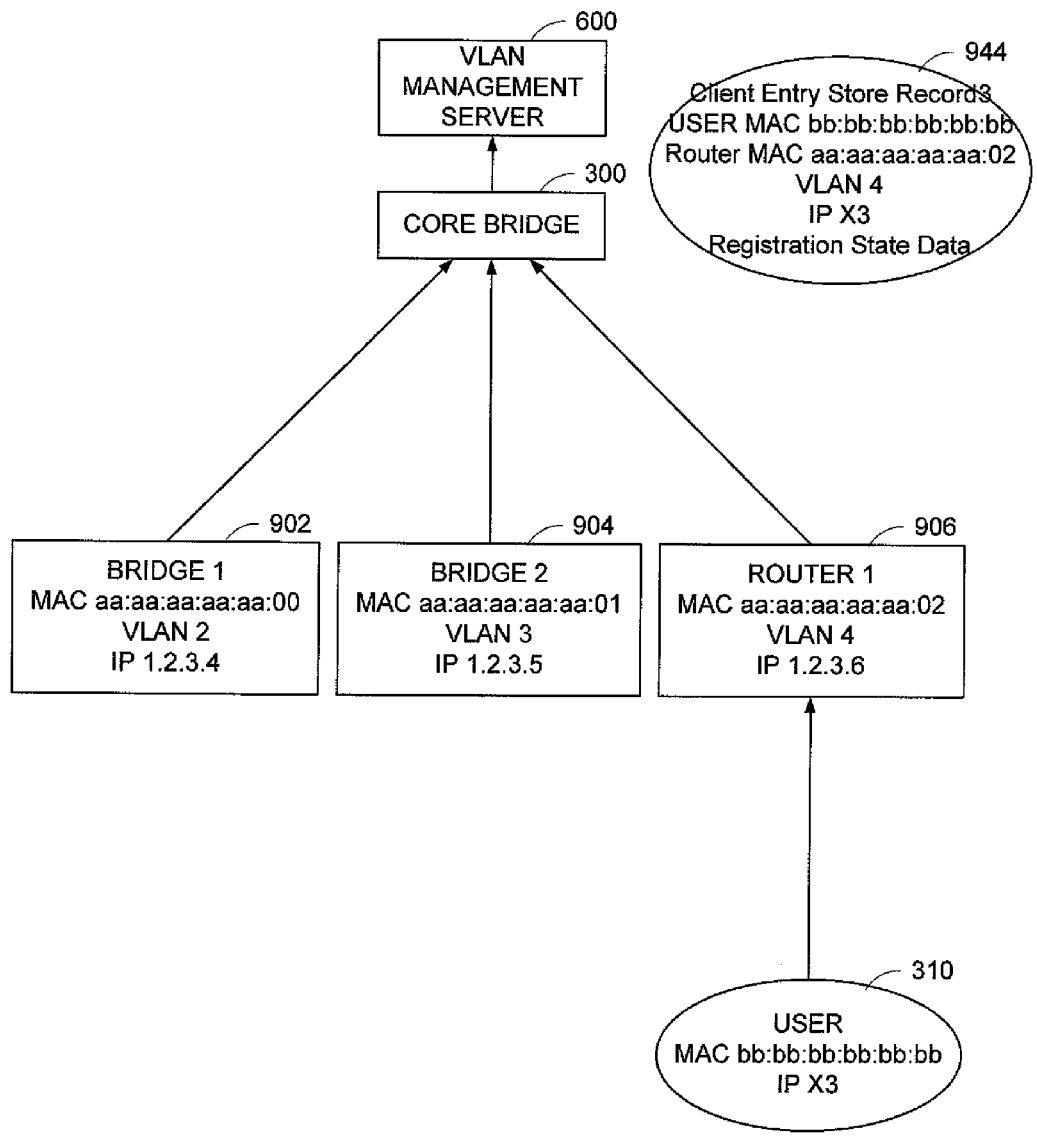
FIG. 33 is a diagram showing an example of a client entry store record.

The DHCP server module 680 receives the DHCP DISCOVER packet 942 from the packet driver module 660. The DHCP server module 680 passes the DHCP packet's data into the DHCP request handler 640. The DHCP request handler 640 determines if this is a DHCP Relayed or Forwarded DHCP packet. The DHCP request handler 640 looks up the client entry store record possessing a client MAC address equal to the packet's source MAC address aa:aa:aa:aa:aa:02. This record represents the DHCP Relaying or Forwarding device Router 1, and contains the VLAN id 4 which is being used by that device, i.e., Router 1. The DHCP request handler 640 then attempts to find an existing record 934 matching the packet's chaddr bb:bb:bb:bb:bb:bb and/or ciaddr 0.0.0.0 obtained from the payload of the packet 942. This is the client's record 934 which was used when the client was behind Bridge 2 of VLAN 3. The DHCP request handler 640 compares the client's record's router MAC address bb:bb:bb: bb:bb:bb and VLAN id 3 to the DHCP packet's source MAC address aa:aa:aa:aa:aa:02 and the Relaying or Forwarding device's VLAN id 4. Since the client record's router MAC address and/or VLAN id does not match, the DHCP request handler 640 creates a new client record 944, as shown in FIG. 33. During the creation of the new record, the DHCP request handler 640 allocates a new IP address X3 to that record. The old record's registration settings are copied into the new record 944, and the old record 934 is invalidated.

The DHCP request handler 640 returns the current record's assigned IP address X3 to the DHCP server module 680. The DHCP server module 680 sends that assigned IP address to the client 310 using the DHCP protocol. Thus, the user 310 possesses an IP address X3 as shown in FIG. 33.

The client 310 issues a Non-DHCP packet if the client's DHCP module has not yet expired or abandoned its original DHCP lease.

This packet is blocked by Router 1, since it is originating from an IP address which is not routed by Router 1. The client 310 is forced to either manually or automatically issue a DHCP DISCOVER packet.

Figure 34:
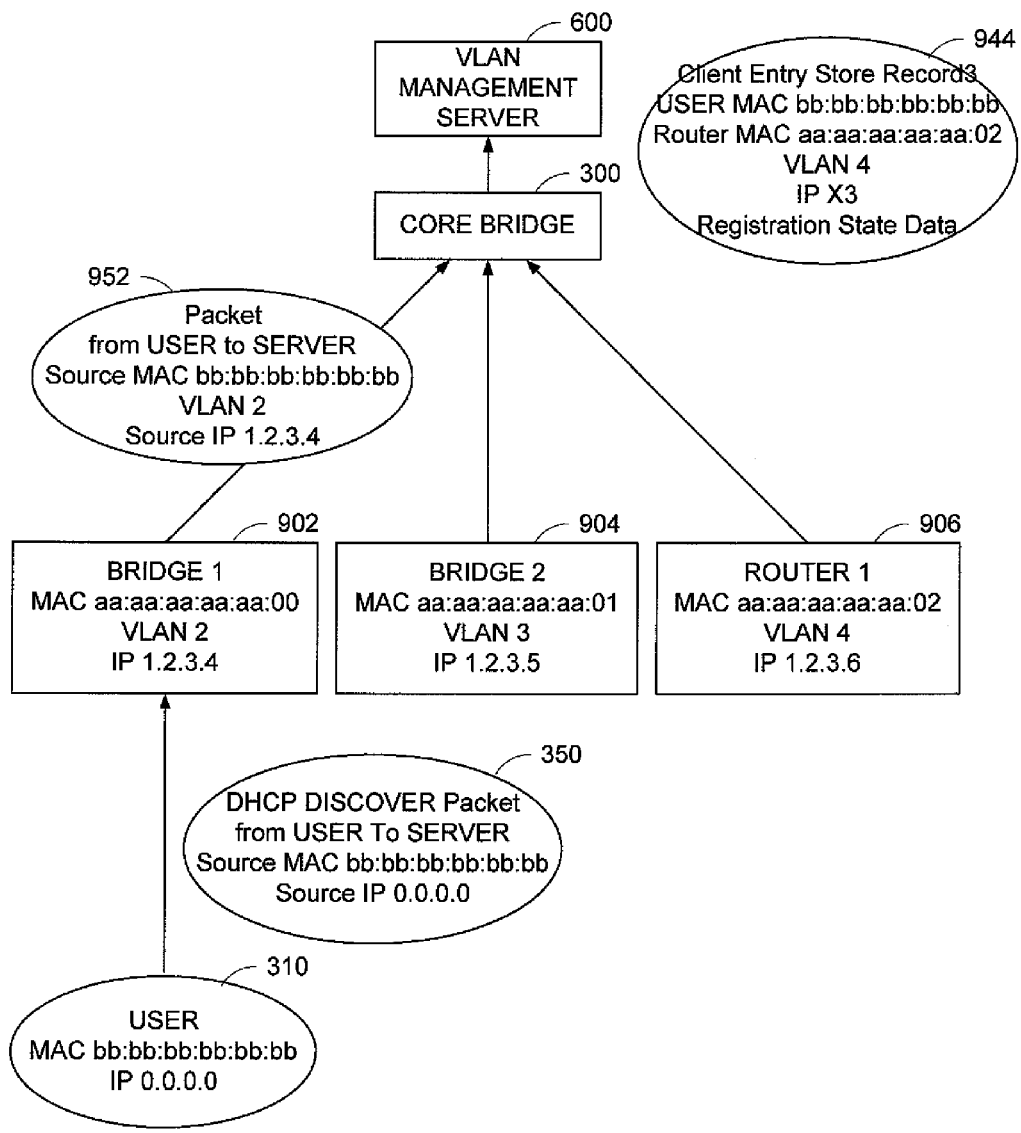
FIG. 34 is a diagram showing an example of another user traversal of VLANs and a DHCP discover packet flow.

For moving from VLAN 4 to VLAN 2, as shown in FIG. 34, the client 310 physically disconnects from VLAN 4 behind Router 1, and physically connects to VLAN 2 behind Bridge 1.

The client 310 outputs, as the first packet after the new connection, one of three types of packet: DHCP REQUEST packet, DHCP DISCOVER packet and non-DHCP packet.

The client 310 issues a DHCP REQUEST packet, in an automatic attempt to retain the IP address X3 that was obtained behind Router 1. This packet is stamped with source addresses of the user's MAC address and user's current IP address, and tagged with the VLAN id of Bridge 1, VLAN id 2.

The packet driver module 660 of the VLAN management server 600 receives the DHCP packet. The packet driver module 660 attempts to find an existing client record 944 possessing a client MAC address equal to the packet's source MAC address. This entry 944 is the client's entry which was used when the client 310 was behind Router 1. The client record's VLAN id 3 is compared to the packet's VLAN id 2, and their difference is detected. The packet driver module 660 consequently creates a new entry reflecting the new VLAN id 2. During the creation of the new entry, the packet driver module 660 allocates a new IP address X4 to that entry. The old entry's registration settings are copied into the new entry, and the old entry 944 is invalidated. The client's current client entry store record now possesses a client MAC address equal to the client's own MAC address, a router MAC address equal to the client MAC address, and a VLAN id 2.

The DHCP server module 680 receives the DHCP REQUEST packet from the packet driver module 660. The DHCP Server module passes the DHCP packet's data into the DHCP request handler 640.

The DHCP request handler 640 looks up the client record which possesses a client MAC address equal to the packet's chaddr, and compares the record's router MAC address to the packet's source MAC address. The two MAC addresses are the same, so the DHCP request handler 640 does not create a new client entry. The DHCP request handler 640 passes the record's assigned IP address to the DHCP server module 680.

The DHCP server module 680 compares the assigned IP address to the address which the client requested, and notices that the addresses differ. The DHCP server module 680 therefore sends a DHCP NACK packet to the client 310, which forces the client 310 to issue a DHCP DISCOVER packet.

FIG. 34 shows the case where the client 310 issues a DHCP DISCOVER packet 350. The client 310 issues this packet 350 when the client's DHCP module has either expired its original DHCP lease, or has lost network connectivity long enough to prematurely abandon it. Thus, the user's IP address is 0.0.0.0.

This packet 350 is stamped with the client's MAC address, and the client's current IP address, which the client has set to 0.0.0.0, in accordance with the DHCP protocol. Bridge 1 tags the packet 350 with VLAN id 2, and sends out a packet 952.

Figure 35:
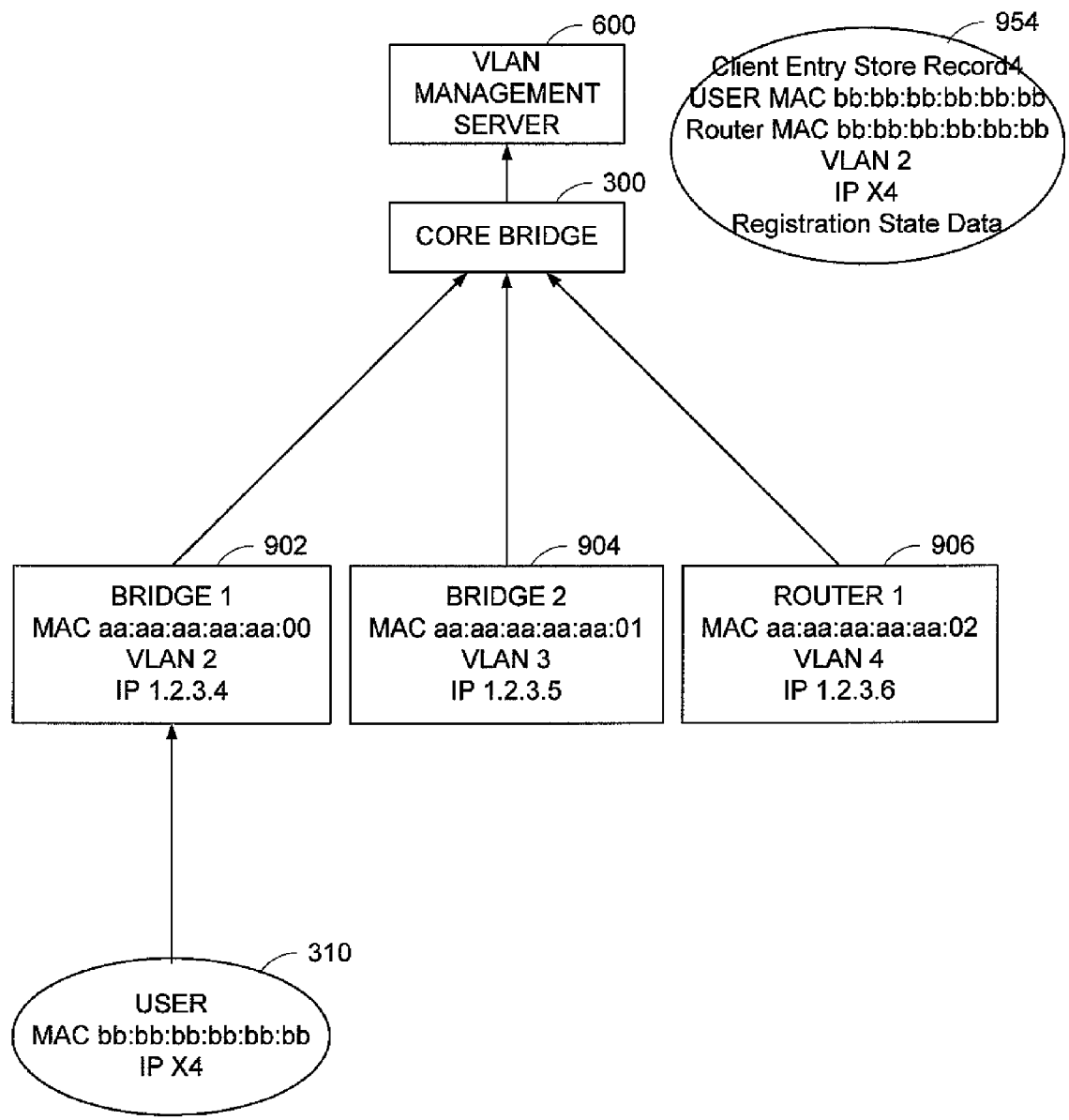
FIG. 35 is a diagram showing an example of a client entry store record.

The packet driver module 660 of the VLAN management server 600 receives the DHCP DISCOVER packet 952. The packet driver module 660 attempts to find an existing client record 944 possessing a client MAC address equal to the packet's source MAC address bb:bb:bb:bb:bb:bb. This is the record which the client used while behind Router 1. The record's VLAN id 4 is compared to the packet's VLAN id 2, and their difference is detected. The packet driver module 660 creates a new client record 954 reflecting the client's new VLAN id, and the packet's source MAC address, as shown in FIG. 35. During the creation of the new record, the packet driver module 660 allocates a new IP address X4 to that record. The old record's registration settings are copied into the new record 954, and the old record 944 is invalidated.

The DHCP server module 680 receives the DHCP DISCOVER packet 952 from the packet driver module 660, and passes the packet's data into the DHCP request handler 640.

The DHCP request handler 640 attempts to find a client record 954 which possesses a client MAC address equal to the DHCP packet's chaddr. This is the record which the packet driver module 660 just created. The record's router MAC address is compared to the packet's source MAC address. The two MAC addresses are the same, thus, the DHCP request handler 640 does not create a new entry. The DHCP request handler 640 passes the record's assigned IP address X4 to the DHCP server module 680.

The DHCP server module 680 returns the assigned IP address X4 to the client 310 according to the DHCP protocol. Thus, the client 34 now possesses the IP address X4 as shown in FIG. 35.

When the client 310 issues a non-DHCP packet, this packet possesses the client's source MAC address and source IP address, and is tagged by Bridge 1 with VLAN 2.

The packet driver module 660 looks up the current client record 944 which possesses a client MAC address equal to the packet's source MAC address, determines that the record's VLAN id differs from the packet's VLAN id, and then invalidates the existing record 944 and create a new record. This new record possesses a client MAC equal to the packet's source MAC, a VLAN id equal to the packet's VLAN id, and a new IP address suited to that VLAN and also to Bridge 1. The client 310 does not yet possess this new IP address. Accordingly, any response traffic sent from the server to the client 330 is not received by that client 330, until that client's DHCP client acquires the new IP address by issuing a DHCP DISCOVER.

An example end-user scenario is now described where an end-user or client roams router realms in a VLAN, which is handled by the VLAN management server 600 that handles the router roaming as well as VLAN roaming as described above. This example uses a simple network having two routers, a bridge, and the VLAN management server 600, similar to that shown in FIGS. 10-19. The VLAN management server 600 handles the router roaming in a similar manner as the VBN server 100 as described above, except that the VLAN management server 600 assigns a new IP address to the roamed client based on the router address and VLAN ids, rather than the router MAC address based on which the VBN server 100 assigns a new IP address to the roamed client.

In order to obtaining an initial IP Address behind Router 1, the user device physically connects to subnetwork behind Router 1.

The user device issues a DHCP DISCOVER packet to obtain an IP address. The headers of this packet are stamped with the user's MAC address as the source MAC address, and the user's IP address as the source IP address, which is 0.0.0.0. The DHCP payload within the packet contains the user's MAC address and the user's current IP address, 0.0.0.0.

Router 1 either DHCP Relays or DHCP Forwards this DHCP packet to the VLAN management server 600. If the packet is Relayed, Router 1 alters both source addresses of the DHCP packet to the MAC and the IP addresses of the external interface of Router 1. The contents of the DHCP payload are not altered. If the packet is Forwarded, Router 1 alters only the source MAC address of the DHCP packet to be the MAC address of the external interface of Router 1. The contents of the DHCP payload are not altered.

The packet driver module 660 of the VLAN management server 600 receives the DHCP DISCOVER packet and examines its headers to determine the packet's source MAC and source IP addresses. The packet driver module 660 attempts to find an existing record within the client entry store 620 which possesses a client MAC address equal to the packet's source MAC address.

If such a record is found, and it is a record marked as being a routing device, then the packet driver 660 attempts to locate or create a client record which possesses an assigned IP address equal to the packet's source IP address. If no record possessing a client MAC address equal to the packet's source MAC address is found, then a new record is created. Since the DHCP packet is being Relayed or Forwarded, this new record represents only the Router 1, and not the client which originated the DHCP packet.

The DHCP server module 680 receives the DHCP DISCOVER packet from the packet driver 660. The DHCP server module 680 passes the data contained within the DHCP packet into the DHCP request handler 640.

The DHCP request handler 640 determines that this is a Relayed or Forwarded packet by examining the data received from the DHCP server module 680. The DHCP request handler 640 attempts to find in the client entry store 620 an existing client record which possesses a client MAC address equal to the DHCP packet's chaddr, and/or an assigned IP address equal to the DHCP packet's ciaddr. If such a record is found, its router MAC address is compared to the DHCP packet's source MAC address. If the record's router MAC address does not match the packet's source MAC address, then the DHCP request handler 640 creates a new client record which reflects the new router MAC address. The old client record is invalidated, and its registration settings are copied into the new client record.

For moving from Router 1 to Bridge 1, the user physically disconnects from subnetwork behind Router 1, and physically connects to subnetwork behind Bridge 1.

The client sends, as the first packet after the new connection, one of three types of packet through Bridge 1 to the VLAN management server 600: DHCP REQUEST packet, DHCP DISCOVER packet, or non-DHCP packet.

The client issues a DHCP REQUEST packet in an automatic attempt to retain the IP address that was obtained behind Router 1. This packet's headers are stamped with source addresses of the client's MAC address and client's current IP ADDRESS. Bridge 2 does not alter this packet.

The Packet driver module 660 of the VLAN management server 600 receives the DHCP REQUEST packet and examines its headers to determine the packet's source MAC address and source IP addresses. The packet driver module 660 attempts to find a record which possesses a client MAC address equal to the packet's source MAC address. The packet driver module 660 thus finds the client's record which was found or created by the processing of the client's previous DISCOVER message.

The DHCP server module 680 receives the DHCP REQUEST packet from the packet driver module 660. The DHCP server module 680 passes the data contained within the DHCP packet into the DHCP request handler 640.

The DHCP request handler 640 finds the client's record by looking for a record possessing a client MAC address equal to the packet's chaddr. The DHCP request handler 640 compares that record's router MAC address to the packet's source MAC address, and notices that they differ: The packet's source MAC address is the same as the packet's chaddr, but the record's router MAC address is that of Router 1. The DHCP request handler 640 therefore creates a new client record which reflects the new client's new router MAC address. The old record's registration information is copied into the new record, and the old record is invalidated.

The DHCP request handler 640 passes the new record's assigned IP address to the DHCP server module 680. The DHCP server module 680 sees that the assigned IP is not the same as the IP which was being REQUESTED, and consequently sends a DHCP NACK message to the client. The client is forced to issue a DHCP DISCOVER message, as required by the DHCP protocol.

The client issues a DHCP DISCOVER packet if the client's DHCP module has either expired its original DHCP lease, or has lost network connectivity long enough to prematurely abandon it.

The DHCP DISCOVER packet is stamped with source addresses of the client's MAC address and current IP address, which is 0.0.0.0. The packet's DHCP payload also contains the client's MAC address and current IP address. Bridge 1 does not alter the packet's addresses.

The Packet driver module 660 of the VLAN management server 600 receives the DHCP DISCOVER packet and examines its headers to determine the packet's source MAC address and source IP addresses. The packet driver module 660 finds the client's entry store record by looking up the record which possesses a client MAC address equal to the packet's source MAC address.

The VLAN management server 600's DHCP server module 680 receives the DHCP DISCOVER packet and passes its contents to the DHCP request handler 640.

The DHCP request handler 640 finds the current client entry store record by looking up the record which possess a client MAC address equal to the DHCP packet's chaddr. If this record still possesses a router MAC address equal to Router 1's MAC address, which does not match this DHCP packet's source MAC address, then the DHCP Request handler creates a new client record which reflects the current router MAC address. The old record's registration settings are copied into the new record, and the old record is invalidated. The DHCP Request handler then returns the new record's assigned IP address to the DHCP server module 680.

The DHCP server module 680 returns the assigned IP address to the client according to the DHCP protocol.

The client issues a non-DHCP packet if the client's DHCP module has not yet expired or abandoned its original DHCP lease.

This packet is sent from the client stamped with the client's source MAC and IP addresses. Bridge 1 does not alter the packet.

The packet driver module 660 of the VLAN management server 600 receives the packet, and determines its source MAC and IP addresses. The packet driver module 660 looks up the existing client entry store record which possesses a client MAC address equal to the packet's source MAC address, and consider this client record to appropriately represent the client, even though this record still possesses a router MAC address from Router 1, and an IP address suited to Router 1. However, no traffic sent back to the client reaches that client, since the VLAN management server 600 routes all traffic destined to the client record's IP address through Router 1. The client is forced to issue a DHCP DISCOVER in order to obtain an appropriate IP address.

For moving from Bridge 1 to Router 2, the user physically disconnects from subnetwork behind Bridge 1, and physically connects to subnetwork behind Router 2.

The client outputs, as the first packet after the new connection, one of three types of packet: DHCP REQUEST packet, DHCP DISCOVER packet, or non-DHCP packet.

The client issues a DHCP REQUEST packet in an automatic attempt to retain the IP address that was obtained behind Bridge 1. This packet is stamped with source addresses of the client's MAC address and client's current IP address.

If Router 2 possesses a DHCP Relay mechanism, then the DHCP packet is relayed to the VLAN management server 600, but the packet's source addresses are set to Router 2's MAC address and IP address. If Router 2 possesses a DHCP Forwarding mechanism, then the DHCP packet is relayed to the VLAN management server 600, but the packet's source MAC address is set to that of Router 2.

If Router 2 lacks both a DHCP Relay and DHCP Forwarding mechanism, then the DHCP REQUEST packet is dropped, because the source IP address of that packet is not one which Router 2 is configured to route.

If the VLAN management server 600 does receive the DHCP REQUEST packet, then the packet driver module 660 determines the packet's source MAC and IP addresses. The packet driver module 660 locates the Router R2's client entry store record, by looking up the record which possesses a client MAC address equal to the packet's source MAC address.

The DHCP server module 680 receives the DHCP REQUEST packet from the packet driver module 660, and passes the packet's information to the DHCP request handler 640.

The DHCP request handler 640 determines that this is either a Relayed or Forwarded DHCP packet, by examining the data passed into it from the DHCP server module 680. The DHCP request handler 640 then finds the client entry store record which represents the client, by looking up the record which possesses a client MAC address equal to the DHCP packet's chaddr. The DHCP request handler 640 compares the client's record's router MAC address, which is currently equal to the client's own MAC address, to the DHCP packet's source MAC address, and notices the difference between the two. The DHCP request handler 640 therefore creates a new client record, which reflects the client's new router MAC address. The DHCP request handler 640 copies the old client record's registration settings into the new record, and invalidates the old record. The DHCP request handler then passes the new record's assigned IP address to the DHCP server module 680.

The DHCP server module 680 notices that the new assigned IP address does not match the address which the client requested. The DHCP server module 680 therefore responds to the client with a DHCP NACK packet. The client is then forced to send a DHCP DISCOVER message to the VLAN management server 600.

The client issues a DHCP DISCOVER packet if the client's DHCP module has either expired its original DHCP lease, or has lost network connectivity long enough to prematurely abandon it.

If Router 2 possesses a DHCP Relay mechanism, then the DHCP packet is relayed to the VLAN management server 600, but the packet's source addresses are set to Router 2's MAC address and IP address. If Router 2 possesses a DHCP Forwarding mechanism, then the DHCP packet is relayed to the VLAN management server 600, but the packet's source MAC address is set to that of Router 2.

If the VLAN management server 600 does receive the DHCP DISCOVER packet, then the packet driver module 660 determines the packet's source MAC and IP addresses. The packet driver module 660 locates the Router 2's client entry store record, by looking up the record which possesses a client MAC address equal to the packet's source MAC address.

The DHCP server module 680 receives the DHCP DISCOVER packet from the packet driver module 660. The DHCP server module 680 passes the DHCP packet's data into the DHCP request handler 640.

The DHCP request handler 640 determines that this is either a Relayed or Forwarded DHCP packet, by examining the data passed into it from the DHCP server module 680. The DHCP request handler 640 then finds the client entry store record which represents the client, by looking up the record which possesses a client MAC address equal to the DHCP packet's chaddr. The DHCP request handler 640 compares the client's record's router MAC address, which is currently equal to the client's own MAC address, to the DHCP packet's source MAC address, and notices the difference between the two. The DHCP request handler 640 therefore creates a new client record, which reflects the client's new router MAC address. The DHCP request handler 640 copies the old client record's registration settings into the new record, and invalidates the old record. The DHCP request handler then passes the new record's assigned IP address to the DHCP server module 680.

The DHCP request handler 640 returns the current record's assigned IP address to the DHCP server module 680. The DHCP server module 680 sends that assigned IP address to the client using the DHCP protocol.

The client issues a non-DHCP packet if the client's DHCP module has not yet expired or abandoned its original DHCP lease.

This packet is blocked by Router 2, since it is originating from an IP address which is not routed by Router 2 The client is forced to either manually or automatically issue a DHCP DISCOVER packet.

For moving from Router 2 to Router 1, the user physically disconnects from subnetwork behind Router 2, and physically connects to subnetwork behind Router 1.

Client outputs, as the first packet after the new connection, one of three types of packet: DHCP REQUEST packet, DHCP DISCOVER packet, or non-DHCP packet.

For a DHCP REQUEST packet, if Router 1 possesses a DHCP Relay mechanism, then the DHCP packet is relayed to the VLAN management server 600, but the packet's source addresses are set to Router 1's MAC address and IP address. If Router 1 possesses a DHCP Forwarding mechanism, then the DHCP packet is relayed to the VLAN management server 600, but the packet's source MAC address is set to that of Router 1.

The packet driver module 660 module receives the DHCP Request packet. The packet driver module 660 locates the Router R1's client entry store record, by looking up the record which possesses a client MAC address equal to the packet's source MAC address.

The DHCP server module 680 receives the DHCP REQUEST packet from the packet driver module 660. The DHCP server module 680 passes the DHCP packet's data into the DHCP request handler 640.

The DHCP request handler 640 determines that this is either a Relayed or Forwarded DHCP packet, by examining the data passed into it from the DHCP server module 680. The DHCP request handler 640 then finds the client entry store record which represents the client, by looking up the record which possesses a client MAC address equal to the DHCP packet's chaddr. The DHCP request handler 640 compares the client's record's router MAC address, which is currently equal to Router 2's MAC address, to the DHCP packet's source MAC address, which is Router 1's MAC address. The DHCP request handler 640 notices the difference, and creates a new client entry which reflects the new router MAC address. The old entry's registration settings are copied into the new record, and the old record is invalidated. The DHCP request handler 640 passes the new entry's assigned IP address to the DHCP Server module.

The DHCP Server module compares the new assigned IP address to the address which the client requested, and sees that the two addresses differ. The DHCP Server module consequently sends a DHCP NACK packet to the client, which forces the client to issue a DHCP DISCOVER packet.

For a DHCP DISCOVER packet, if Router 1 possesses a DHCP Relay mechanism, then the DHCP packet is relayed to the VLAN management server 600, but the packet's source addresses are set to Router 1's MAC address and IP address. If Router 1 possesses a DHCP Forwarding mechanism, then the DHCP packet is relayed to the VLAN management server 600, but the packet's source MAC address is set to that of Router 1.

The packet driver module 660 module receives the DHCP Request packet. The packet driver module 660 locates the Router R1's client entry store record, by looking up the record which possesses a client MAC address equal to the packet's source MAC address.

The DHCP server module 680 receives the DHCP REQUEST packet from the packet driver module 660. The DHCP server module 680 passes the DHCP packet's data into the DHCP request handler 640 module.

The DHCP request handler 640 determines that this is either a Relayed or Forwarded DHCP packet, by examining the data passed into it from the DHCP server module 680. The DHCP request handler 640 then finds the client entry store record which represents the client, by looking up the record which possesses a client MAC address equal to the DHCP packet's chaddr. The DHCP request handler 640 compares the client's record's router MAC address, which is currently equal to Router 2's MAC address, to the DHCP packet's source MAC address, which is Router 1's MAC address. The DHCP request handler 640 notices the difference, and creates a new client entry which reflects the new router MAC address. The old entry's registration settings are copied into the new record, and the old record is invalidated. The DHCP request handler 640 passes the new entry's assigned IP address to the DHCP Server module.

The DHCP server module 680 returns the assigned IP address to the client according to the DHCP protocol.

For a non-DHCP packet, this packet is blocked by Router 1, since it is originating from an IP address which is not routed by Router 1. The client is forced to either manually or automatically issue a DHCP DISCOVER packet.

Therefore, the VLAN management server 600 can recognize and automatically handle the movement of an end-user across VLANs, without requiring the end-user to re-register with the VLAN management server 600. The VLAN management server 600 can automatically transfer an end-user's registration across VLANs, as the end-user roams between those VLANs. Thus, the VLAN management server 600 can service a large and/or complex network, which consists of multiple VLANs.

In a different embodiment, a VLAN management server may support only router roaming by using a server similar to the VLAN management device or server 600, but not configuring it to assign IP addresses based on upon a user's current VLAN id.

The network server according to embodiments of the present invention may be implemented by any hardware, software or a combination of hardware and software having the above described functions. The software code, instructions and/or statements, either in its entirety or a part thereof, may be stored in a computer readable memory. Such a computer readable memory is also within the scope of the present invention, as well as the hardware and the combination of the hardware and software.

While particular embodiments of the present invention have been shown and described, changes and modifications may be made to such embodiments without departing from the scope of the invention. For example, the elements of the network server are described separately, however, two or more elements may be provided as a single element, or one or more elements may be shared with other components in one or more computer systems.

What is claimed is:

1. A network server for provisioning at least one Local Area Network (LAN), the network server comprising:
a client entry store configured to store records representing a user device connecting to the LAN provisioned by the network server as a roaming visitor of the LAN to gain temporal access to an outside network through the LAN, the LAN having multiple routing realms, the client entry store further configured to store records representing one or more routing realm top-level devices provided on a top level of each routing realm;
a packet driver module configured to inspect packets arriving from and directed to the user device, and to interact with the client entry store to process the packets; and
a Dynamic Host Configuration Protocol (DHCP) request handler configured to examine data in DHCP packets received from the user device and the records in the client entry store,
wherein at least one of the packet driver module and the DHCP request handler detects roaming between routing realms by the user device based on the data of the packets and the records in the client entry store,
the DHCP request handler comprises:
a DHCP packet data handling unit configured to obtain packet data relating to addresses included in a DHCP request packet received from the user device;
a client entry store record handling unit configured to access and manipulate the address data in the records in the client entry store;
an address data comparator configured to compare the packet data of the DHCP request packet and the address data of the records in the client entry store; and
a routing realm traversal handling unit configured to determine traversal of routing realms by the user device when a data comparison result meets a predetermined condition,
in response to the detection of roaming by the user device, the routing realm traversal handling unit of the DHCP request handler assigns to the user device a new Internet Protocol (IP) address suitable to a routing realm top-level device of a routing realm into which the user device has roamed, and the DHCP request handler provides the new IP address to the user device, and
when the new IP address is assigned, the client entry store record handling unit of the DHCP request handler manipulates the address data in the records in the client entry store so that the records representing the user device include a new record having the new IP address and a device address of the routing realm top-level device through which the user device is currently connecting to the network server.

2. The network server as claimed in claim 1, wherein the network server is a visitor based network (VBN) server configured to provision a VBN which allows temporal access to an outside network for roaming user devices;
the client entry store stores records representing a user device using a VBN provisioned by the VBN server, and further stores records representing routing realm top-level devices provided on a top level of each network hierarchy of the VBN, each routing realm top-level devices forming a routing realm within the VBN and allowing selective connection of the user device to the VBN server through the routing realm.

3. The network server as claimed in claim 2, wherein the client entry store contains a record for the user device including a user MAC address, user allocated IP address, user original IP address, router MAC address of a router through which the user device is connecting to the VBN server, and user registration settings; and
the address data comparator compares a user MAC address, user allocated IP address, user original IP address, router MAC address of a router through which the user device is connecting to the VBN server obtained from the packet data with those of the records in the client entry store in a predetermined manner.

4. The network server as claimed in claim 3, wherein the packet data handling unit obtains the user allocated IP address and router MAC address from headers of the DHCP packet, and obtains the user MAC address and user original IP address from a payload of the DHCP packet.

5. The network server as claimed in claim 1, wherein the address data comparator compares the packet data and the address data to determine if a routing realm top-level device of a routing realm from which the DHCP packet is received is a router or a bridge using data in the records in the client entry store.

6. The network server as claimed in claim 1, wherein the routing realm traversal handling unit comprises:
a new IP address allocator configured to allocate a new allocated IP address to the user device when it is determined that the user device is moved into a new routing realm, the new allocated IP address being suitable to the routing realm top-level device of the new routing realm; and
a new record creator configured create a new record for the user device using the new allocated IP address.

7. The network server as claimed in claim 6, wherein the new record creator creates the new record using data, other than an allocated IP address, in an existing record representing the user device in the client entry store, and invalidates the existing record and replace it with the new record in the client entry store.

8. A network server for provisioning multiple Local Area Networks (LANs), the network server comprising:
a client entry store configured to store records representing a user device connecting to the LAN provisioned by the network server as a roaming visitor of the LAN to gain temporal access to an outside network through the LAN, the LAN having multiple routing realms, the client entry store further configured to store records representing one or more routing realm top-level devices provided on a top level of each routing realm;

a packet driver module configured to inspect packets arriving from and directed to the user device, and to interact with the client entry store to process the packets; and a Dynamic Host Configuration Protocol (DHCP) request handler configured to examine data in DHCP packets received from the user device and the records in the client entry store, wherein at least one of the packet driver module and the DHCP request handler detects roaming between routing realms by the user device based on the data of the packets and the records in the client entry store, and the DHCP request handler, in response to the detection of roaming by the user device, assigns to the user device a new Internet Protocol IP address suitable to a routing realm top-level device of a routing realm into which the user device has roamed, the new IP address is assigned, the records representing the user device include a new record having the new IP address and a device address of the routing realm top-level device through which the user device is currently connecting to the network server, the packet driver module comprises:

a packet inspection handler configured to inspect headers of a received packet to obtain address information and a LAN identification of the received packet;

a client record handler configured to search records in the client entry store for a corresponding record based on the address information; and a VLAN roaming handler configured to detect VLAN roaming by the user device across the VLANs provisioned by the network server, based on the address information and LAN identification of the received packet and the corresponding record, and the DHCP request handler comprises:

a DHCP packet data handling unit configured to obtain address data in a received DHCP packet;

a client record handling unit configured to search records in the client entry store for a corresponding record based on the address data;

a VLAN roaming handling unit configured to determine a VLAN identification of the received packet based on the address data of the received DHCP packet and records, each of which records represents a top-level device provided on a top level of each LAN, and detecting VLAN roaming by the user device across the VLANs provisioned by the network server based on the address data and LAN identification of the received DHCP packet and the corresponding record; and a routing realm roaming handling unit configured to detect and handle routing realm roaming within one of the VLANs by the user device, based on the address data and VLAN identification of the received DHCP packet and the corresponding record located by the client record handling unit, wherein the client record handler assigns a new IP address to the user device and creates a new record for the user device using the new IP address when VLAN roaming or routing realm roaming by the user device is detected.

9. The network server as claimed in claim 8, wherein the client record handler comprises:

a record look up unit configured to search the corresponding record in the client entry store;

a new IP address allocator configured to assign a new IP address to the user device; and a new record creator configured to create a new record with the new IP address when there is no corresponding record is located by the record look up unit or when the VLAN roaming handler detects VLAN roaming by the user device.

10. The network server as claimed in claim 9, wherein the new IP address allocator selects the new IP address from an address range that correspond to the address and the VLAN identification of the received packet.

11. The network server as claimed in claim 8, wherein the packet driver module handles packets that are not DHCP routed packets or DHCP discover packets.

12. A method of supporting user device roaming in at least one Local Area Network (LAN), the method comprising the steps of:

storing in a client entry store of a network server records representing a user device connecting to the LAN provisioned by the network server as a roaming visitor of the LAN to gain temporal access to an outside network through the LAN, the LAN having multiple routing realms;

storing in the client entry store records representing one or more routing realm top-level devices provided on a top level of each routing realm of the LAN;

receiving and inspecting packets arriving from and directed to the user device to obtain address information of the packets by at least one of a packet driver module or a Dynamic Host Configuration Protocol (DHCP) request handler of the network server;

searching the records stored in the client entry store for corresponding records that have address information corresponding to the address information of the packets;

detecting roaming between routing realms by the user device based on the address information of the packets and the corresponding records; and assigning to the user device a new Internet Protocol (IP) address suitable to a routing realm top-level device of a routing realm into which the user device has roamed, in response to the detection of roaming by the user device, including, in the records representing the user device, a new record having the new IP address and a device address of the routing realm top-level device through which the user device is currently connecting to the network server, and providing the new IP address to the user device, wherein the detecting step comprises the steps by the DHCP request handler of obtaining packet data relating to addresses included in a DHCP request packet received from the user device, and comparing the packet data of the DHCP request packet and the address data of the records in the client entry store, and the detecting step detects roaming by the DHCP request handler when a data comparison result meets a predetermined condition; and the new record including step comprises the step creates the new record by the DHCP request handler.

13. The method as claimed in claim 12, wherein the user device roams between routing realms in a Visitor Based Network (VBN) which allows temporal access to an outside network for roaming user devices;

the top-level device records storing step stores records representing routing realm top-level devices provided on a top level of a network hierarchy of a VBN provisioned by a VBN server, each routing realm top-level devices forming a routing realm within the VBN and allowing selective connection of a user device to the VBN server through the routing realm.

14. The method as claimed in claim 13, wherein the user device records storing step stores a record for the user device containing data including a user MAC address, user allocated IP address, user original IP address, router MAC address of a router through which the user device is connecting to the VBN server, and user registration settings; and the examining step compares a user MAC address, user allocated IP address, user original IP address, router MAC address of a router through which the user device is connecting to the VBN server included in the packet data with those of the records in the client entry store in a predetermined manner.

15. The method as claimed in claim 14, wherein the packet data obtaining step obtains the user allocated IP address and router MAC address from headers of the DHCP packet, and obtains the user MAC address and user original IP address from a payload of the DHCP packet.

16. The method as claimed in claim 12, wherein the examining step compares the address information in the DHCP packet and the corresponding record to determine if a routing realm top-level device of a routing realm from which the DHCP packet is received is a router or a bridge.

17. The method as claimed in claim 16, wherein the new record creating step creates the new record using data, other than an allocated IP address, in an existing record representing the user device in the client entry store, and invalidates the existing record and replacing it with the new record in the client entry store.

18. The method as claimed in claim 12, wherein the method supports user roaming among multiple LANs provisioned by a network server, and the receiving and inspecting step inspects headers of a received packet to obtain address information and a LAN identification of the received packet;

the searching step searches the records in the client entry store for a corresponding record based on the address information; and the detecting step detects VLAN roaming by the user device across the VLANs provisioned by the network server, based on the address information and LAN identification of the received packet and the corresponding record, the assigning step assigns a new IP address to the user device and creates a new record for the user device using the new IP address when VLAN roaming by the user device is detected.

19. The method as claimed in claim 18, wherein the assigning step assigns a new IP address and creates a new record with the new IP address also when there is no corresponding record is located by the record look up unit.

20. The method as claimed in claim 19, wherein the assigning step selects the new IP address from an address range that correspond to the address and the VLAN identification of the received packet.

21. The method as claimed in claim 20, wherein the receiving and inspecting step inspects the headers of received packets that are not DHCP routed packets or DHCP discover packets.

22. The method as claimed in claim 21 wherein when the received packet is a DHCP packet, the method further comprises the steps of:

obtaining address data in the received DHCP packet;

searching records in the client entry store for a corresponding record based on the address data; and determining a VLAN identification of the received packet based on the address data, detecting VLAN roaming by the user device across the VLANs provisioned by the network server, based on the address data and LAN identification of the received DHCP packet and the corresponding record, wherein the assigning step assigns a new IP address to the user device and creates a new record for the user device using the new IP address when the VLAN roaming handling unit detects VLAN roaming by the user device.

23. The method as claimed in claim 22 further comprising the step of detecting a routing realm roaming by the user device within one of the VLANs, based on the address data and VLAN identification of the received DHCP packet and the corresponding record, wherein the assigning step assigns a new IP address to the user device and creates a new record for the user device using the new IP address when the routing realm roaming handling unit detects routing realm roaming by the user device.

24. The method as claimed in claim 18, wherein the assigning step selects the new IP address from an address range that correspond to the address data and the VLAN identification of the received DHCP packet.

25. The method as claimed in claim 18, wherein the received DHCP packet is a DHCP routed packet or a DHCP discover packet that is either DHCP routed or forwarded.

26. A method of supporting user device roaming in at least one Local Area Network (LAN), the method comprising the steps of:

storing in a client entry store records representing a user device connecting to the LAN provisioned by the network server as a roaming visitor of the LAN to gain temporal access to an outside network through the LAN, the LAN having multiple routing realms;

storing records representing one or more routing realm top-level devices provided on a top level of each routing realm of the LAN;

receiving and inspecting packets arriving from and directed to the user device to obtain address information of the packets;

searching the records stored in the client entry store for corresponding records that have address information corresponding to the address information of the packets;

detecting roaming between routing realms by the user device based on the address information of the packets and the corresponding records; and assigning to the user device a new Internet Protocol (IP) address suitable to a routing realm top-level device of a routing realm into which the user device has roamed, in response to the detection of roaming by the user device, and including, in the records representing the user device, a new record having the new IP address and a device address of the routing realm top-level device through which the user device is currently connecting to the network server, wherein the examining step and the detecting step comprise the steps of:

receiving packet data relating to addresses in the DHCP packet, the packet data including a user MAC address, user original IP address, source IP address, and source MAC address;

searching for a matching record in the client entry store having the user MAC address and the end-user IP address included in the packet data;

if there is no matching record located, searching a corresponding record in the client entry store having the user IP address and the source MAC address included in the packet data;
if a corresponding record is located, determining if a user MAC address of the corresponding record matches the user MAC address included in the packet data;
if the user MAC address of the corresponding record does not match the user MAC address included in the packet data, updating the corresponding record in the client entry store to have the user MAC address included in the packet data;
if there is no corresponding record located, searching for a relevant record in the client entry store having the user IP address included in the packet data;
if a relevant record is located, determining if a router MAC address of the relevant record matches the source MAC address included in the packet data; and
if the router MAC address of the relevant record does not match the source MAC address included in the packet data, determining that the user device traversed from a routing realm to a new routing realm within the VBN.

27. The method as claimed in claim 26 further comprising the steps of:
sending the new allocated IP address to the user device; and
allowing the user device to access services of the VBN server using the new allocated IP address.

28. A non-transitory computer readable storage medium storing instructions or statements for use in the execution in a network server for provisioning at least one Local Area Network (LAN) of a method of supporting user device roaming the LAN, the method comprising the steps of:
storing in a client entry store of a network server records representing a user device connecting to the LAN provisioned by the network server as a roaming visitor of the LAN to gain temporal access to an outside network through the LAN, the LAN having multiple routing realms;
storing in the client entry store records representing one or more routing realm top-level devices provided on a top level of each routing realm of the LAN;
receiving and inspecting packets arriving from and directed to the user device to obtain address information of the packets by at least one of a packet driver module or a Dynamic Host Configuration Protocol (DHCP) request handler of the network server;
searching the records stored in the client entry store for corresponding records based on the address information of the packets;
detecting roaming by the user device based on the data of the packets and the corresponding records;
assigning to the user device a new Internet Protocol (IP) address suitable to a routing realm top-level device of a routing realm into which the user device has roamed, in response to the detection of roaming by the user device, including, in the records representing the user device, a new record having the new IP address and a device address of the routing realm top-level device through which the user device is currently connecting to the network server, and
providing the new IP address to the user device,
wherein the detecting step comprises the step by the DHCP request handler of obtaining packet data relating to addresses included in a DHCP request packet received from the user device, and comparing the packet data of the DHCP request packet and the address data of the records in the client entry store, and
the detecting step detects roaming by the DHCP request handler when a data comparison result meets a predetermined condition; and
the new record including step comprises the step of creates the new record by the DHCP request handler.

* * * * *